United States Patent
Ferrill et al.

(10) Patent No.: US 9,996,623 B1
(45) Date of Patent: Jun. 12, 2018

(54) COMPUTER-IMPLEMENTED METHOD OF CARRYING OUT A SEARCH FOR INFORMATION AVAILABLE OVER A NETWORK

(71) Applicant: Pubsonic, Inc., New York, NY (US)

(72) Inventors: Dennis Ferrill, New York, NY (US); Vladan Petrovic, Belgrade (RS); Ivana Gadjanski, Belgrade (RS)

(73) Assignee: Pubsonic, Inc., New York, NY (US)

( * ) Notice: Subject to any disclaimer, the term of this patent is extended or adjusted under 35 U.S.C. 154(b) by 418 days.

(21) Appl. No.: 14/751,353

(22) Filed: Jun. 26, 2015

Related U.S. Application Data

(60) Provisional application No. 62/018,004, filed on Jun. 27, 2014.

(51) Int. Cl.
| | |
|---|---|
| *G06F 7/00* | (2006.01) |
| *G06F 17/30* | (2006.01) |
| *G06N 5/00* | (2006.01) |
| *G06N 5/04* | (2006.01) |
| *G06F 3/048* | (2013.01) |

(52) U.S. Cl.
CPC ........ *G06F 17/30867* (2013.01); *G06F 3/048* (2013.01); *G06F 17/30979* (2013.01); *G06N 5/003* (2013.01); *G06N 5/04* (2013.01)

(58) Field of Classification Search
CPC .................................................. G06F 17/30979
See application file for complete search history.

(56) References Cited

U.S. PATENT DOCUMENTS

| | | | |
|---|---|---|---|
| 8,949,250 B1 * | 2/2015 | Garg ................... | G06F 17/3053 707/748 |
| 2005/0039086 A1 * | 2/2005 | Krishnamurthy ..... | H04L 41/142 714/57 |
| 2007/0071323 A1 | 3/2007 | Kontsevich et al. ......... | 382/190 |
| 2008/0212899 A1 | 9/2008 | Gokturk et al. ............... | 382/305 |
| 2011/0047145 A1 | 2/2011 | Ershov .......................... | 707/722 |
| 2011/0173214 A1 | 7/2011 | Karim .......................... | 707/754 |

FOREIGN PATENT DOCUMENTS

| | | |
|---|---|---|
| WO | WO 2010/055356 A1 | 5/2010 |
| WO | WO 2013/075316 A1 | 5/2013 |
| WO | WO 2013/101491 A1 | 7/2013 |

* cited by examiner

*Primary Examiner* — Ajith Jacob
(74) *Attorney, Agent, or Firm* — Sunstein Kann Murphy & Timbers LLP

(57) ABSTRACT

A computer-implemented method of carrying out an image-based search for information available over a network includes serving to a client computer a web page containing a set of knowledge models in response to a search request message received at a server over the network from the client computer. The knowledge models are interlinked, through a crowd-sourced schema, in a knowledgebase. The web page is structured so that graphically selecting one of the knowledge models in the web page displayed on the client computer causes display of a set of knowledge assets interlinked with the selected knowledge model.

19 Claims, 46 Drawing Sheets

* indicates process is further described in another figure

COMPUTER-IMPLEMENTED METHOD OF CARRYING OUT A SEARCH FOR INFORMATION AVAILABLE OVER A NETWORK

PRIORITY

The present U.S. utility patent application claims the benefit of U.S. provisional patent application Ser. No. 62/018,004, filed on Jun. 27, 2014, which is incorporated herein by reference in its entirety.

TECHNICAL FIELD

The present invention relates to computer-implemented methods for carrying out searches for information available over a network, and more particularly to such methods employing interlinked knowledge objects wherein the linkages are crowed-sourced.

BACKGROUND ART

It is known in the prior art to provide computer-implemented methods for carrying out searches for information available over a network. Many prior art search methods rely on key word searches.

SUMMARY OF THE EMBODIMENTS

In a first embodiment of the invention there is provided a computer-implemented method of carrying out an image-based search for information available over a network. The method of this embodiment includes:

responsive to a search request message received at a server over the network from a client computer, serving to the client computer a web page containing a set of knowledge models, responsive to the search request, wherein the knowledge models are interlinked, through a crowd-sourced schema, in a knowledgebase;

wherein the web page is structured so that graphically selecting one of the knowledge models in the web page displayed on the client computer causes display of a set of knowledge assets interlinked with the selected knowledge model.

In a related embodiment, the web page is structured so that, in an explore mode of displaying the web page on the client computer, graphical selection of a knowledge model reveals other knowledge models interlinked to the selected knowledge model, so as to facilitate browsing in the knowledgebase. Optionally, each linkage between interlinked knowledge models has a type selected from a group of types. As a further option, the group of types includes similarity, succession, and precedence.

In a further related embodiment, the search request message is a designation of a location in a taxonomy applicable to the knowledgebase.

In another embodiment, there is provided a computer-implemented method of carrying out a search for information available over a network. The method of this embodiment includes:

serving to the client computer a web page providing a set of knowledge models, wherein the knowledge models are interlinked, through a crowd-sourced schema, in a knowledgebase;

wherein the web page is structured so that graphically selecting one of the knowledge models in the web page displayed on the client computer causes display of a set of knowledge assets interlinked with the selected knowledge model.

In a related embodiment, the web page includes a set of initial knowledge models, wherein each initial knowledge model is a proxy for a specific category of knowledge models, and wherein all of the knowledge models are interlinked in a knowledgebase.

In another embodiment, there is provided a computer-implemented method of carrying out a search for information available over a network. The method of this embodiment includes:

responsive to a search request message received at a server over the network from a client computer, serving to the client computer a web page containing a first set of knowledge objects, such knowledge objects being interlinked, through a crowd-sourced schema, in a database of a specific category, so that the knowledge objects are selected from a first shared network graph, the first set of knowledge objects being responsive to the search request;

wherein the web page is structured so that graphically selecting one of the knowledge objects in the first set causes display of a set of knowledge assets, interlinked with the selected knowledge object, the set of knowledge assets including a second set of knowledge objects selected from a second network graph, distinct from the first network graph, so that a search conducted using the first network graph can be further conducted using the second network graph by selection of a knowledge object in the second set.

Optionally, the search request message is a designation of a location in a taxonomy applicable to the database of knowledge objects. As a further option, the set of knowledge assets includes knowledge objects selected from a plurality of distinct network graphs. In further options, the plurality may be at least three or at least four distinct network graphs. Also optionally, the set of knowledge assets includes knowledge objects selected from a knowledgebase. Alternatively, the set of knowledge assets includes knowledge objects selected from a knowledgebase, a network graph of people, a network graph of publications, and a network graph of data sets.

In a further related embodiment, the web page is structured so that, in an explore mode of displaying the web page on the client computer, graphical selection of a knowledge object reveals other knowledge objects contained within the same network graph interlinked to the selected knowledge object, so as to facilitate browsing in the database, including browsing across any network graph. Optionally, each linkage between interlinked knowledge objects has a type selected from a group of types.

In another embodiment, the invention provides a computer-implemented method of carrying out a search for information available over a network. The method of this embodiment includes:

responsive to a search request message received at a server over the network from a client computer, serving to the client computer a first set of knowledge objects, such knowledge objects being interlinked in a database of a specific category, so that the knowledge objects are selected from a first shared network graph, the first set of knowledge objects being responsive to the search request;

responsive to a selection message from the client computer specifying a selection of one of the knowledge objects in the first set, serving a set of knowledge assets, interlinked with the selected knowledge object, the set of knowledge assets including a second set of knowledge objects selected from a second network graph, distinct from the first network graph, so that a search conducted using the first network graph can be further conducted using the second network graph by selection of a knowledge object in the second set.

Optionally, the search request message has been generated autonomously by the client computer. Alternatively or in addition, the search request message is a designation of a location in a taxonomy applicable to the database of knowledge objects. Also alternatively or in addition, the set of knowledge assets includes knowledge objects selected from a plurality of distinct network graphs. In a further related embodiment, the set of knowledge assets includes knowledge objects selected from at least three distinct network graphs. In yet a further related embodiment, the set of knowledge assets includes knowledge objects selected from at least four distinct network graphs.

Also optionally, the set of knowledge assets includes knowledge objects selected from a knowledgebase. In a further related embodiment, the set of knowledge assets includes knowledge objects selected from a knowledgebase, a network graph of people, a network graph of publications, and a network graph of data sets.

In a further related embodiment, the invention further includes, responsive to an exploration selection message, from the client computer, specifying a selection, for exploration purposes, of one of the knowledge objects in the first set, serving a set of knowledge assets, interlinked with the selected knowledge object, the set of knowledge assets including a second set of knowledge objects selected from a second network graph, distinct from the first network graph, so that a search conducted using the first network graph can be further conducted using the second network graph by selection of a knowledge object in the second set.

As another option in these related embodiments, each linkage between interlinked knowledge objects has a type selected from a group of types.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 1:
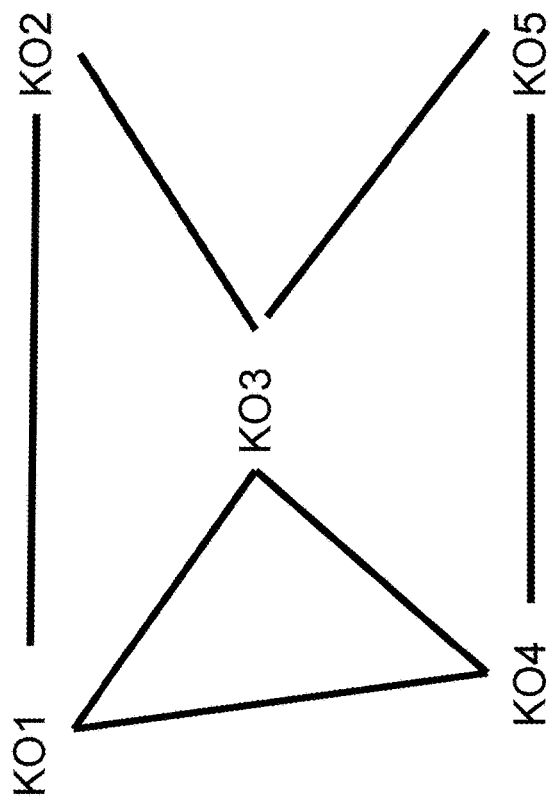
FIG. 1 is a schematic representation of a network graph of a collection of knowledge models in the same category, where a line between two knowledge models represents a linkage, and wherein each linkage is crowd sourced, in accordance with an embodiment of the present invention.

As used in this description and the accompanying claims, the following terms shall have the meanings indicated, unless the context otherwise requires:

A "web page" is a document that is typically served by a server to a client computer over a network, such as the World Wide Web, that can be used to cause display, in a web browser process running on the client computer, of information in the document, wherein the document can incorporate text and graphics and can include hyperlinks.

A "set" includes at least one member.

A "knowledge model" (sometimes herein "KM") is a visual representation associated with a topic. A second knowledge model may be embedded as an object within a first knowledge model. Optionally, the visual representation may be in three dimensions. As a further option, the visual representation may appear to the user as part of a three-dimensional space occupied by many knowledge models. A knowledge model is a "knowledge object" defined below. When we say that a "knowledge model is a visual representation," in fact, we mean that a knowledge model is a form of digital data, configured to be stored and retrieved in a digital computer system, that defines such a visual representation.

A "knowledge object" is an object that is associated with a topic and storable in a database, according to a specific category identification, with other knowledge objects of the same category. As an example, a "knowledge model" is one category of knowledge object, and knowledge models are stored in a database called a "knowledgebase". As another example, another category of knowledge object is a publication, and publications are stored in a publication database. As yet another example, another category of knowledge object is a "person" (this term meaning a profile of a person, and generally of a person with domain expertise, but not limited to such a person), and persons are stored in a people database. In embodiments of the present invention, knowledge objects in any one of these categories are stored in a database and are interlinked. A second knowledge object of any category may be embedded as an object within a first knowledge object of any category.

A "network graph" is a category of knowledge objects, stored in a database, and interlinked with other knowledge objects in the same category of knowledge objects.

A "knowledgebase" is database having a set of interlinked knowledge models that collectively, with their interrelationships, represent knowledge associated with the topic; wherein the interrelationships are defined by a community of users. A given knowledge model is not necessarily interlinked with any other knowledge model. Interlinking occurs pursuant to a procedure; see definition for "interlinked".

A "knowledge asset" is an information-carrying object associated with a knowledge object, and may be any of an article, a book, a video, a multi-media work, commentary, text, a set of images, or any other data that can be stored in a digital format. In particular, a knowledge asset can be associated with a knowledge object by being "interlinked" with the knowledge object; see definition for "interlinked".

A first knowledge object in a database is "interlinked" with a second knowledge object in the database or with a knowledge asset when a given user has made a proposal that the first knowledge object should be thus interlinked, and that proposal has been accepted in accordance with an administrative procedure associated with a server on which the database is maintained. A "proposal" for interlinking a first knowledge object with a second knowledge object or with a knowledge asset may be made separately for each interlinkage through a suitable user interface provided in a web page served by the server infrastructure herein. Alternatively a "proposal" for interlinking may be made in a batch mode, wherein many interlinkages are offered by a user for upload to the server, in which circumstance the proposal may additionally include new knowledge objects to be added to the database of knowledge objects.

A linkage between two knowledge objects, or between a knowledge object and a knowledge asset, is given a "type" to characterize the nature of the linkage in various embodiments of the present invention. For example, two knowledge objects may be linked because they concern related subject matter, and the linkage is one of similarity. Alternatively, two knowledge objects may be linked because one knowledge object may relate to information that is a successor to information in another knowledge object, and the linkage is one of succession. Alternatively, two knowledge objects may be linked because they represent contradictory information, and the linkage is one of contradiction. In another example, one knowledge object may relate to information that is a precedent to information in another knowledge object, and the linkage is one of precedence.

A "search request" is a user-generated message, transmitted to the server infrastructure, that identifies a context for processes carried out by the server infrastructure resulting in serving of knowledge models and (at the user's option, when such option is provided to the user) knowledge assets.

Search functionality of embodiments of the present invention benefits from two important areas of innovation. First, as an implementation of imaged-based search, visual representations of knowledge—knowledge models—interlinked by users through a crowd sourcing procedure, are employed both as a way to show knowledge efficiently but also to enable fast navigation across the network graph of these images. A user may select a knowledge model and be presented with a very relevant set of linked knowledge models, continuing to explore in this way until presented with one or more knowledge models of particular interest. At this point, the user may request search results relevant to the context suggested by this knowledge model and possibly other inputs. Search results may include more knowledge models, publications, people, etc.

Second, embodiments of the invention allow navigation across a plurality of network graphs, including the network graph of knowledge models. Furthermore, this set of network graphs dynamically represents static and evolving knowledge through interlinking using a crowd-sourced schema, as discussed below. The crowd-sourced schema uses a protocol for establishing a new knowledge model and links to knowledge models, as discussed in connection with FIGS. 24-26 below. Interlinked knowledge objects within a category, such as knowledge models, comprise a network graph (FIG. 1). In this process, a user may select a knowledge object from a first network graph (for example, a knowledge model, publication, person, etc.), and be presented with a very relevant set of linked knowledge objects from the first network graph (FIG. 3). The user may continue to explore in this way until presented with one or more knowledge objects of particular interest. Each knowledge object is linked to a set of knowledge assets (FIG. 2), including other knowledge objects and also items that contain relevant information but are not part of a network graph (for example, data sets). Upon selection of a knowledge object and submission of a search request, a user is presented with a set of relevant knowledge assets related to the selected knowledge object (FIG. 3). The set of these knowledge assets can include knowledge objects that are contained in a second network graph and belong to a distinct category. By selecting a knowledge object from a second network graph, the user will be presented with a very relevant set of knowledge objects from the second network graph, and the search process can continue by navigation on the second network graph. In this way, a search may be conducted on any number of network graphs by selection of knowledge objects found in search results.

FIG. 1 is a schematic representation of a network graph of a collection of knowledge models in the same category, where a line between two knowledge models represents a linkage, and wherein each linkage is crowd sourced, in accordance with an embodiment of the present invention. A network graph includes knowledge objects from a category of knowledge objects. In this representation, the knowledge objects are knowledge models KO1, KO2, KO3, KO4, and KO5. Knowledge objects in a network graph are interlinked by the crowd sourcing procedure described in the definition of "interlinking" above.

Figure 2:
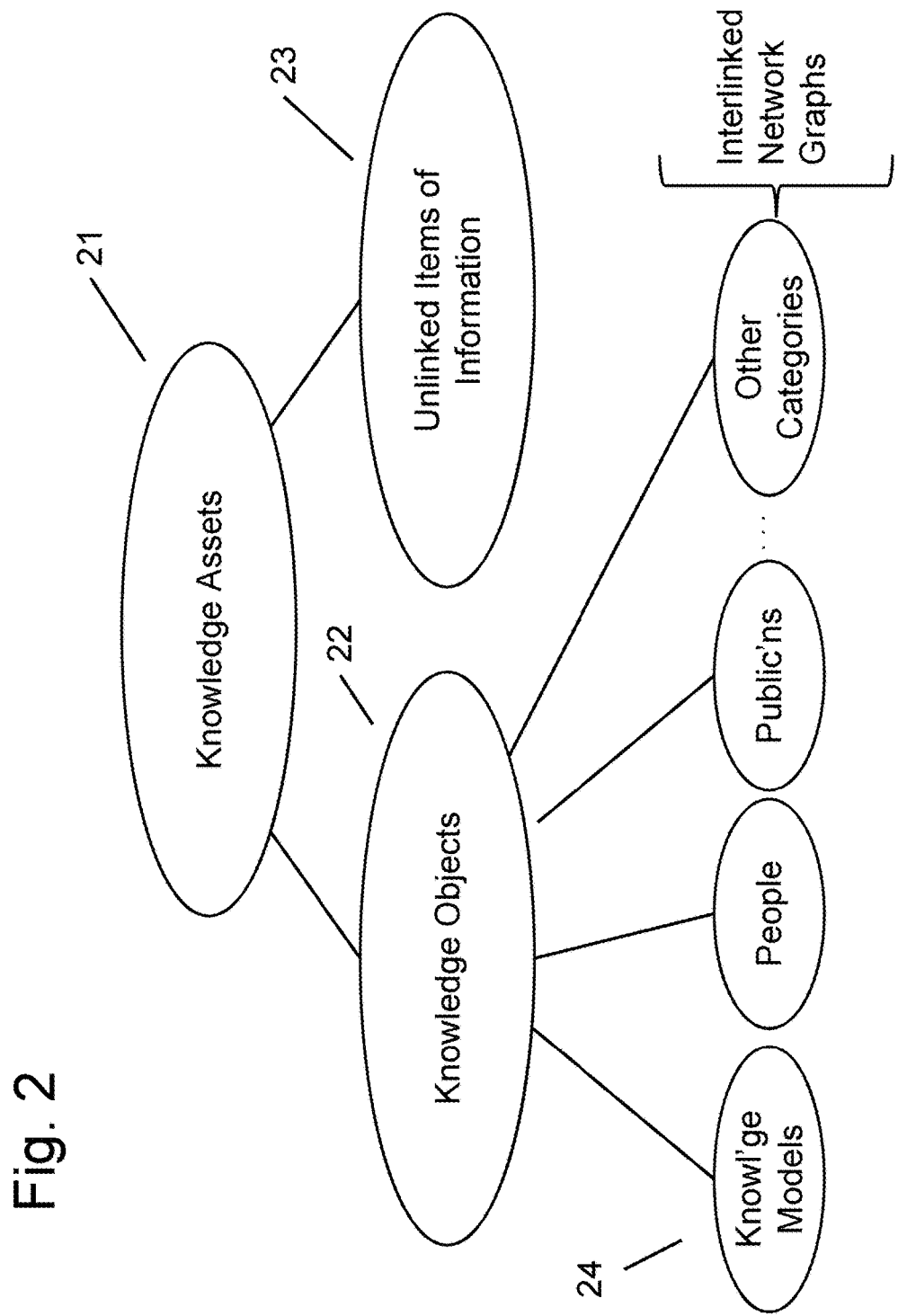
FIG. 2 is a schematic representation of a hierarchy including knowledge assets, knowledge objects, unlinked items of information, knowledge models, people, publications and other categories of knowledge objects, in accordance with an embodiment of the present invention.
Figure 3:
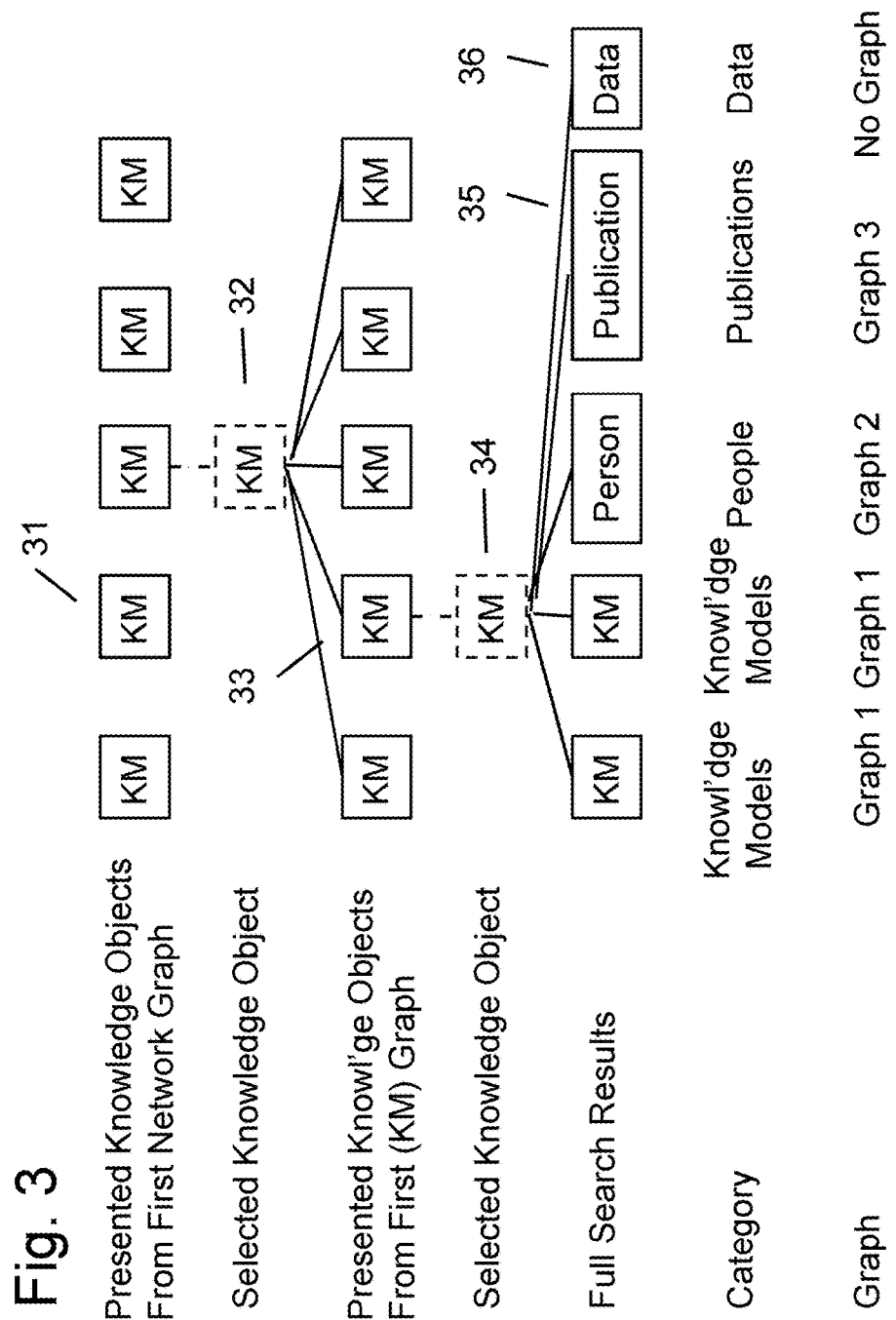
FIG. 3 is a schematic representation of a process by which a user, presented with a set of knowledge objects, can select a knowledge object from the set and use it as a basis for a search to obtain results from a plurality of network graphs and from a set of knowledge assets that are not included in a network graph, in accordance with an embodiment of the current invention.

FIG. 2 is a schematic representation of a hierarchy including knowledge assets, knowledge objects, unlinked items of information, knowledge models, people, publications and other categories of knowledge objects, in accordance with an embodiment of the present invention. Knowledge objects 22 are a subset of knowledge assets 21. Each knowledge object is a member of a category of knowledge objects. In an embodiment of the current invention, there can be a plurality of categories, wherein each category of knowledge objects forms a network graph and thus is interlinked. Knowledge models 24 are one category of knowledge objects. Other categories can include people, publications, etc. Some knowledge assets, identified as item 23, can be unlinked and thus not included in a network graph.

FIG. 3 is a schematic representation of a process by which a user, presented with a set of knowledge objects, can select a knowledge object from the set and use it as a basis for a search to obtain results from a plurality of network graphs and from a set of knowledge assets that are not included in a network graph, in accordance with an embodiment of the current invention. In the current embodiment, a user is presented with a set of knowledge models 31 from the knowledge model graph (the knowledgebase) and selects one knowledge model 32 from the presented set. The system receives the selection message from the user at the application interface servers and serves a set of interlinked knowledge models 33 for display to the user at the client computer. The user may continue to explore in this way through any number of cycles of selection and presentation of knowledge objects from the first network graph, in this case knowledge models. The user may also select a knowledge model 34 from this set of knowledge models, indicating a request for full search results, and the system receives the selection message from the user at the application interface servers. The system serves a set of knowledge assets for display to the user at the client computer. These knowledge assets can be interlinked with the selected knowledge model. These presented knowledge assets can include knowledge objects from a plurality of network graphs, such as the publication category network graph 35, and can also include knowledge assets 36 that are not included in any network graph, such as data sets related to the selected knowledge model.

Figure 4:
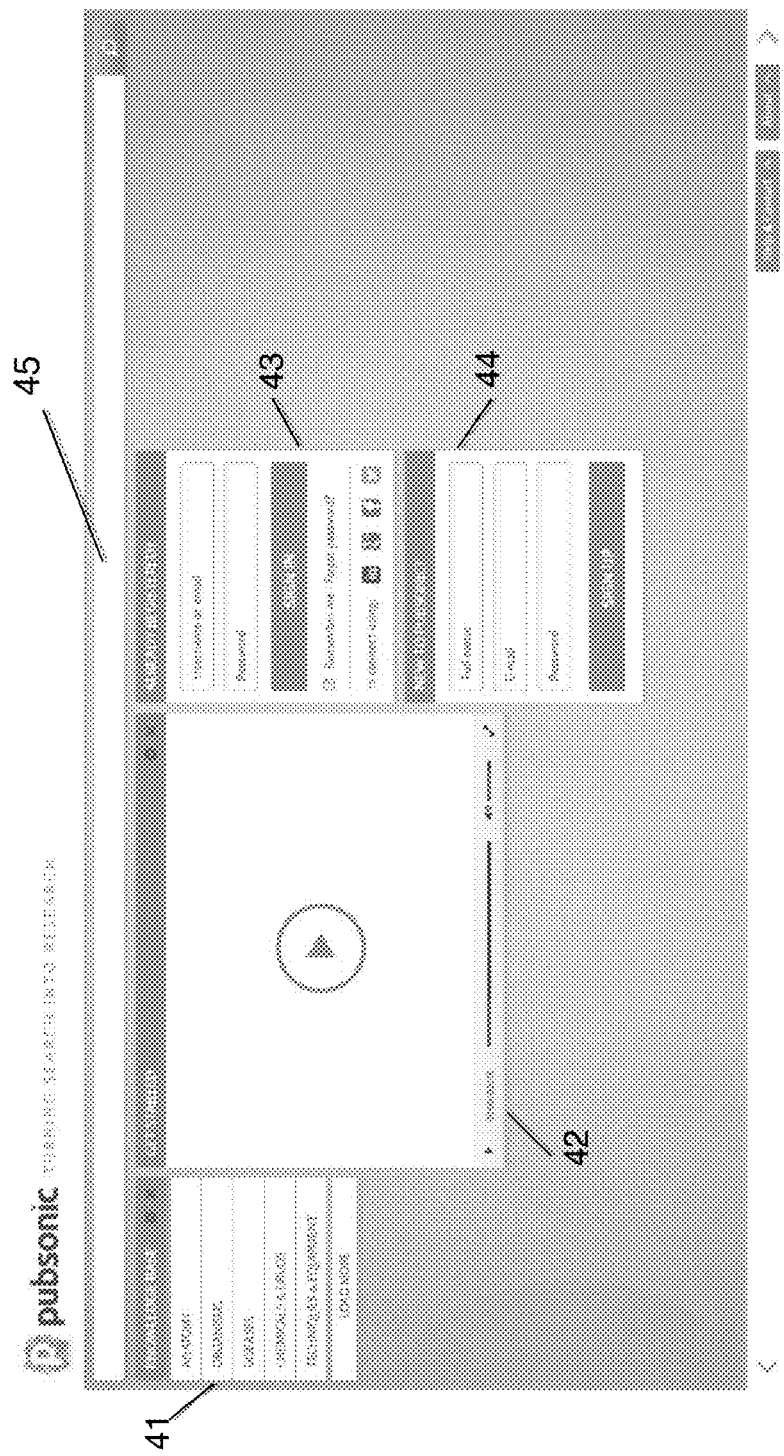
FIG. 4 is a representation of a display on a client computer of a home page, served by the server infrastructure, enabling a user to conduct a search, in accordance with an embodiment of the present invention, to log in, and to view a "Get Started" video.

FIG. 4 is a representation of a display on a client computer of a home page, served by the server infrastructure, enabling a user to conduct a search, in accordance with an embodiment of the present invention, to log in, and to view a "Get Started" video. A user may initially select the Get Started video 42, resulting in presentation from the server to the client server of an instructional video introducing the system and its features. A user may also register by supplying credentials in the sign-up section 44 of the screen. A registered user's profile information is stored in a core datastore. Optionally, as described in connection with FIGS. 16, 17, 19, 20, 21, 22, 23, and 24, the user has a personal library, studies, and administrative rights to submit comments, recommendations and other inputs available to other users, as well as access to real time updates. A registered user may choose to sign in using the sign-in section 43 of the screen. Alternatively, a user may begin exploration, without signing up or signing in, by entering keywords in the search bar 45 or selecting a menu item from the knowledgebase interface 41.

Figure 5:
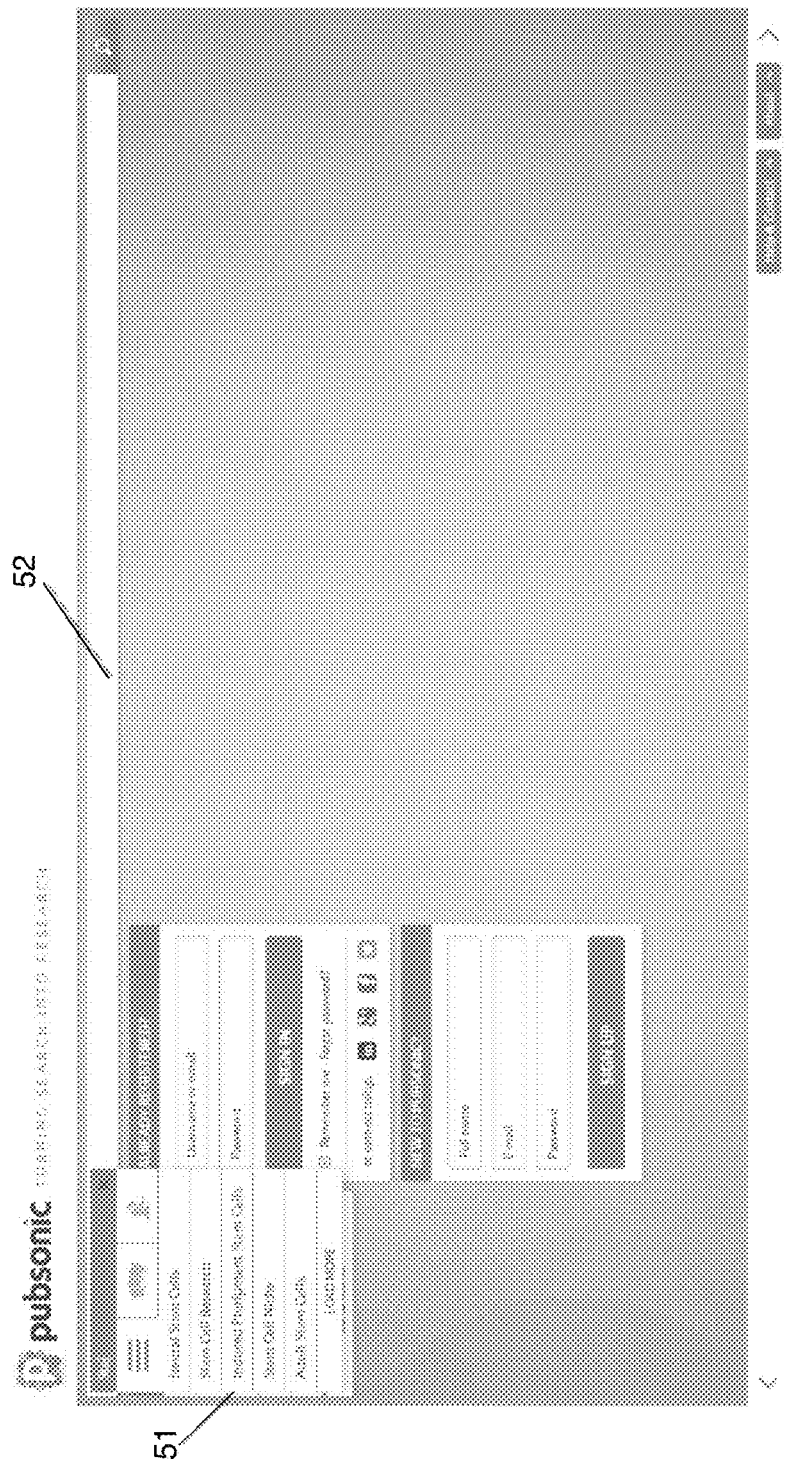
FIG. 5 is a representation of a display on a client computer of a web page served by the server infrastructure, enabling a user to enter key words to indicate an area of search interest, and receive from the server a menu of candidates which, if selected, complete the set of key words, in accordance with an embodiment of the present invention.

FIG. 5 is a representation of a display on a client computer of a web page served by the server infrastructure, enabling a user to enter key words to indicate an area of search interest, and receive from the server a menu of candidates which, if selected, complete the set of key words, in accordance with an embodiment of the present invention. If a user enters text into the search bar 52, servers receiving the entered text query a stored index of terms and select and present a menu 51 of these terms as a prompt for the user who may select them, resulting in their entry into the search bar by the system.

Figure 6:
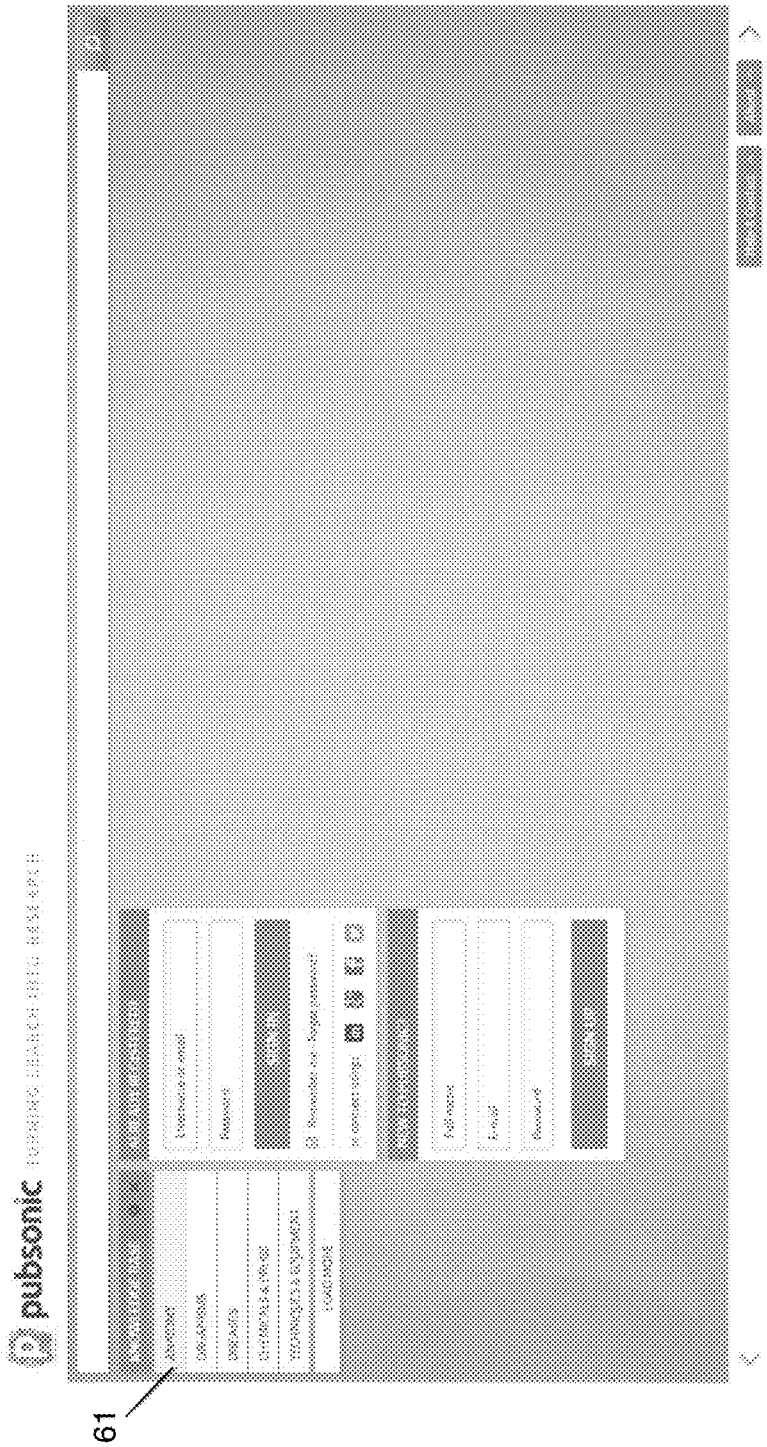
FIG. 6 is a representation of a display on a client computer of a web page, served by the server infrastructure, enabling a user to select an element from a menu of terms representing areas of possible search interest, resulting in serving from the server to the client computer of a set of KMs or additional menu terms, in accordance with an embodiment of the present invention.

FIG. 6 is a representation of a display on a client computer of a web page, served by the server infrastructure, enabling a user to select an element from a menu of terms representing areas of possible search interest, resulting in serving from the server to the client computer of a set of KMs or additional menu terms, in accordance with an embodiment of the present invention. A user may select an item from the knowledge base menu 61. When the system receives this selection message, a branching hierarchy of terms stored on the server is queried and, if available, the menu displayed on the client server interface is updated to serve the next level of terms in the hierarchy. In other words, the menu 61 is used to display terms as part of a taxonomy of knowledge applicable to knowledge models in the knowledgebase. At the same time, the system queries the knowledgebase to identify and serve the highest relevance ranked set of KMs associated with the indicated position on the hierarchy of terms. In an alternative embodiment, the knowledgebase contains and the system serves a default set of KMs associated with the indicated position on the hierarchy of terms.

Figure 7:
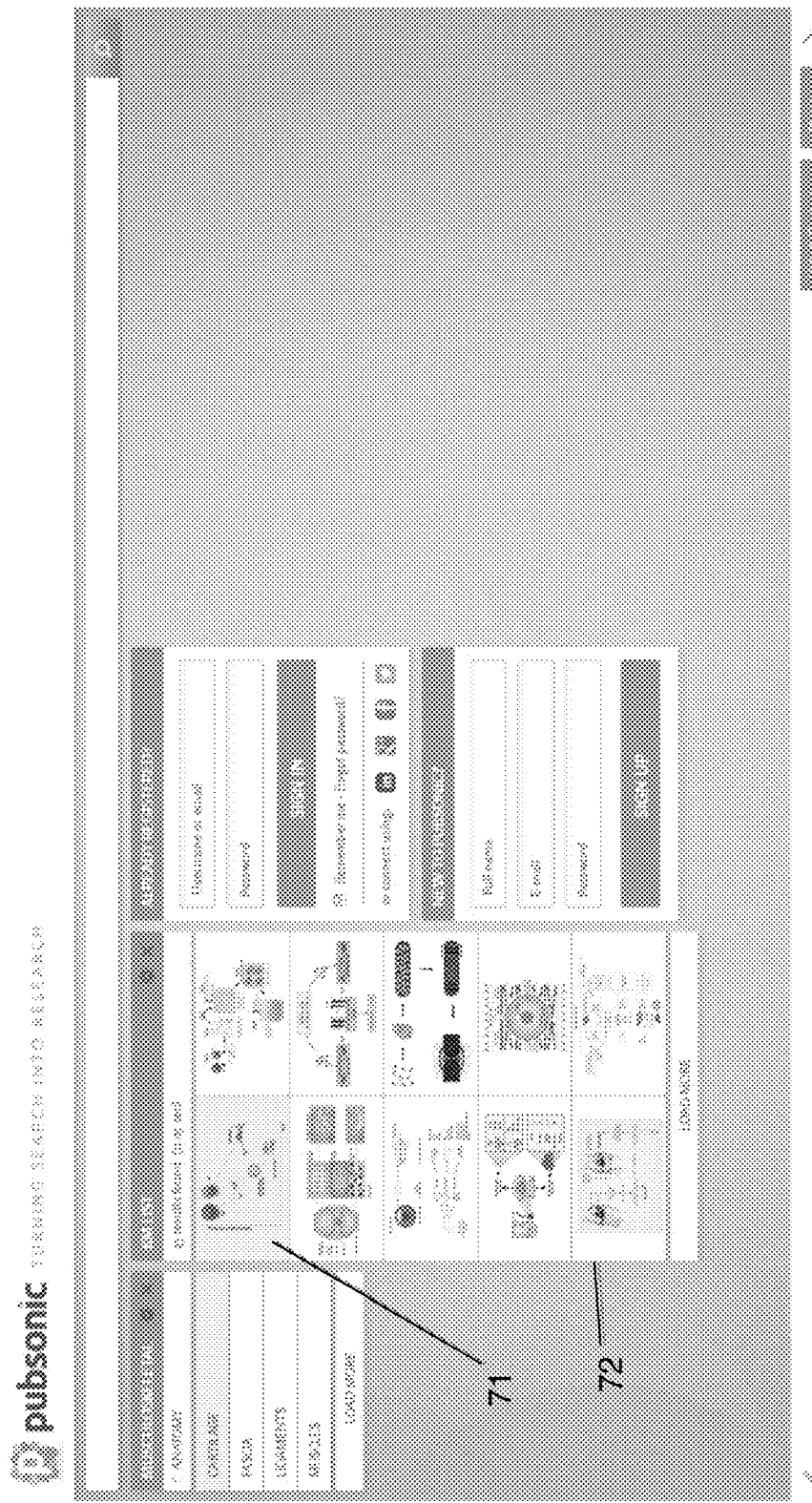
FIG. 7 is a representation of a display on a client computer of a web page, served by the server infrastructure, serving a set of KMs and enabling a user to select a KM from the set, resulting in serving from the server to the client computer of a set of related KMs, in accordance with an embodiment of the present invention.

FIG. 7 is a representation of a display on a client computer of a web page, served by the server infrastructure, serving a set of KMs and enabling a user to select a KM from the set, resulting in serving from the server to the client computer a set of related KMs, in accordance with an embodiment of the present invention. In this figure, the system displays on the client server interface a set 72 of KMs chosen by the approach identified in FIG. 6. A user may select 71 any presented KM. The application server receives the KM selection and initiates a query to the graph database cluster to identify the highest relevance interlinked KMs for the selected KM.

Figure 8:
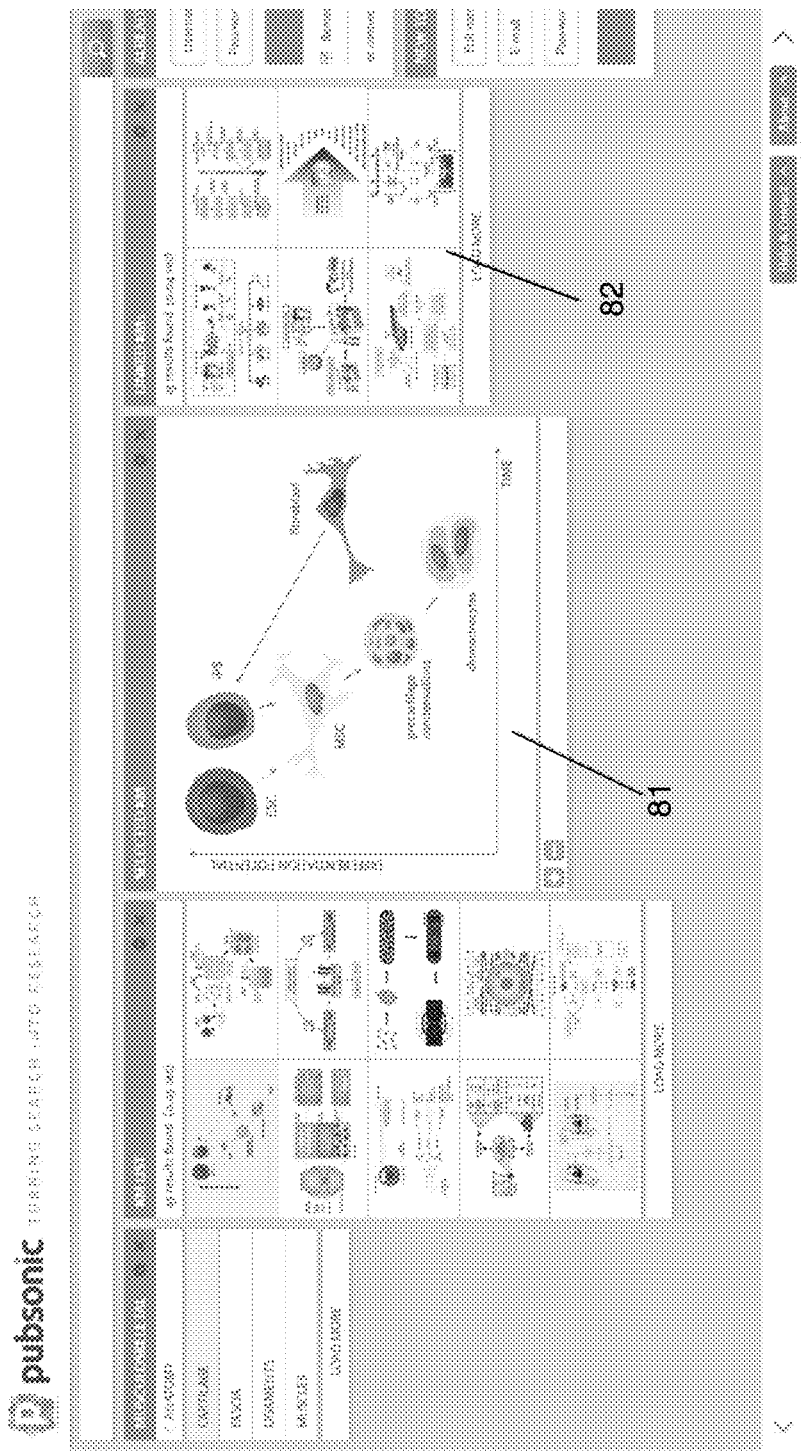
FIG. 8 is a representation of a display on a client computer of a web page, served by the server infrastructure in response to selection by the user of a KM, serving an expanded view of the selected KM and a set of related KMs, in accordance with an embodiment of the present invention.

FIG. 8 is a representation of a display on a client computer of a web page, served by the server infrastructure in response to selection by the user of a KM, serving an expanded view of the selected KM and a set of related KMs, in accordance with an embodiment of the present invention. In response to the query discussed in FIG. 7, the application servers and core function servers query the graph database cluster to identify the highest relevance interlinked KMs for the selected KM and display them 82 on the client server interface. A user may select the "load more" option to see additional KMs from this set. The selected KM is also displayed in enlarged format 81. Optionally, the user may minimize the initial set of KMs. The user may also explore the KM graph by selecting from the Linked KMs 82 or selecting any object within the enlarged KM 81, either action of which sends a selection request to the application server, resulting in the same query, identify and display response. In this mode the newly selected enlarged KM is presented to the right of the Linked KMs and the newly served Linked KMs are presented to the right of the new enlarged KM. In another, alternative embodiment, the initial Linked KMs and new enlarged KM would be replaced by the new versions. This cycle of exploration may be continued indefinitely.

Figure 9:
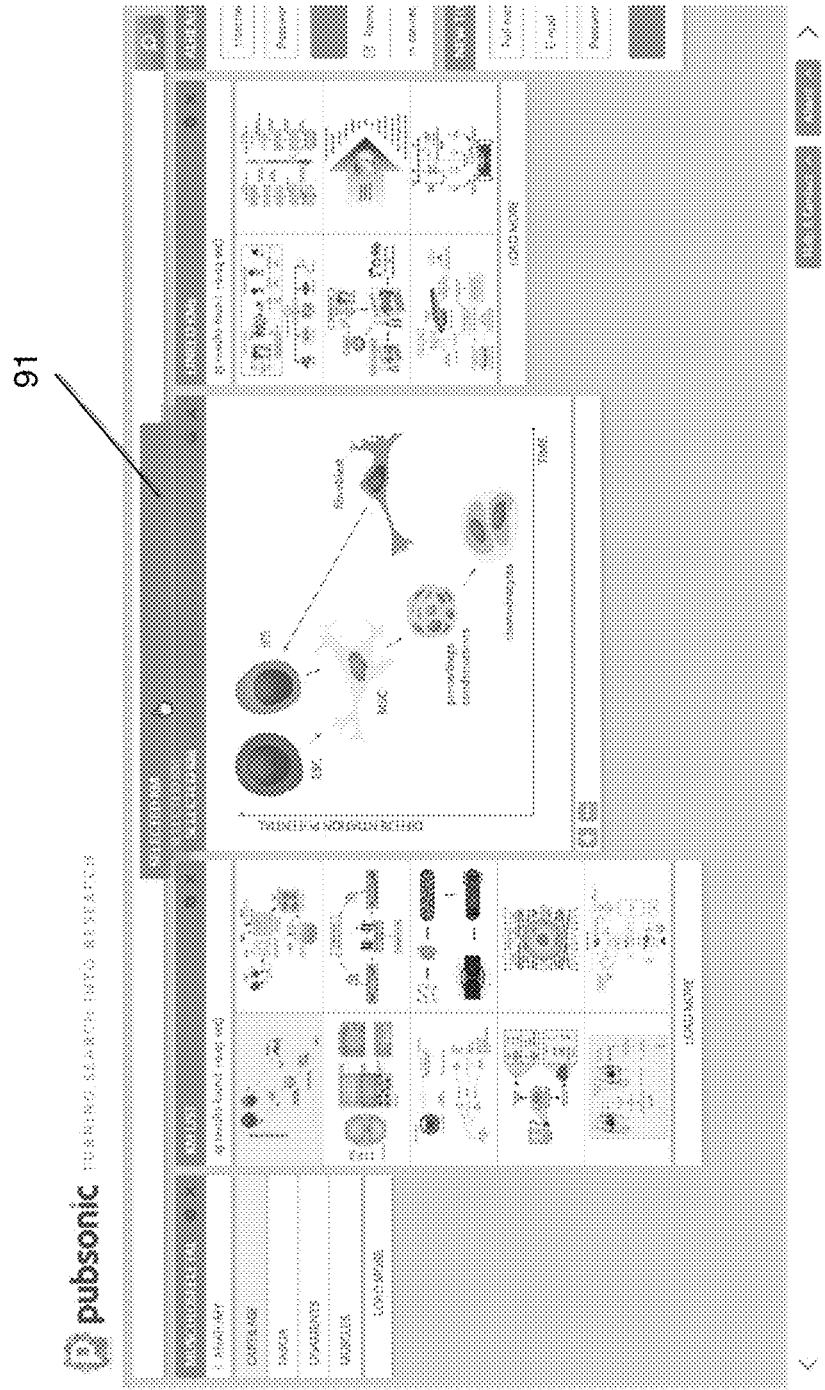
FIG. 9 is a representation of a display on a client computer of a web page, served by the server infrastructure, as shown in FIG. 8, and enabling a user to "drag and drop" the selected KM in its expanded view, into the search bar, resulting in initiation of a search and serving from the server to the client computer of a set of related KMs and knowledge assets, in accordance with an embodiment of the present invention.

FIG. 9 is a representation of a display on a client computer of a web page, served by the server infrastructure, as shown in FIG. 8, and enabling a user to "drag and drop" the selected KM in its expanded view, into the search bar, resulting in initiation of a search and serving from the server to the client computer a set of related KMs and knowledge assets, in accordance with an embodiment of the present invention. When a user chooses to initiate a full search to see relevant knowledge assets, he/she may drag and drop the selected KM 91 into the search bar. When the application servers receive this selection, a query is sent to the parsing system on the server, containing the full contents of the search bar, and a full search is initiated. Since each KM is tagged with related objects, such as keywords, publications, images and commentary, the search algorithms and ranking algorithms in the modules on the core function servers use this tagged information in their determination of relatedness and relevance.

Figure 10:
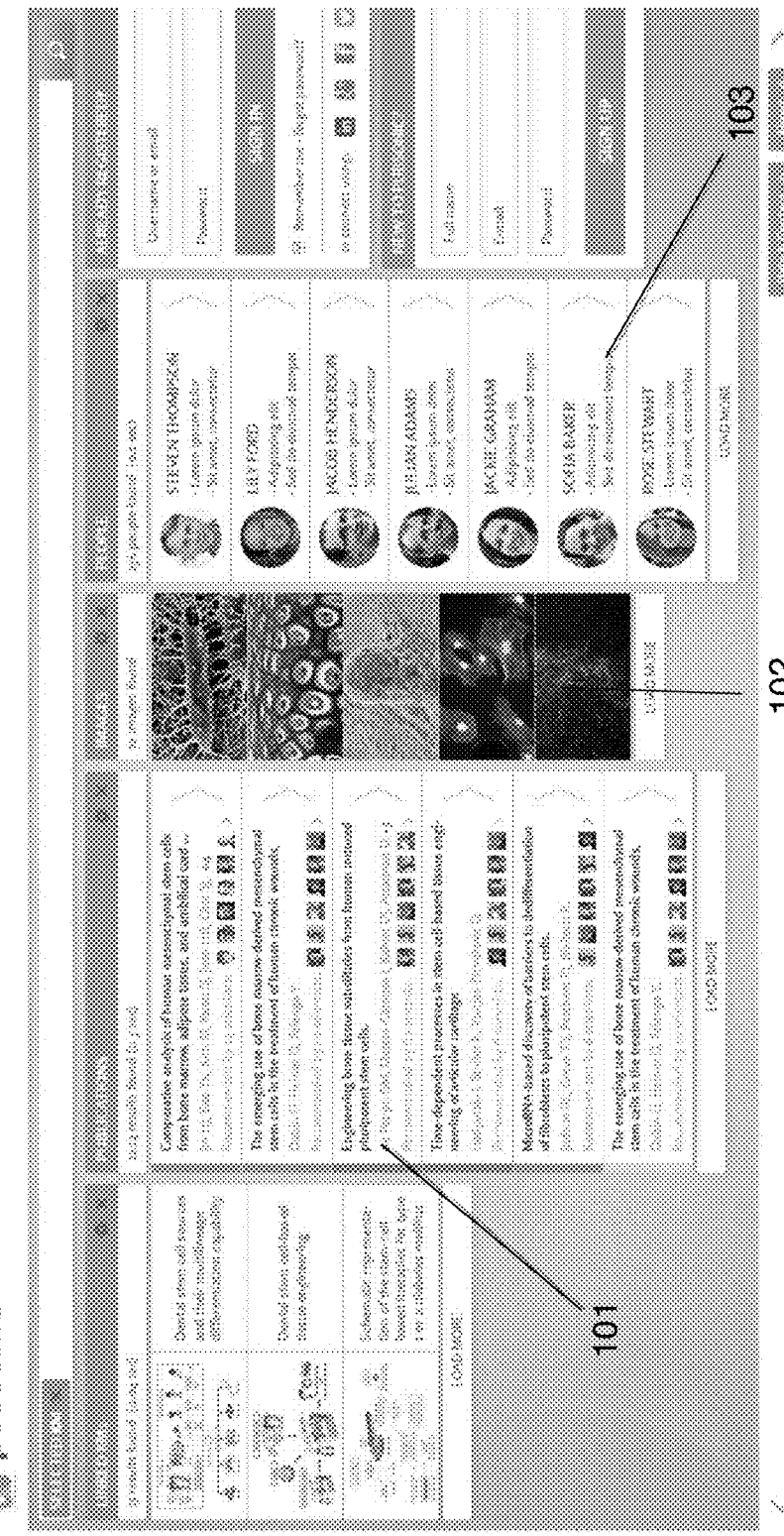
FIG. 10 is a representation of a display on a client computer of a web page, served by the server infrastructure, in response to a search request, serving a set of related knowledge assets, including a set of related publications, a set of related images, and a set of related people, in accordance with an embodiment of the present invention.

FIG. 10 is a representation of a display on a client computer of a web page, served by the server infrastructure, in response to a search request, serving a set of related knowledge assets, including a set of related publications, a set of related images, and a set of related people, in accordance with an embodiment of the present invention. The parsing module on the server creates separate query inputs in appropriate format for each search for each class of knowledge asset. The categories in this embodiment include publications, images and people. In addition, the parsing module creates a separate query for related KMs. This set of parsed queries is processed by separate search modules and thereafter by separate relevance ranking modules. Ranked search results are served to and displayed on the client server interface as a listing of KMs, publications 101, images 102, and people 103. These search results are knowledge assets and may include related information including, in the case of publications, a listing in the form of selectable picture icons of the users who have recommended the publication, and color coding to indicate the availability of a publication such as open access, subscription that are available, subscriptions that are unavailable, or other conditions. To produce ranked search results, a variety of ranking algorithms are known in the prior art and can utilized in embodiments of the present invention.

Figure 11:
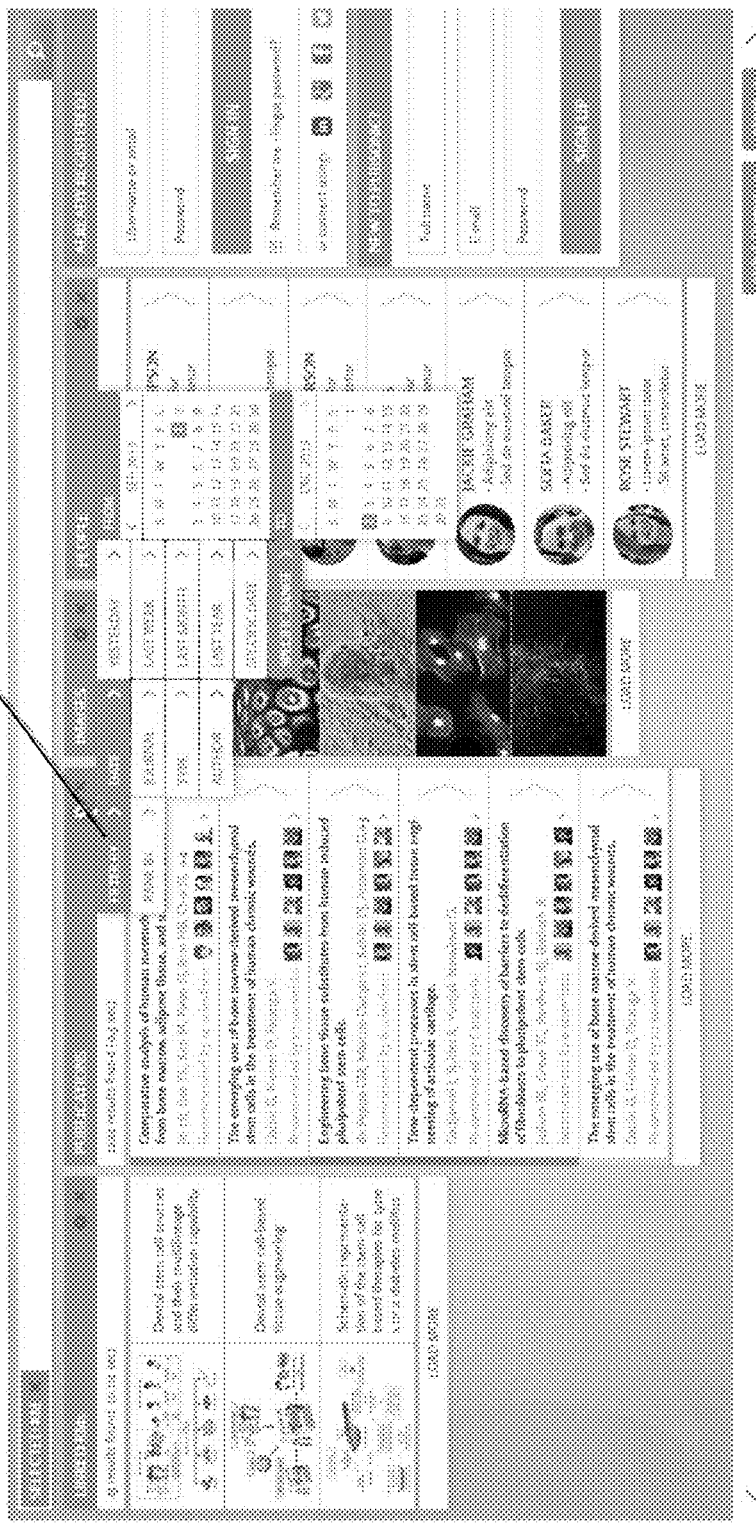
FIG. 11 is a representation of a display on a client computer of a web page, served by the server infrastructure, in response to selection by the user of a filter option from a web page similar to FIG. 10, enabling the user to select a set of dimensions by which to limit or define the characteristics of the served related knowledge assets, in accordance with an embodiment of the present invention.

FIG. 11 is a representation of a display on a client computer of a web page, served by the server infrastructure, in response to selection by the user of a filter option from a web page similar to FIG. 10, enabling the user to select a set of dimensions by which to limit or define the characteristics of the served related knowledge assets, in accordance with an embodiment of the present invention. Results displayed in each listing of knowledge assets may be filtered. A user selects the filter option and is presented by the server with a filter tool 111, which enables (in the case of publications) the option to limit the range of publications included in results by date of publication, author, journal or type of publication such as open access.

Figure 12:
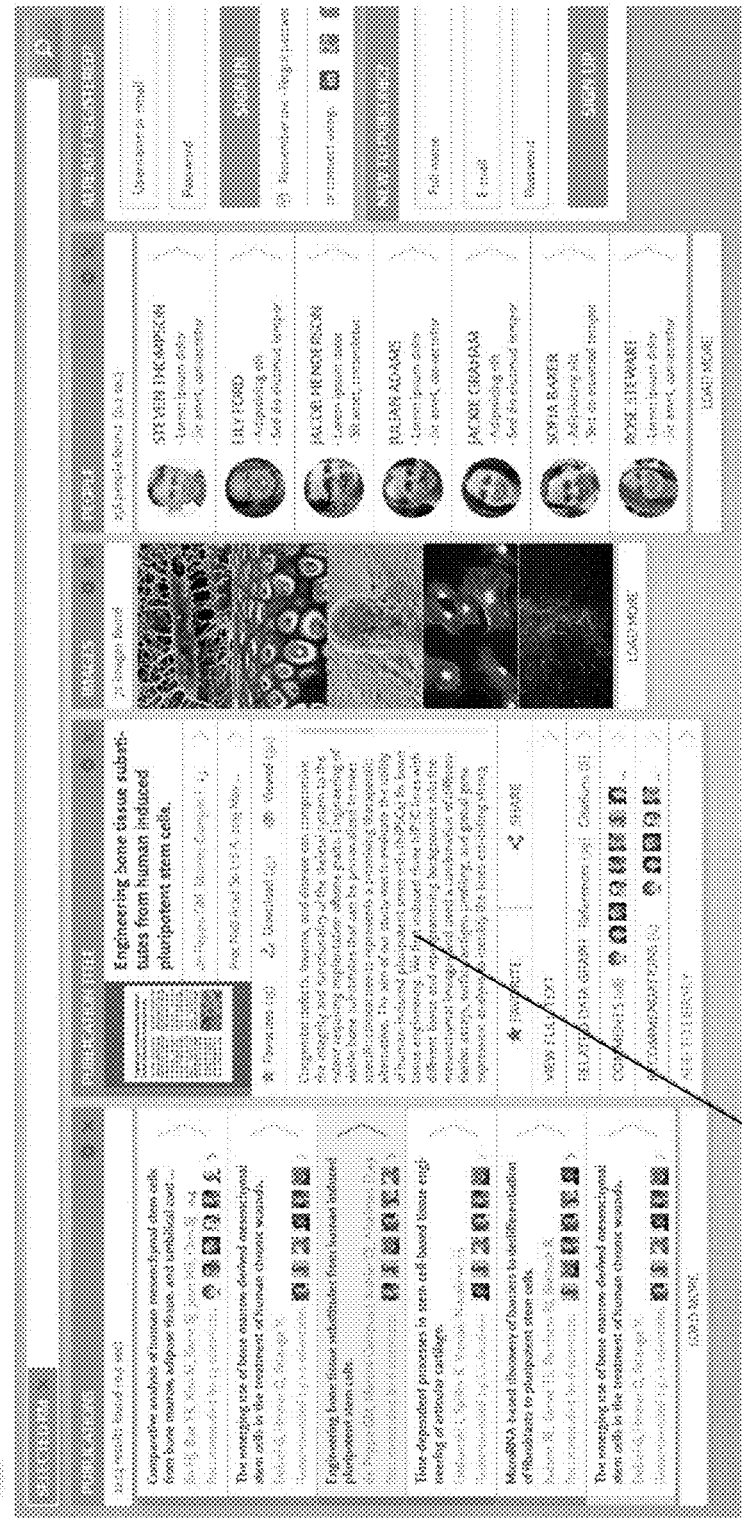
FIG. 12 is a representation of a display on a client computer of a web page, served by the server infrastructure, in response to selection by a user of an individual publication from a list of knowledge assets, displaying summary information about the selected publication, and enabling the user to select additional information, and to contribute commentary related to the publication, in accordance with an embodiment of the present invention.

FIG. 12 is a representation of a display on a client computer of a web page, served by the server infrastructure, in response to selection by a user of an individual publication from a list of knowledge assets, displaying summary information about the selected publication, and enabling the user to select additional information, and to contribute commentary related to the publication, in accordance with an embodiment of the present invention. In response to selection by the user of an individual publication, the system serves a panel 121 with more detailed information about that publication, retrieved from the core datastore, including title, authors, journal of publication, abstract, links to comments, links to recommendations, and number of favorites, downloads and views. The panel also includes links for favoriting, sharing, viewing full text of the publication, adding to the user's library, and viewing the related data graph.

Figure 13:
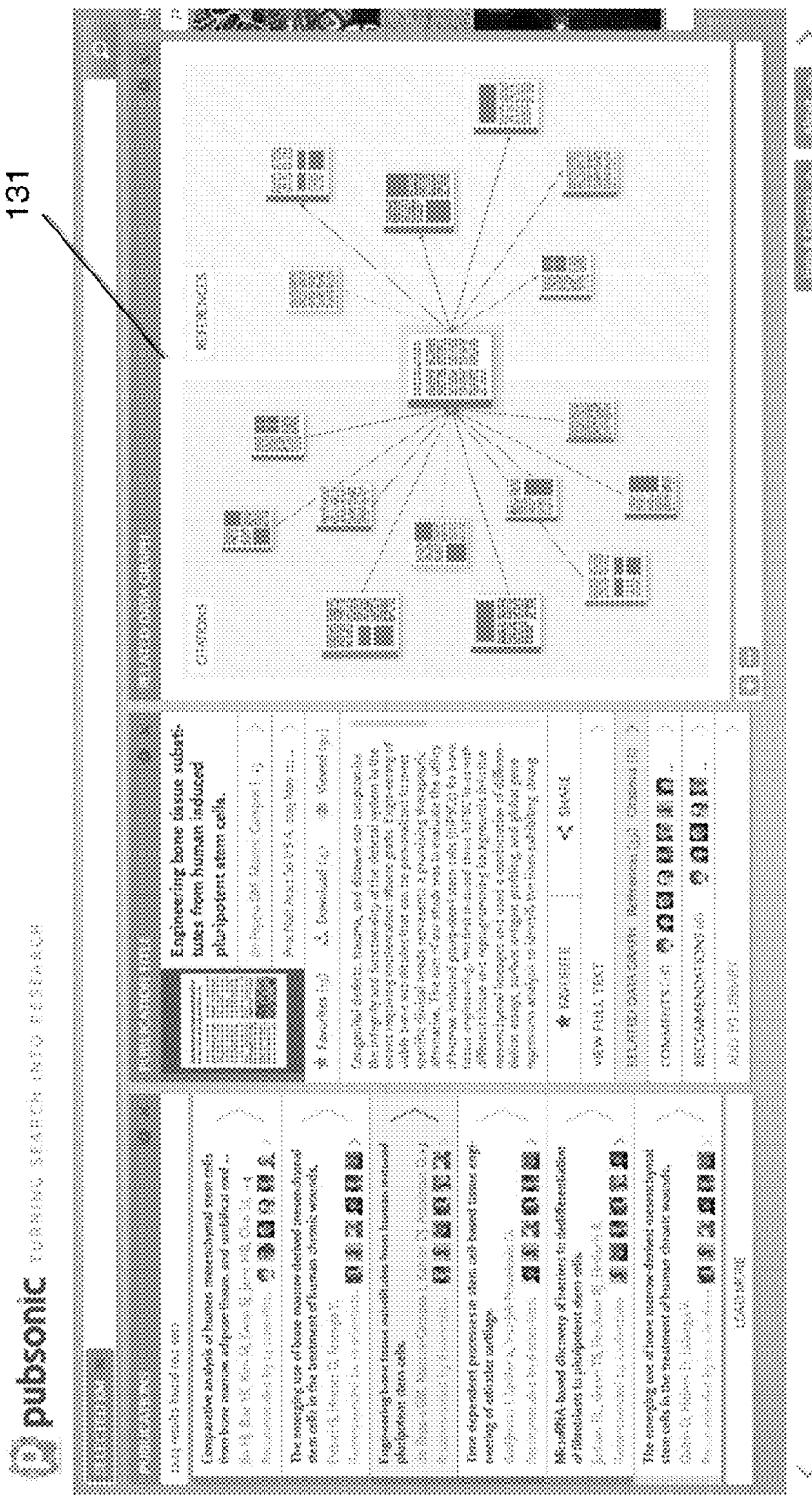
FIG. 13 is a representation of a display on a client computer of a web page, served by the server infrastructure, in response to selection by the user of the related data graph from a web page similar to FIG. 12, displaying the related data graph and enabling the user to select a related publication from the related data graph, beginning navigation of the related data graph, in accordance with an embodiment of the present invention.

FIG. 13 is a representation of a display on a client computer of a web page, served by the server infrastructure, in response to selection by the user of the related data graph from a web page similar to FIG. 12, displaying the related data graph and enabling the user to select a related publication from the related data graph, beginning navigation of the related data graph, in accordance with an embodiment of the present invention. When the related data graph is selected from a publication view, the server receiving the request queries the graph database cluster to identify the most relevant publications interlinked by citation or reference and serves to the client server interface a graphical display 131 of the selected publication and its most relevant immediately interlinked publications according to the citation graph algorithms. These algorithms may be customized by or based on information about the user, and relevance rankings will depend on these customizations if applicable. The graphical display, in the current embodiment, may be divided visually to show citations by the publication separately from references to the publication.

Figure 14:
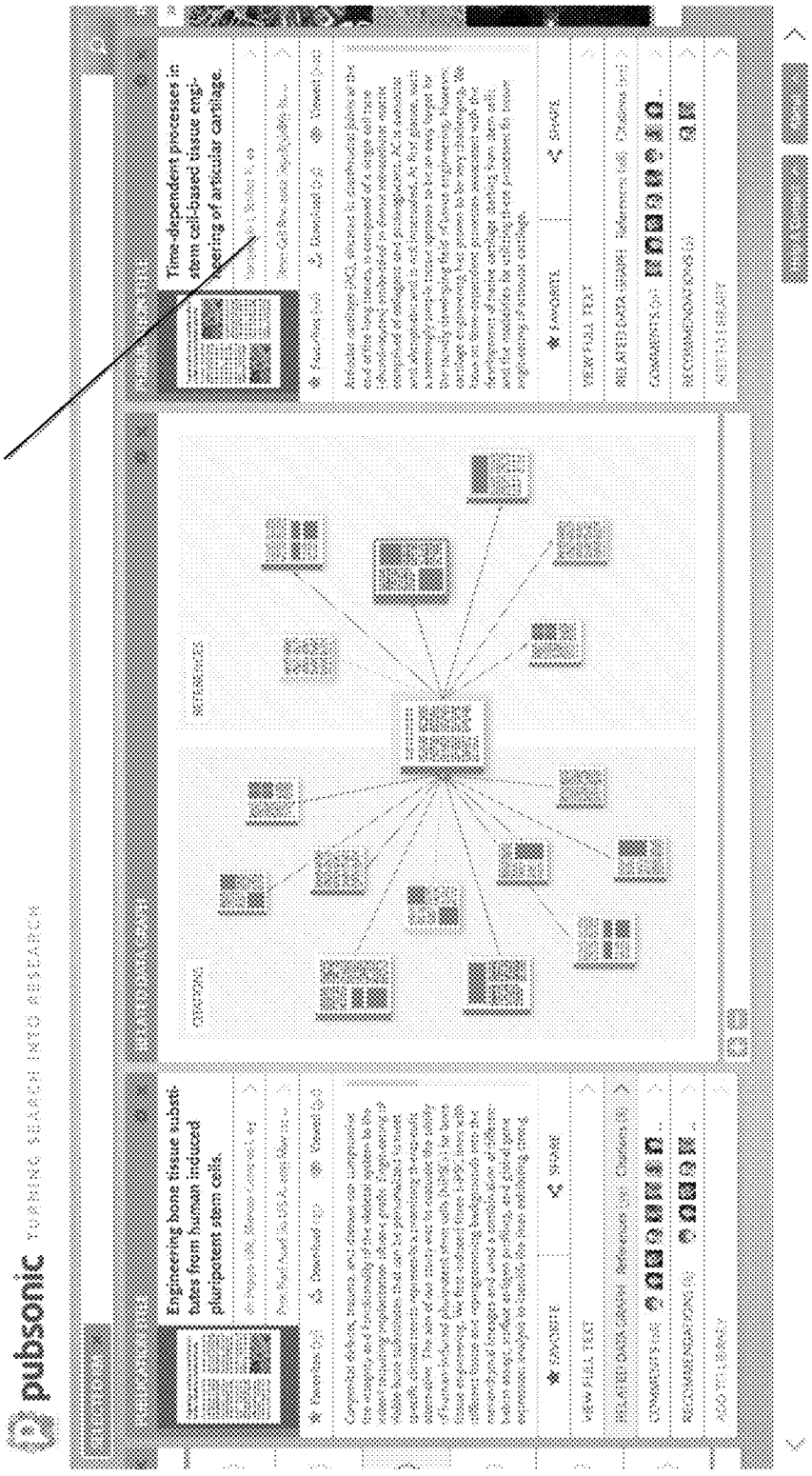
FIG. 14 is a representation of a display on a client computer of a web page, served by the server infrastructure, in response to selection by the user of an individual related publication from a related data graph presented on a web page similar to FIG. 13, displaying summary information about the selected publication, and enabling the user to select additional information, and to contribute commentary related to the publication, in accordance with an embodiment of the present invention.

FIG. 14 is a representation of a display on a client computer of a web page, served by the server infrastructure, in response to selection by the user of an individual related publication from a related data graph presented on a web page similar to FIG. 13, displaying summary information about the selected publication, and enabling the user to select additional information, and to contribute commentary related to the publication, in accordance with an embodiment of the present invention. In response to selection by the user of an individual publication, the system serves a panel 141, similar to 121, with more detailed information about that publication, retrieved from the core datastore, including title, authors, journal of publication, links to comments, links to recommendations, and number of favorites, downloads and views. The panel also includes links for favoriting, sharing, viewing full text of the publication, and viewing the related data graph.

Figure 15:
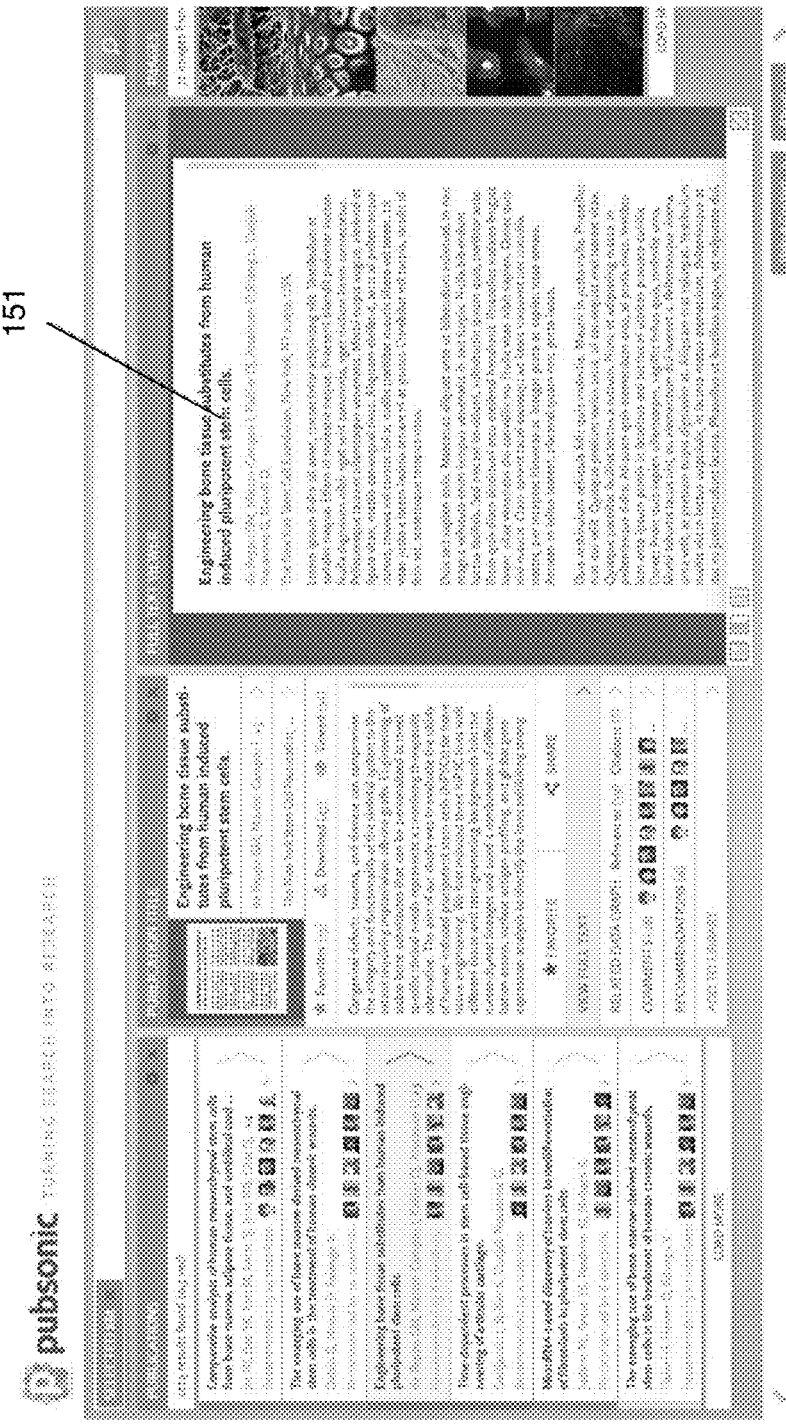
FIG. 15 is a representation of a display on a client computer of a web page, served by the server infrastructure, in response to selection by the user of the full text view from a web page similar to FIG. 12, displaying the full text view of the selected publication and enabling the user to read and annotate the publication view, in accordance with an embodiment of the present invention.

FIG. 15 is a representation of a display on a client computer of a web page, served by the server infrastructure, in response to selection by the user of the full text view from a web page similar to FIG. 12, displaying the full text view of the selected publication and enabling the user to read and annotate the publication view, in accordance with an embodiment of the present invention. From any publication panel, such as 141 or 121, a user may select the full text view option. Upon receipt of this selection, the server will query the core datastore to find the full text file for the selected publication, and serve the file in the full text viewer format 151 to the client server interface. The full text view enables highlighting and addition of comments by the user, where highlights or comments are stored in the core datastore with the publication. The full text view also allows for storing reference information for later import into a study manuscript.

Figure 16:
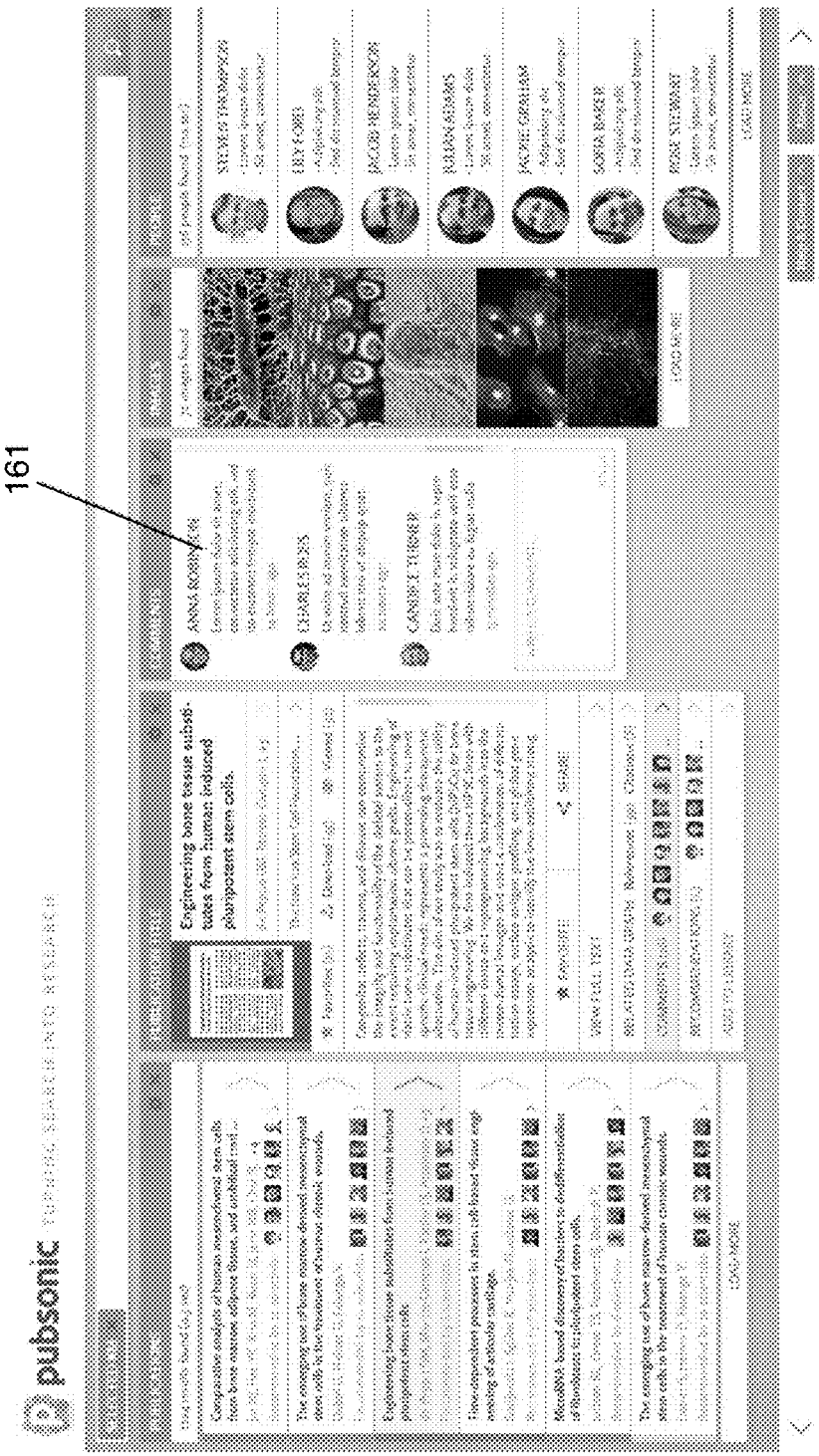
FIG. 16 is a representation of a display on a client computer of a web page, served by the server infrastructure, in response to selection by the user of the comments option from a web page similar to FIG. 12, displaying the related comments from other users and enabling the user to add comments or to select people to request additional information, in accordance with an embodiment of the present invention.

FIG. 16 is a representation of a display on a client computer of a web page, served by the server infrastructure, in response to selection by the user of the comments option from a web page similar to FIG. 12, displaying the related comments from other users and enabling the user to add comments or to select people to request additional information, in accordance with an embodiment of the present invention. In response to the comments option selection by a user, the system queries the core datastore, identifies related comments, and displays on the client server interface a listing 161 of the most relevant comments, along with a text box for receiving and serving to the application servers comments entered by the user.

Figure 17:
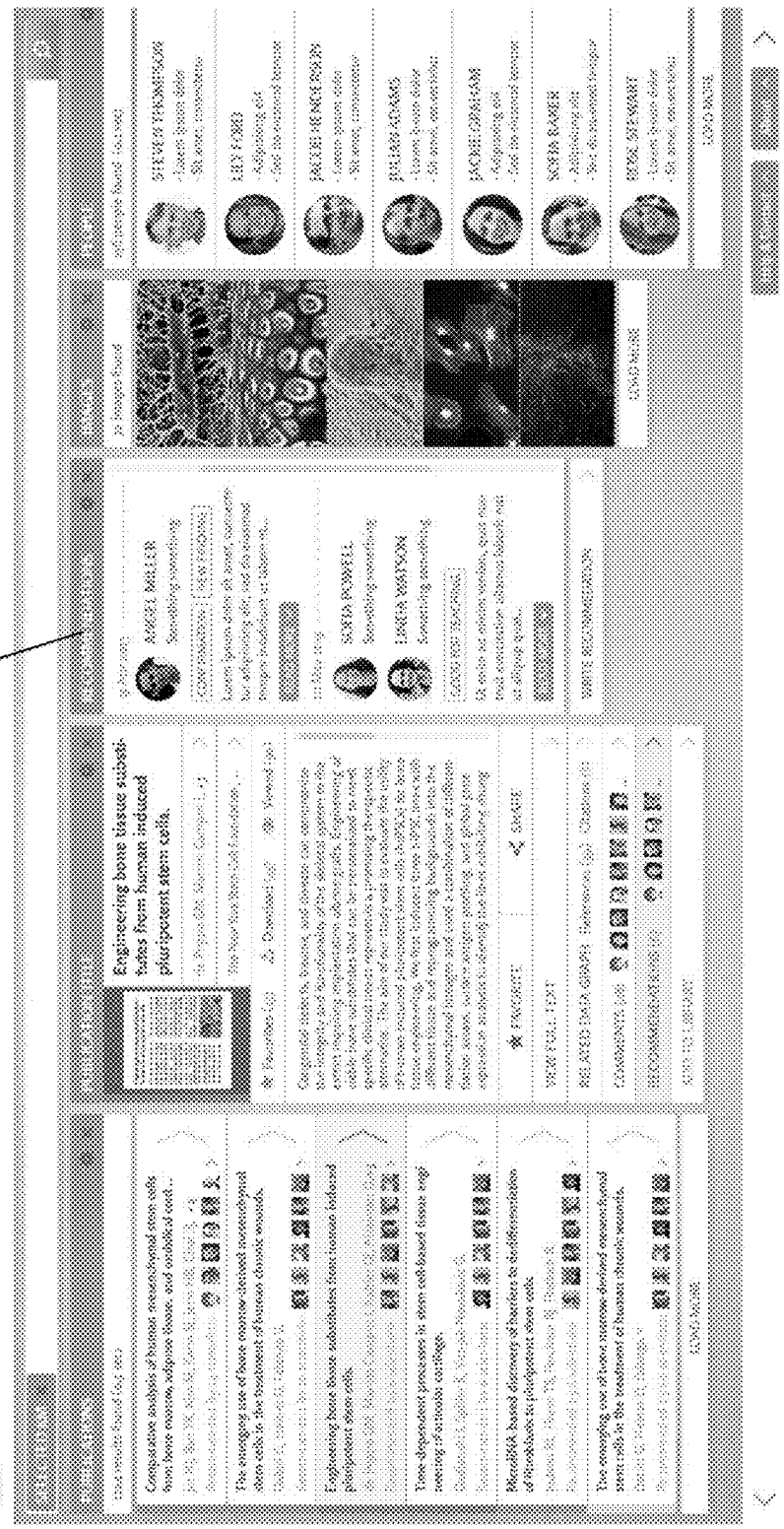
FIG. 17 is a representation of a display on a client computer of a web page, served by the server infrastructure, in response to selection by the user of the recommendations option from a web page similar to FIG. 12, displaying the recommendations from other users and enabling the user to add a recommendation or to select people to request additional information, in accordance with an embodiment of the present invention.

FIG. 17 is a representation of a display on a client computer of a web page, served by the server infrastructure, in response to selection by the user of the recommendations option from a web page similar to FIG. 12, displaying the recommendations from other users and enabling the user to add a recommendation or to select people to request additional information, in accordance with an embodiment of the present invention. In response to the recommendations option selection by a user, the system queries the core datastore, identifies related recommendations, and displays on the client server interface a listing 171 of the most relevant recommendations, along with a selectable link for accessing a text box for receiving and serving to the application servers comments entered by the user.

Figure 18:
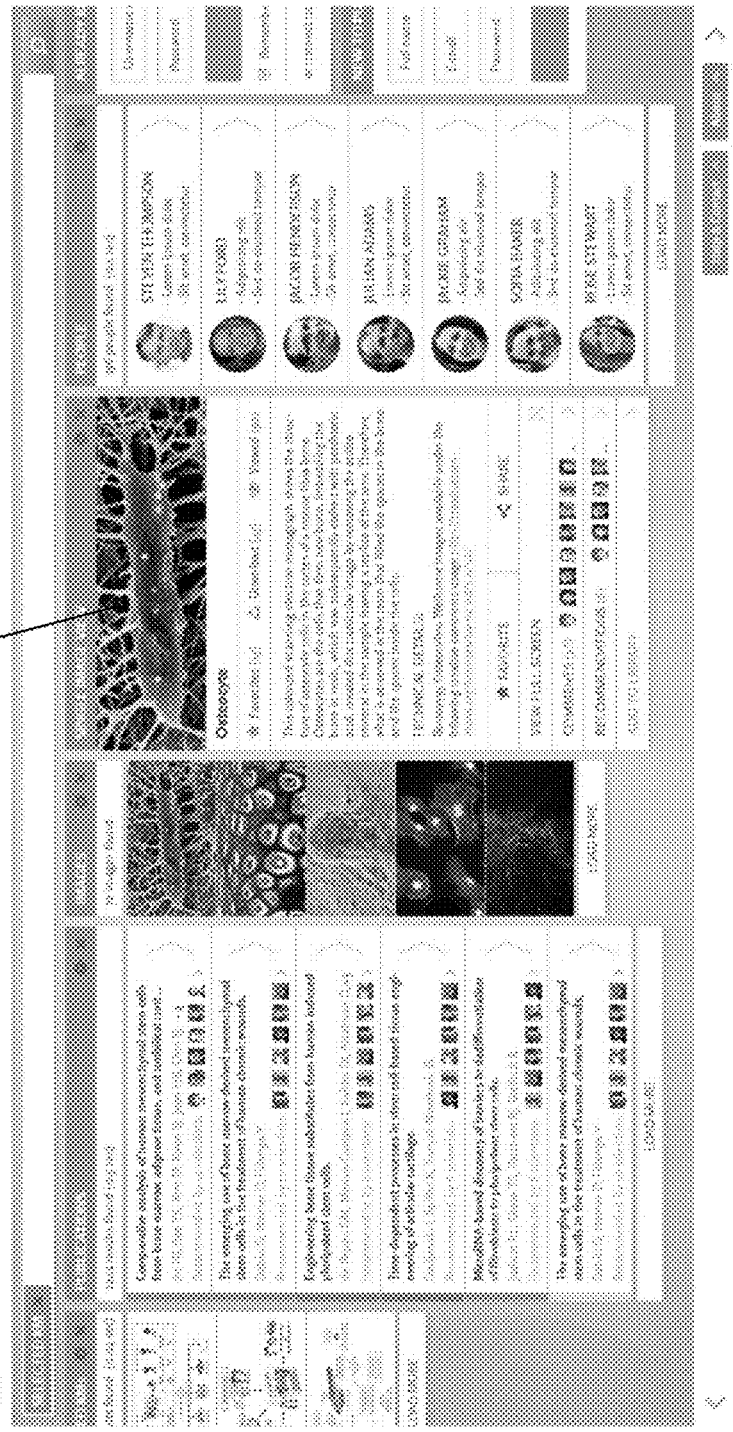
FIG. 18 is a representation of a display on a client computer of a web page, served by the server infrastructure, in response to selection by a user of an individual image, displaying summary information about the selected image, and enabling the user to select additional information, and to contribute commentary related to the image, in accordance with an embodiment of the present invention.

FIG. 18 is a representation of a display on a client computer of a web page, served by the server infrastructure, in response to selection by a user of an individual image, displaying summary information about the selected image, and enabling the user to select additional information, and to contribute commentary related to the image, in accordance with an embodiment of the present invention. In response to selection by the user of an individual image, the system serves a panel 181 with more detailed information about that image, retrieved from the core datastore, including description, technical details, links to comments, links to recommendations, and number of favorites, downloads and views. The panel also includes links for favoriting, sharing, displaying an enlarged view of the image, and adding to the user's library.

Figure 19:
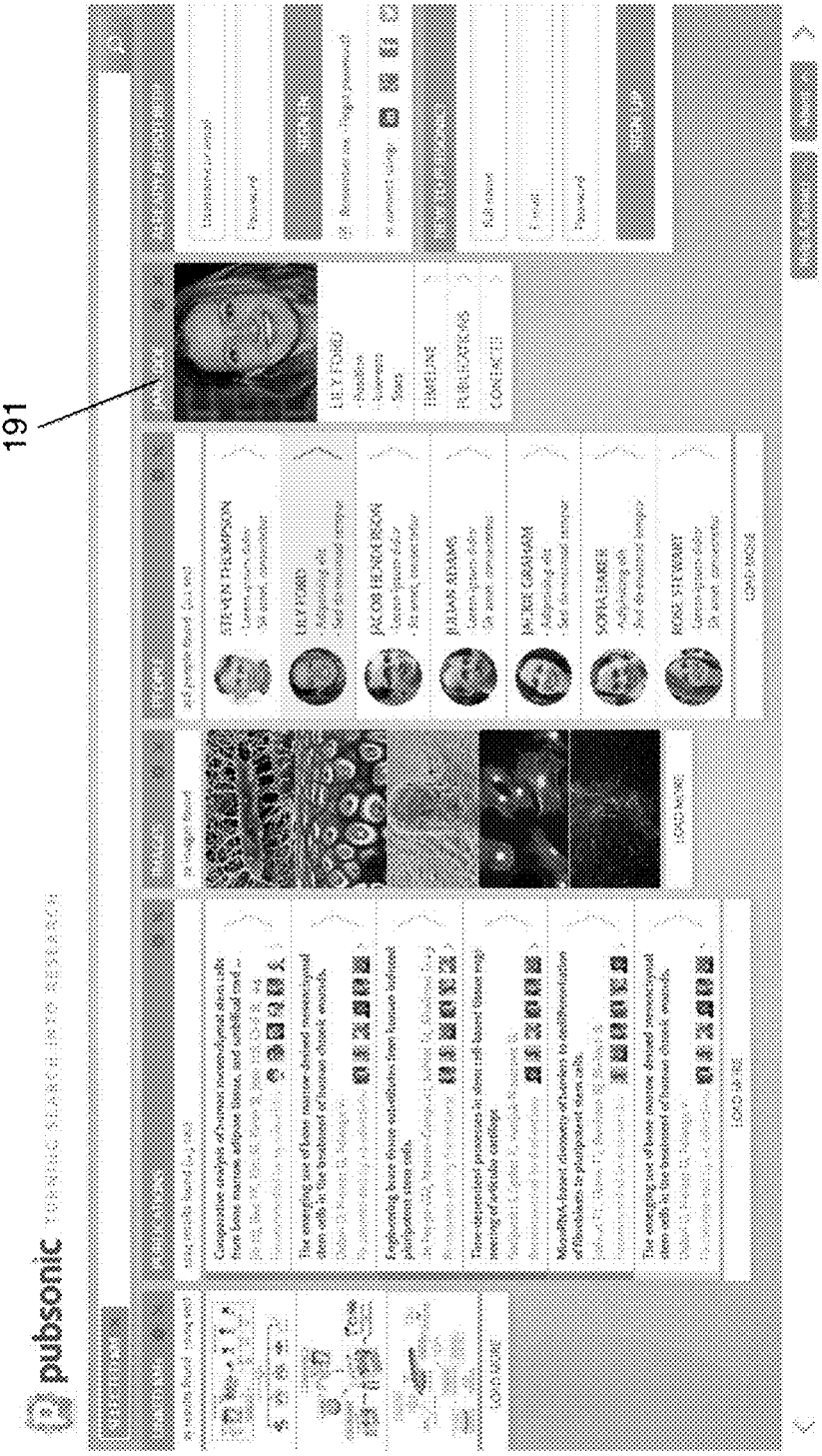
FIG. 19 is a representation of a display on a client computer of a web page, served by the server infrastructure, in response to selection by a user of an individual person, displaying summary information about the selected person, and enabling the user to select additional information, in accordance with an embodiment of the present invention.

FIG. 19 is a representation of a display on a client computer of a web page, served by the server infrastructure, in response to selection by a user of an individual person, displaying summary information about the selected person, and enabling the user to select additional information, in accordance with an embodiment of the present invention. In response to selection by the user of an individual person, the system serves a panel 191 with more detailed information about that person, retrieved from the core datastore, including name, position, interests, and summary statistics. The panel also includes links for viewing the person's activity timeline, publications and contacts.

Figure 20:
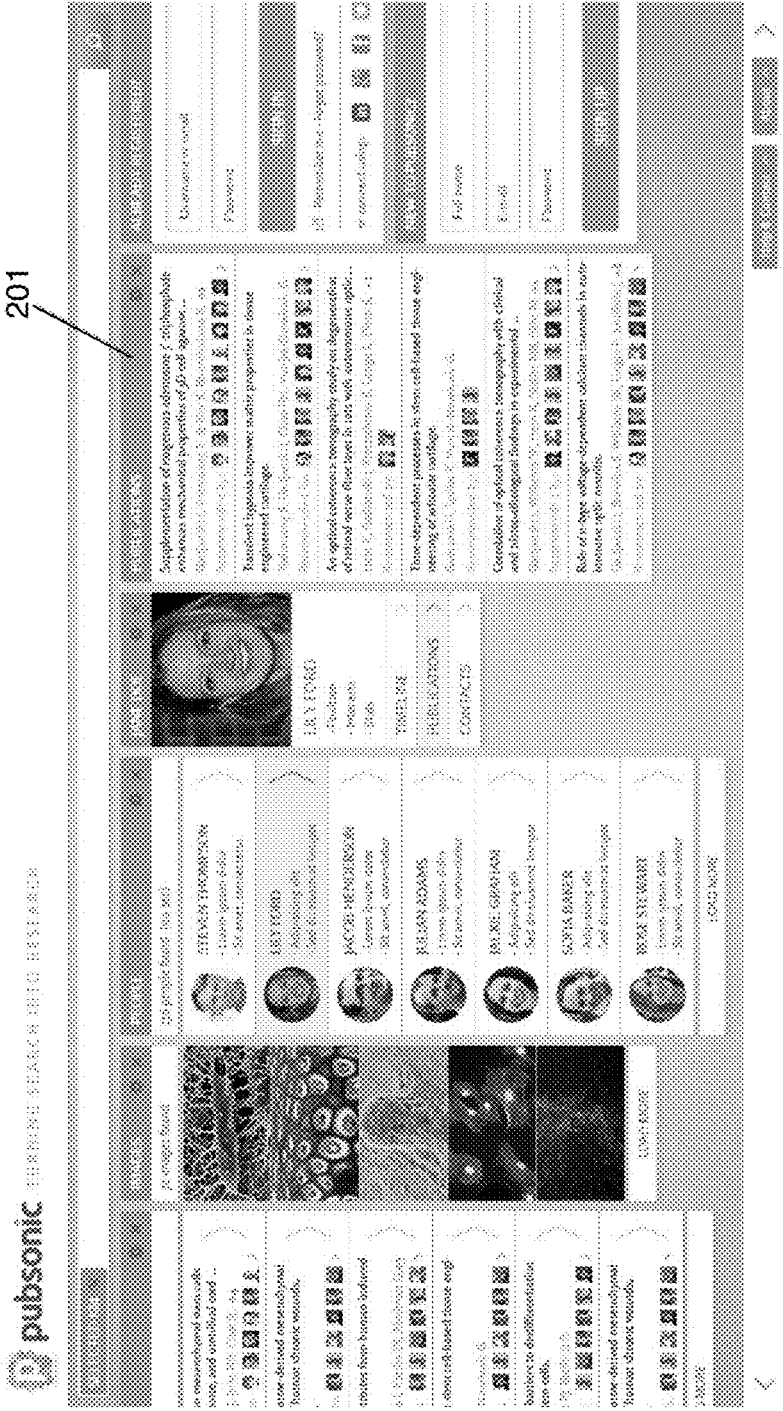
FIG. 20 is a representation of a display on a client computer of a web page, served by the server infrastructure, in response to selection by the user of the related publications from a web page similar to FIG. 19, displaying the related publications and enabling the user to select a related publication to request additional information, in accordance with an embodiment of the present invention.

FIG. 20 is a representation of a display on a client computer of a web page, served by the server infrastructure, in response to selection by the user of the related publications from a web page similar to FIG. 19, displaying the related publications and enabling the user to select a related publication to request additional information, in accordance with an embodiment of the present invention. In response to such a request for publication information the system serves the publication panel 201, listing related publications.

Figure 21:
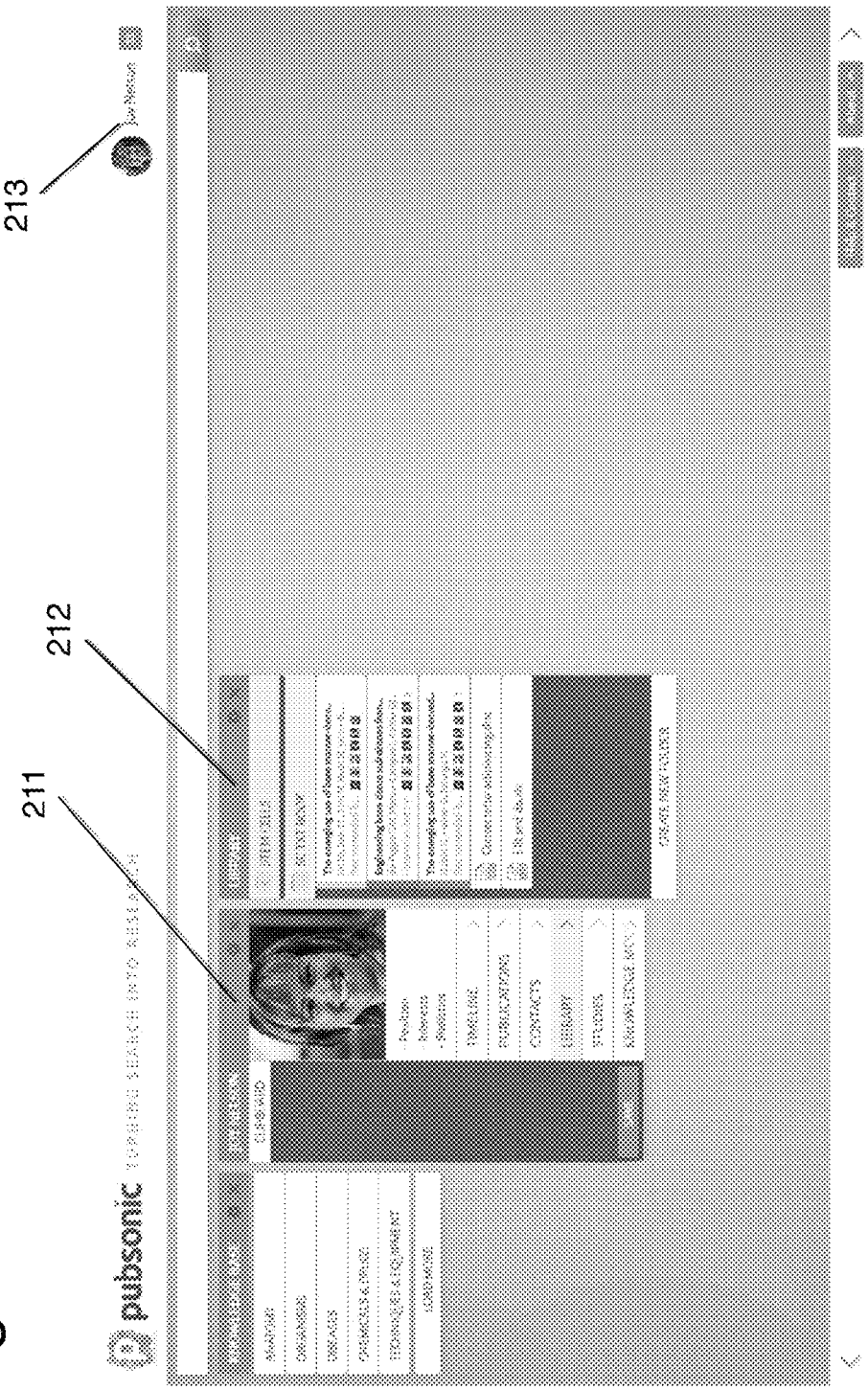
FIG. 21 is a representation of a display on a client computer of a web page, served by the server infrastructure, in response to selection by the user of the user's profile and further selection by the user of the user's library, displaying the profile information and publication library, and enabling the user to request additional information from the profile or to select an individual publication from the library or from a folder within the library, in accordance with an embodiment of the present invention.

FIG. 21 is a representation of a display on a client computer of a web page, served by the server infrastructure, in response to selection by the user of the user's profile and further selection by the user of the user's library, displaying the profile information and publication library in accordance with an embodiment of the present invention. A user may select the option to view his/her profile from the profile icon 213, and receive at the client server, in response to the request, a display of the user profile 211, which includes the user's clipboard for dragging and dropping knowledge assets possibly during a search process, summary information and links as in 191, and links to his/her library, studies, and knowledge models. In response to selection of the library option the system queries the core datastore, identifies and displays the user's private library in a library display panel 212. This panel contains a selectable and expandable visual representation of the user's library folder hierarchy, knowledge assets within the library, and a link for creation of a new folder.

Figure 22:
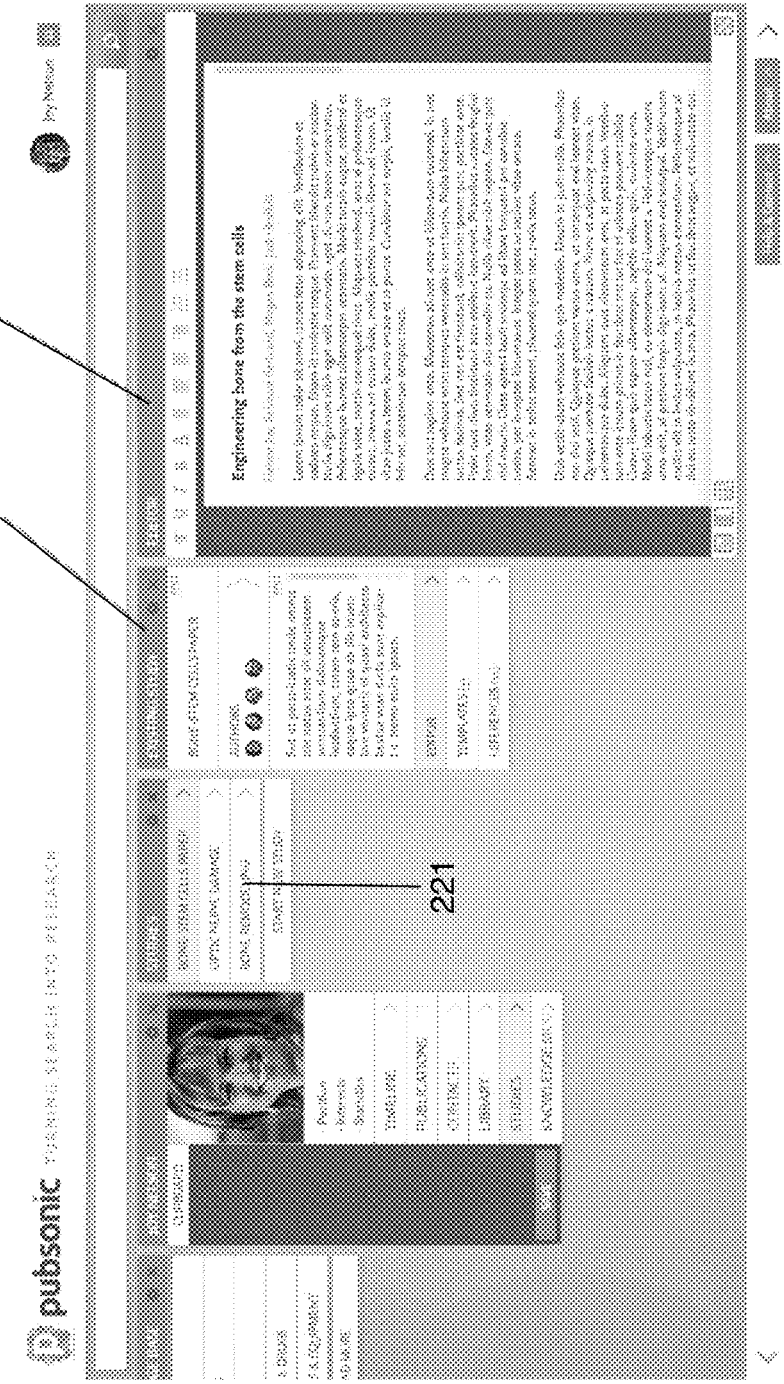
FIG. 22 is a representation of a display on a client computer of a web page, served by the server infrastructure, in response to selection by the user of the user's profile and further selection of the user's studies, an individual study, and the editor associated with that study, displaying the related information, and enabling the user to request additional information or to edit the manuscript associated with the selected study, in accordance with an embodiment of the present invention.

FIG. 22 is a representation of a display on a client computer of a web page, served by the server infrastructure, in response to selection by the user of the user's profile and further selection of the user's studies, an individual study, and the editor associated with that study, displaying the related information, and enabling the user to request additional information or to edit the manuscript associated with the selected study, in accordance with an embodiment of the present invention. In response to the user's selection of the studies option the server serves to the client server interface a panel 221 showing selectable user defined studies and a link for starting a new study. After user selection of an individual study, the server serves to the client server interface a panel 222 showing information related to the selected study, such as title, description, authors, and text, along with links to an editor interface, templates for manuscript formatting, and a collection of publication references gleaned from viewed publications. After user selection of the editor option, the system serves to the client server interface a panel 223 containing the full, formatted manuscript text for the study, with features for collaboratively editing the document.

Figure 23:
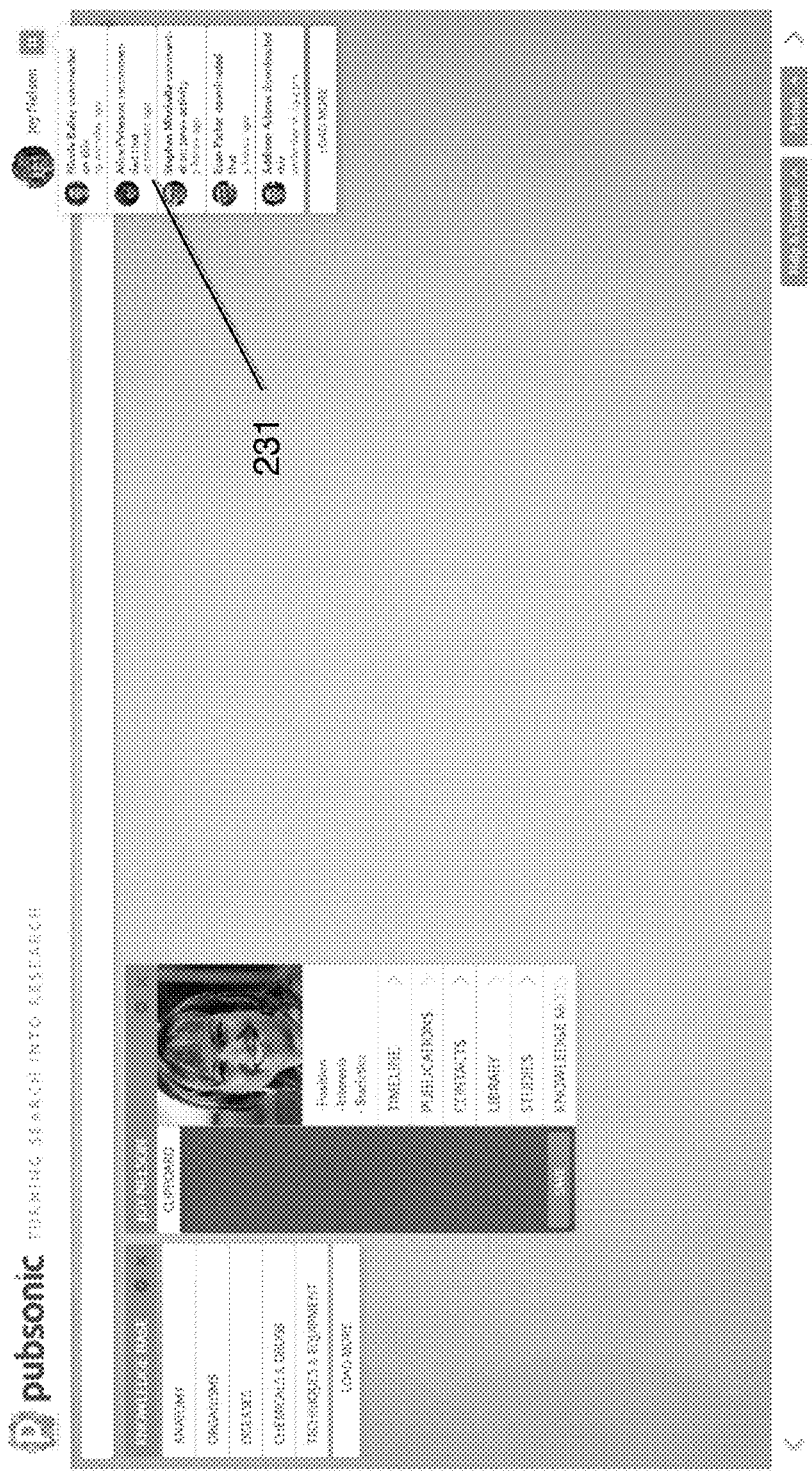
FIG. 23 is a representation of a display on a client computer of a web page, served by the server infrastructure, in response to selection by the user of the user's real time update feed, displaying the feed including a listing of updates including social actions and knowledge assets associated with saved searches, in accordance with an embodiment of the present invention.

FIG. 23 is a representation of a display on a client computer of a web page, served by the server infrastructure, in response to selection by the user of the user's real time update feed, displaying the feed including a listing of updates including social actions and knowledge assets associated with saved searches, in accordance with an embodiment of the present invention. From the user profile or any web page containing the user's profile icon, the user may select the real time update icon within the user profile icon. The real time update icon includes a number indicating the number of most relevant unviewed updates in the system. After selection of the real time update icon, the server serves to the client server interface a panel 231 showing a listing of real time updates, including comments and recommendations related to the user's saved knowledge assets, authored papers, studies or contributed comments. The panel also shows knowledge assets that are newly present in the system's file and data structure that are of high relevance to any saved search including saved searches associated with a study.

Figure 24:
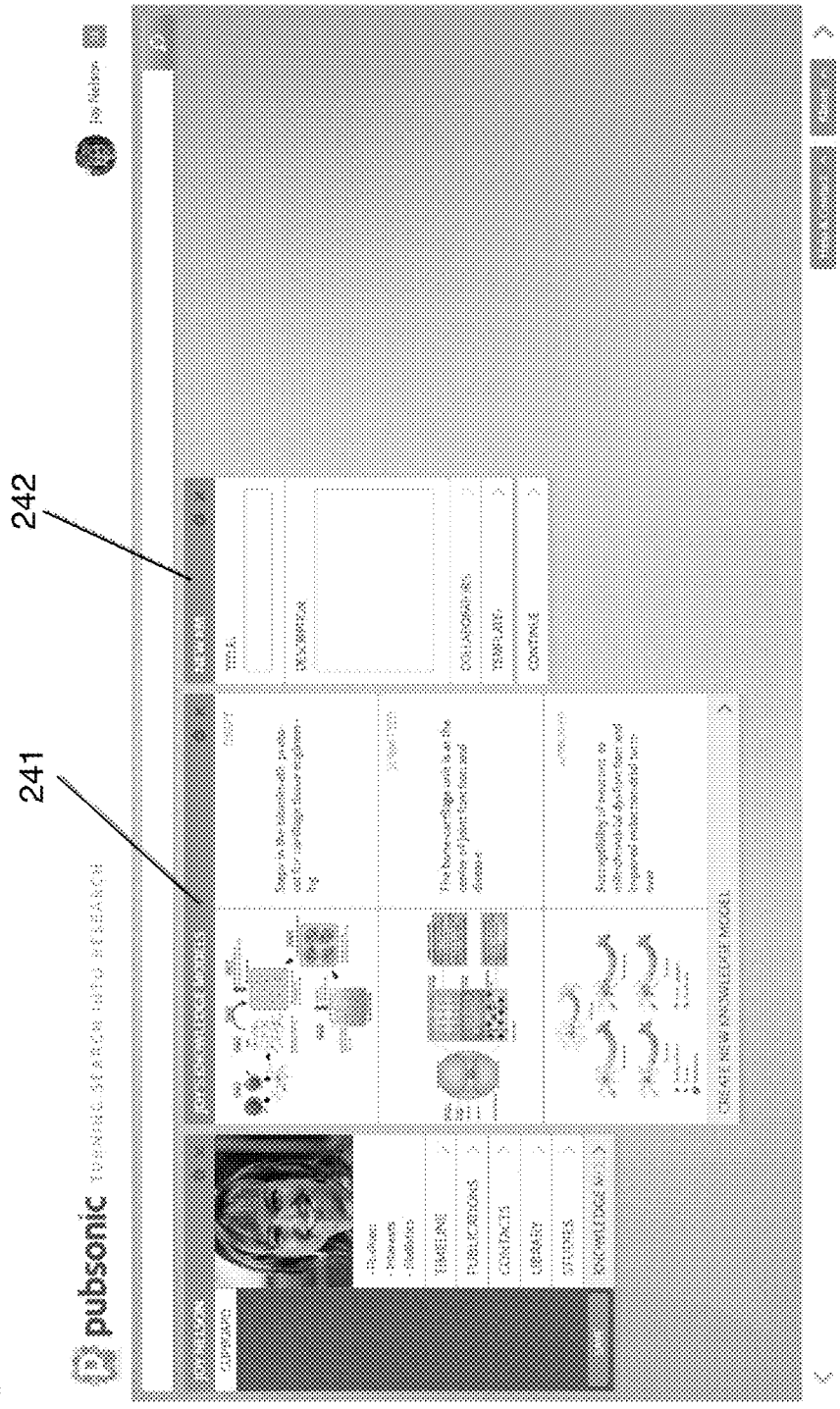
FIG. 24 is a representation of a display on a client computer of a web page, served by the server infrastructure, in response to selection by the user of the user's profile and further selection of the user's knowledge model library and the option to create a new knowledge model, displaying the knowledge models created by the user, and enabling the user to describe and begin to create a new knowledge model, in accordance with an embodiment of the present invention.

FIG. 24 is a representation of a display on a client computer of a web page, served by the server infrastructure, in response to selection by the user of the user's profile and further selection of the user's knowledge model library and the option to create a new knowledge model, displaying the knowledge models created by the user, and enabling the user to describe and begin to create a new knowledge model, in accordance with an embodiment of the present invention. In response to the user's selection of the knowledge model option on his/her user profile, the server queries the core datastore and identifies and serves to the client server interface a panel 241 displaying the set of knowledge models created or saved by the user, along with title and related text information, along with a link for creating new knowledge models with a KM creation interface panel 242. The KM creation interface includes a text field for the new knowledge model's title, another for a description, and links for input of collaborators, templates for KM creation, and continuation to the graphical editor interface.

Figure 25:
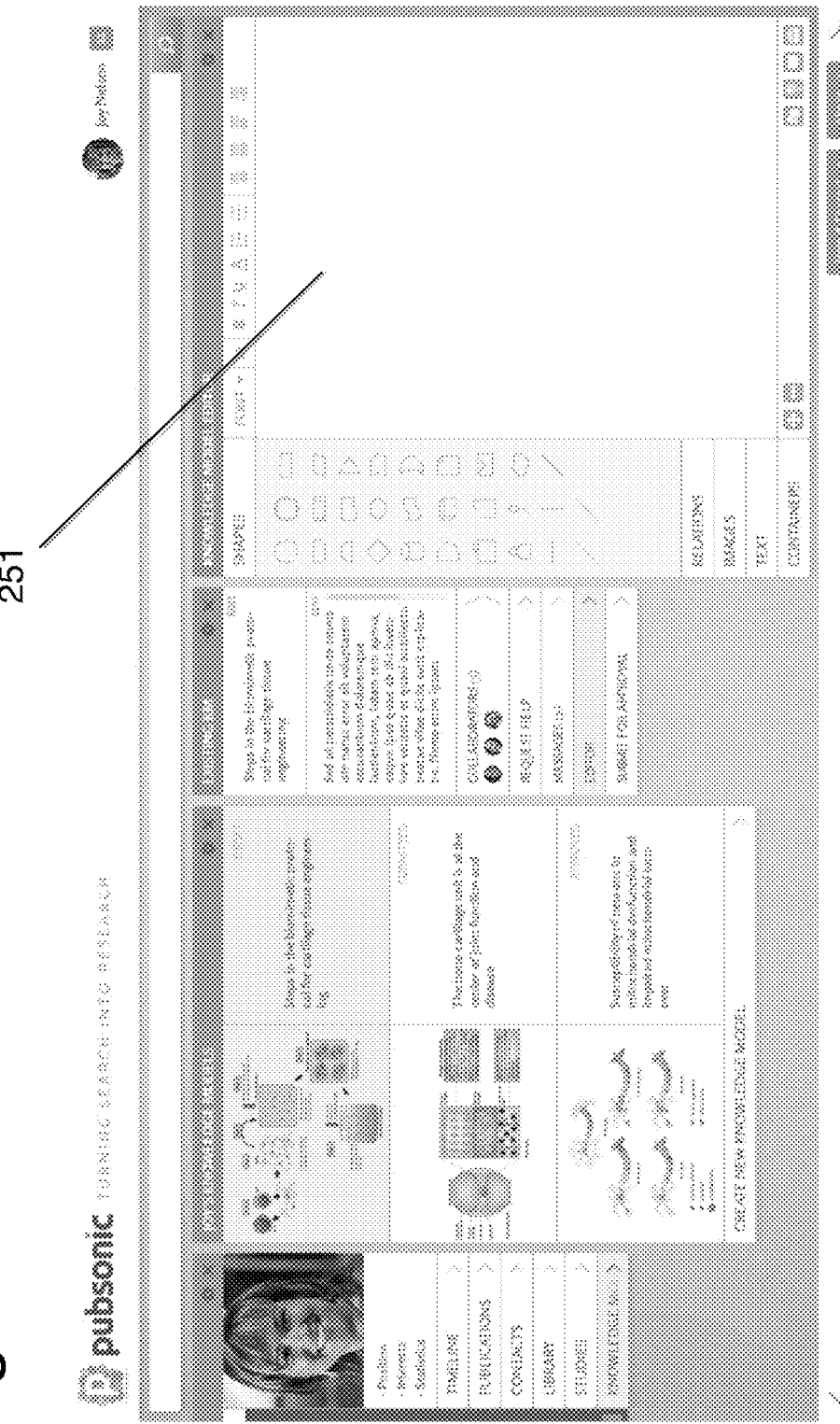
FIG. 25 is a representation of a display on a client computer of a web page, served by the server infrastructure, in response to selection by the user of the knowledge model creation and editing option, displaying the knowledge model editor, and enabling the user to begin creating a new knowledge model (including drawing, selection of a template, addition of text or links or comments, collaboration, and request for help) or to edit or propose changes to an existing knowledge model, in accordance with an embodiment of the present invention.

FIG. 25 is a representation of a display on a client computer of a web page, served by the server infrastructure, in response to selection by the user of the knowledge model creation and editing option, displaying the knowledge model editor 251, and enabling the user to begin creating a new knowledge model (including drawing, selection of a template, addition of text or links or comments, collaboration, and request for help), or to edit or propose changes to an existing knowledge model, in accordance with an embodiment of the present invention. The knowledge model editor interface 251 allows a user to create a new KM by using standard drawing tools including predefined shapes, beginning with a blank drawing template or importing a template from a set of predefined standard KM types. A user may also import an existing KM from the knowledgebase. Links allow a user to select images to import into the new KM, to add text, or to import containers. Containers are objects within a KM drawing that contain other objects within them. Icons allow selection of options to collaborate with other users, to add comments which can be viewed separately by a curator, to request help from administrators or curators or associated illustrators, or to view a set of tools that include creation of links to other KMs, characterizing the types of these links, addition of tags to indicate related papers, images, and other knowledge assets. A user may also edit links and tags, to remove or change them. A user may also, through the tool option, submit the new or altered KM for review by a curator or administrator.

Figure 26:
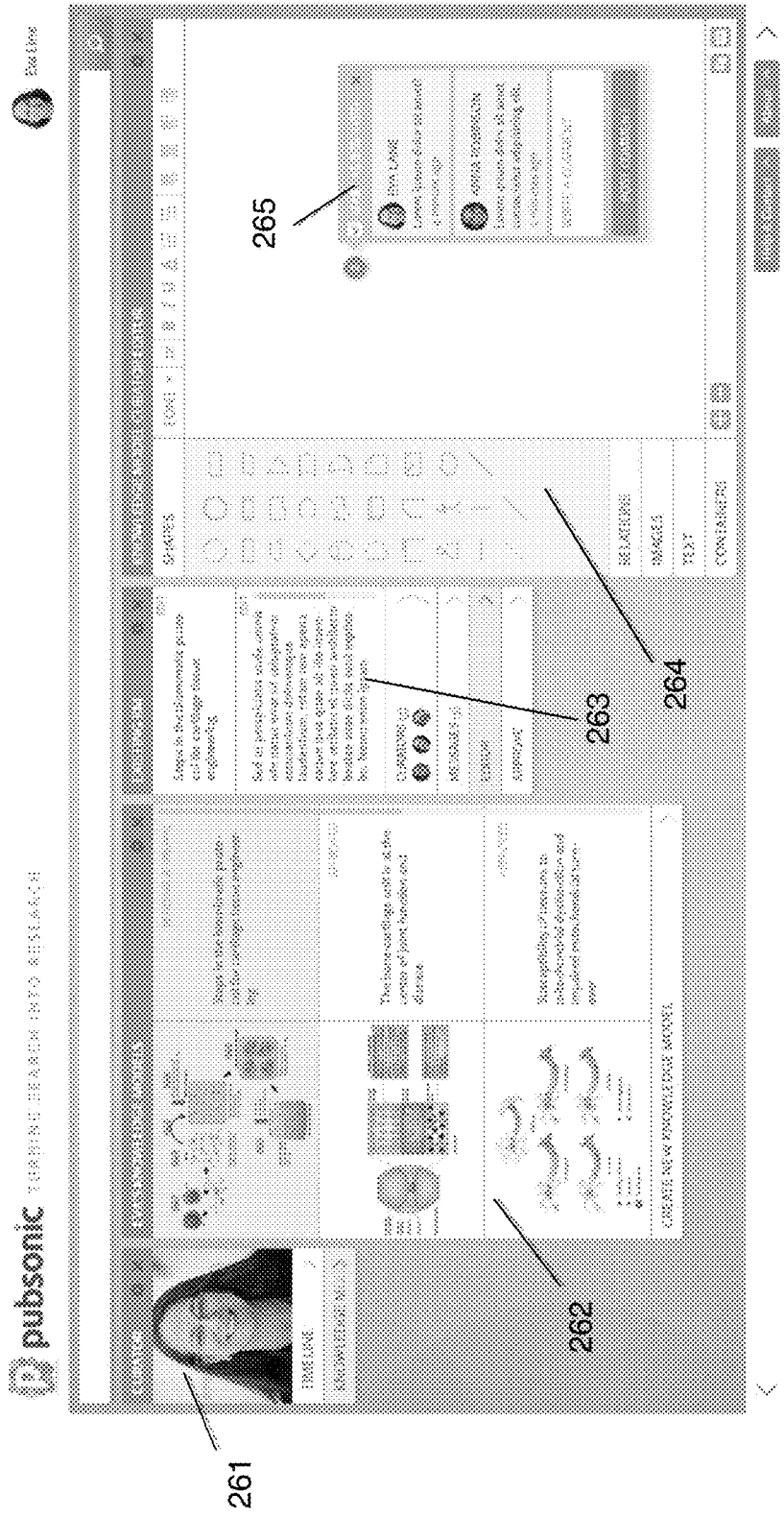
FIG. 26 is a representation of a display on a client computer of a web page, served by the server infrastructure, in response to selection by a curator of the curator's work interface tool, displaying the curator's library of knowledge models, information about individual knowledge models, and the creation and editing interface, and enabling the curator to create, edit, approve, and communicate about knowledge models designed for the knowledgebase, in accordance with an embodiment of the present invention.

FIG. 26 is a representation of a display on a client computer of a web page, served by the server infrastructure, in response to selection by a curator of the curator's work interface tool, displaying the curator's library of knowledge models, information about individual knowledge models, and the creation and editing interface, and enabling the curator to create, edit, approve, and communicate about knowledge models designed for the knowledgebase, in accordance with an embodiment of the present invention. The function of a curator (or an administrator with lesser administrative rights which are defined within the system) is to review and approve, modify or deny proposed changes to the knowledgebase by users, including the curators and administrators themselves. The curator may select his/her work interface. When this selection is received by the server, a curator profile panel 261 is served to the client interface server, including links for viewing the curator's activity timeline or proceeding to the curator's knowledge model library. After selection of the KM library a panel 262 is served to the client interface server displaying the set of KMs and related text that have been saved and stored on the server by the curator. These KMs are the set of KMs that are to be reviewed or further reviewed by the curator. After selection of one of these KMs, the system serves a panel 263 to the client server interface displaying relevant information about the KM and including a link for viewing related messages from other curators or administrators or from users/proposers, a link for accessing the curator editing interface 264, and a link for approving and uploading to the knowledgebase the new or edited KM and its links and tags. Upon selection of the curator editing interface option the system serves a panel 264 displaying the standard user editor 251 with upgraded features, including a panel 265 for communicating directly with a proposing user to identify and interactively resolve open issues related to the proposed KM or changes. The curator also has the option to forward the proposed KM to another curator or administrator or user for additional review or to substitute for the curator. The curator may also reject the proposed changes or new KMS.

Figure 27:
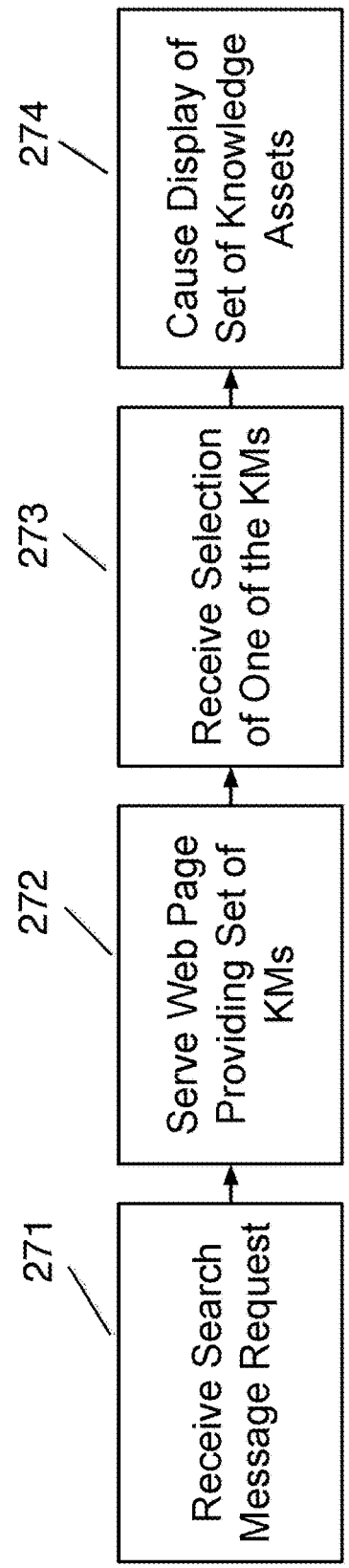
FIG. 27 shows a block diagram of logical processes implemented in accordance with an embodiment of the present invention to provide knowledge model search functions at the client server.

FIG. 27 shows a block diagram of logical processes implemented in accordance with an embodiment of the present invention to provide knowledge model search functions at the client server. A KM search session includes a search request message that is received in process 271 at the application interface server, originating when a user selects a KM on the user's client computer or selects one or a series of menu items from a knowledgebase menu panel or enters keywords into the search bar. This request message is parsed and, in process 272, the search modules and ranking modules define a set of KMs that are most relevant to the search request based on the full set of objects in the search string and serves these KMs to the client computer for display to the user. If the user selects one of the served KMs, this search request message is received in process 273 at the application interface server. This request message is parsed and, in process 274, the search modules and ranking modules define a set of knowledge assets, including publications, images and people, that are most relevant to the search request based on the full set of objects in the search string and serves these knowledge assets to the client computer for display to the user.

Figure 28:
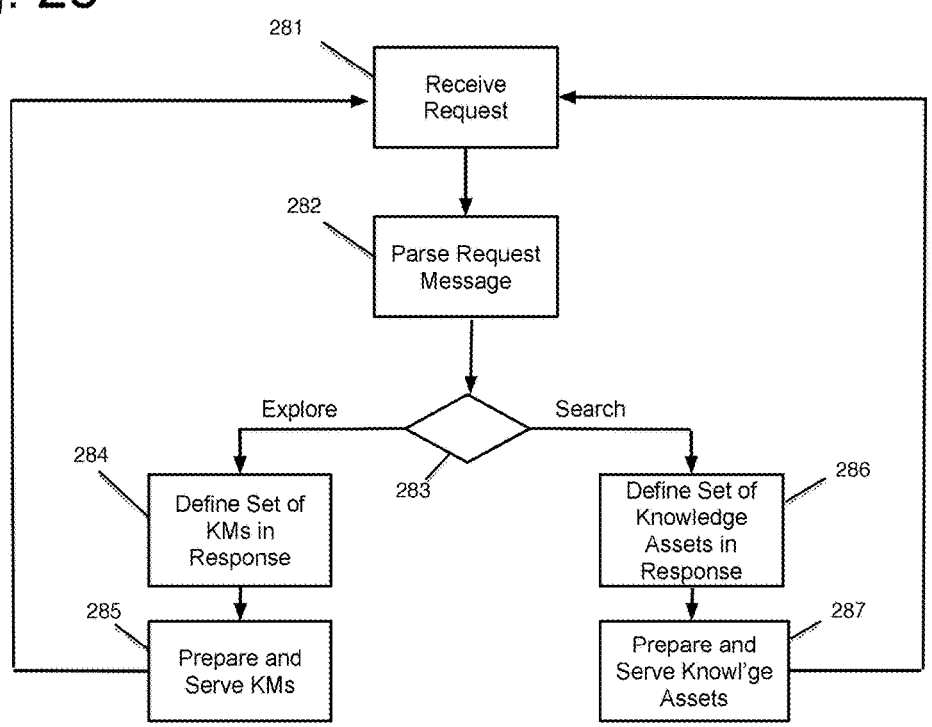
FIG. 28 shows a block diagram of logical processes implemented in accordance with an embodiment of the present invention to provide knowledge model search and exploration functions at the client server.

FIG. 28 shows a block diagram of logical processes implemented in accordance with an embodiment of the present invention to provide knowledge model search and exploration functions at the client server. A KM search and exploration session includes a search request message that is received in process 281 at the application interface server, originating when a user selects a KM on the user's client computer. This request message is parsed in process 282 by the parsing module, into four potentially differing search strings for processing by the search modules. At decision point 283 the system determines, on the basis of a user selection, whether this process is a full search or an exploration mode activity. If the process is an exploration mode activity, the search modules and ranking modules define in process 284 a set of KMs that are most relevant to the explore request and in process 285 serves these KMs to the client computer for display to the user. If in decision point 283 the system determines that a full search has been indicated by the user, the search modules and ranking modules define in process 286 a set of KMs and other knowledge assets, such as publications and images and people, that are most relevant to the search request based on the full set of objects in the search string and, in process 287, serves these KMs and knowledge assets to the client computer for display to the user. After 285 or 287, the user may continue in explore mode or full search mode or abandon the session. If the user selects a KM the request is transmitted to the application interface servers in process 281 to continue the process.

Figure 29:
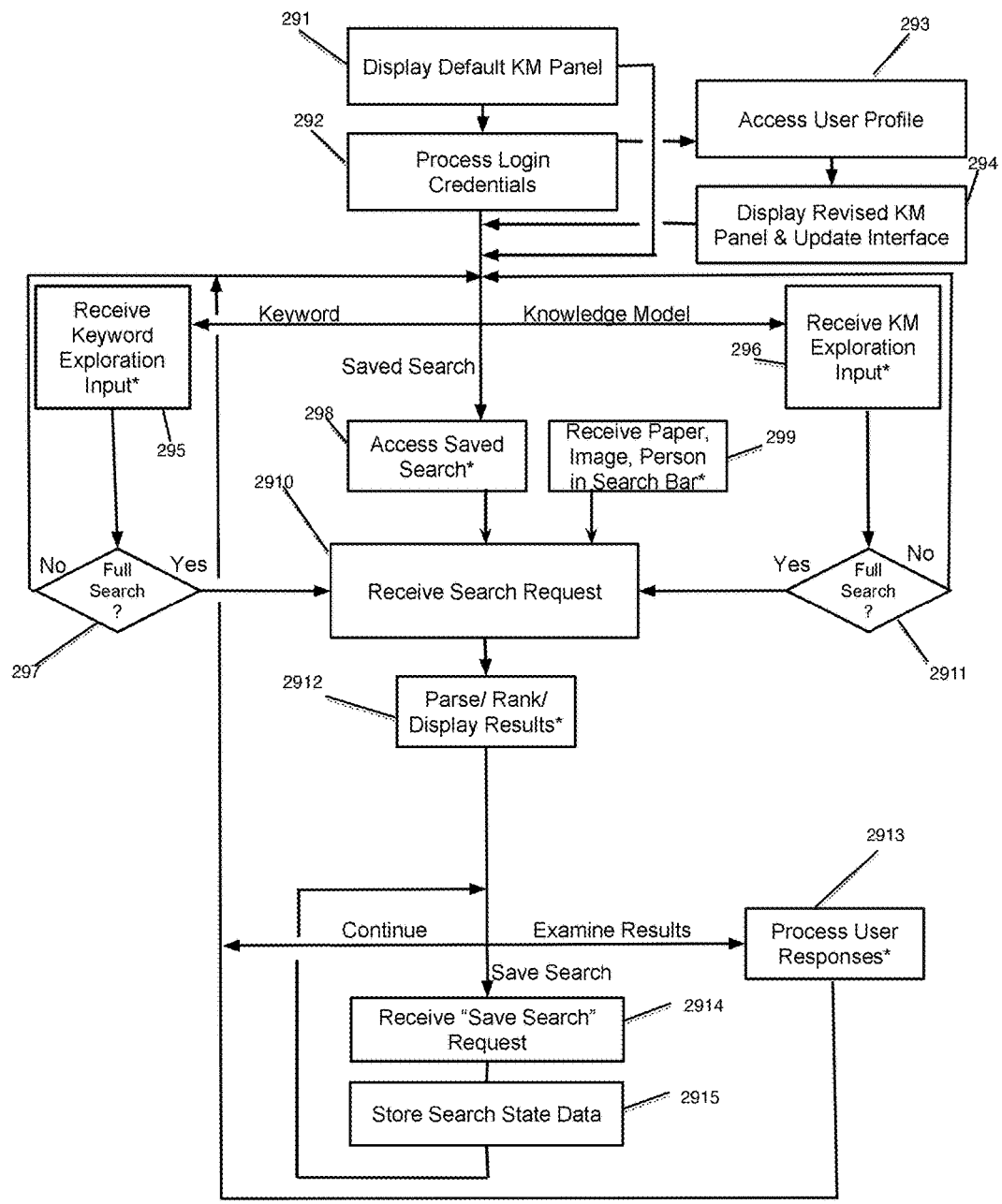
FIG. 29 shows a block diagram of logical processes implemented in accordance with an embodiment of the present invention to provide user registration, knowledge model exploration and search, keyword search, search saving and search results at the client server.

FIG. 29 shows a block diagram of logical processes implemented in accordance with an embodiment of the present invention to provide user registration, knowledge model exploration and search, keyword search, search saving and search results at the client server. A user session begins with display in process 291 at the client computer of a default set of KMs, served by the application interface servers. In an alternative embodiment there may be no default display. In a sign in/sign up process 292 a user may enter registration information or, if already registered, sign in credentials, which are received at the application interface servers. Upon receipt of the credentials, the system, in process 293, accesses user profile data and, in process 294 analyzes the data, resulting in display at the client computer of a personalized set of KMs, information identifying the user, a real time update panel, and other user options. The user may choose not to enter credentials.

The user may begin with either entry of keywords or selection of a KM. If one or more key words is entered, this search request is received in process 295 (as further defined in FIG. 30) and a set of the most relevant KMs based on the received search request is served by the application interface servers for display at the client computer. If at decision point 297 the user chooses to continue in exploration mode, this cycle may be continued.

If after process 291 or process 294 a KM is selected, this search request is received in process 296 (as further defined in FIG. 31) and a set of the most relevant KMs based on the received search request is served by the application interface servers for display at the client computer. If at decision point 2911 the user chooses to continue in exploration mode, this cycle may be continued.

Figure 32:
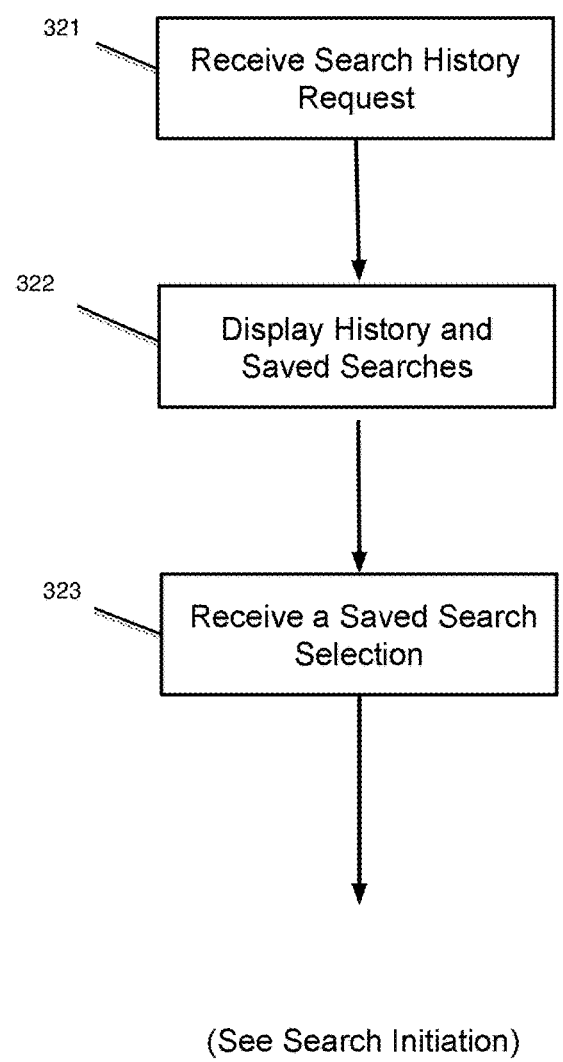
FIG. 32 shows a block diagram of logical processes implemented in accordance with an embodiment of the present invention to receive a saved search request from a client server.

At any time in exploration mode, a user may elect to access a saved search, resulting in a search request received at the application interface server, as in process 298 (and further defined in FIG. 32).

In addition, in process 299, the system may receive entries into the search bar through selections made by the user after examining search results (as further defined in FIG. 34) including publications, images, and people.

After receiving search request messages in process 2910, originating from any of processes and decision points 297, 298, 299, or 2911, the system initiates a full search, in process 2912, based on the full contents of the search bar, by parsing and ranking the search data and results and displaying a full set of search results at the client computer, including, in this embodiment, KMs, publications, images, and people.

A user may then examine the results and make selections, save the current search, or continue the exploration and search process.

If the user chooses to examine results (as further defined in FIG. 34), user selections are received and processed, in process 2913, at the application interface servers. If the user chooses to save the current search state by selection of the "save search" option at the client computer, this selection is received in process 2914 at the application interface server and the search state data is stored in core datastore in process 2915, after which the user may choose to examine results or continue in exploration and/or search mode. If the user chooses to continue in exploration and/or search mode after process 2912 or process 2915, or decision points 297 or 2911, keyword, KM or saved search selections are received in processes 295, 296, or 298 respectively.

Figure 30:
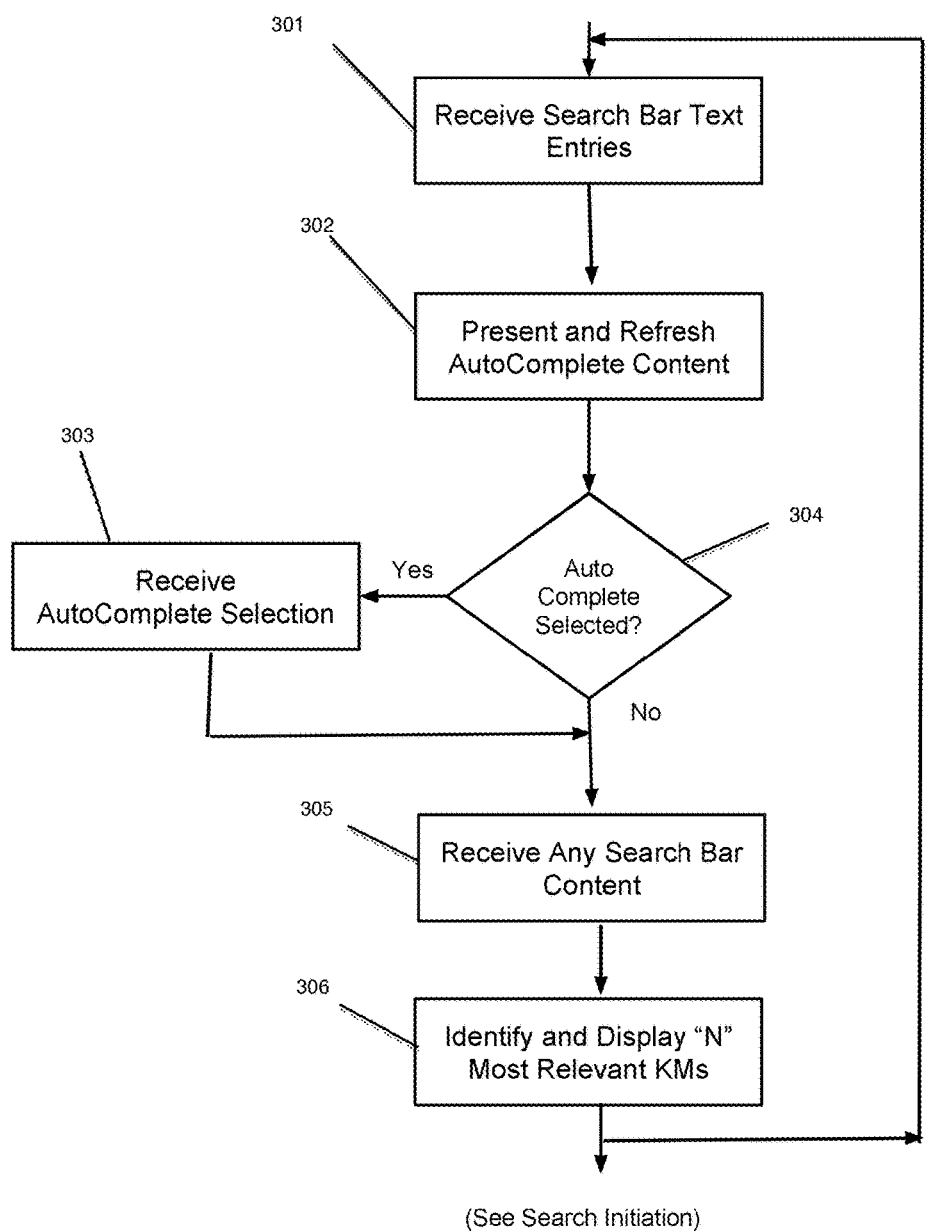
FIG. 30 shows a block diagram of logical processes implemented in accordance with an embodiment of the present invention to provide autocomplete functions, carry out an exploratory search process and provide exploratory search results in response to keyword entry at the client server.

FIG. 30 shows a block diagram of logical processes implemented in accordance with an embodiment of the present invention to provide autocomplete functions, carry out an exploratory search process, and provide exploratory search results in response to keyword entry at the client server. To carry out an iterative keyword search process, the system receives, in process 301, text entries from the search bar and, in process 302, defines and serves to the client computer a menu of autocomplete entries for various categories of possible search terms including words or phrases from a taxonomy, names of publications and names of authors. In decision point 304 the system determines whether the user has submitted an autocomplete selection and, if so, in process 303 receives the selection and enters it into the search bar at the client server. If no autocomplete has been selected, or after process 303, in process 305, initiated by user selection of the search option, the system receives the search bar content. In process 306 the system parses the search bar content and completes the search process, identifying and serving to the client computer the most relevant KMs as discussed in FIGS. 24 and 29. The user may choose to continue the search process by entering additional text, returning the system to process 301.

Figure 31:
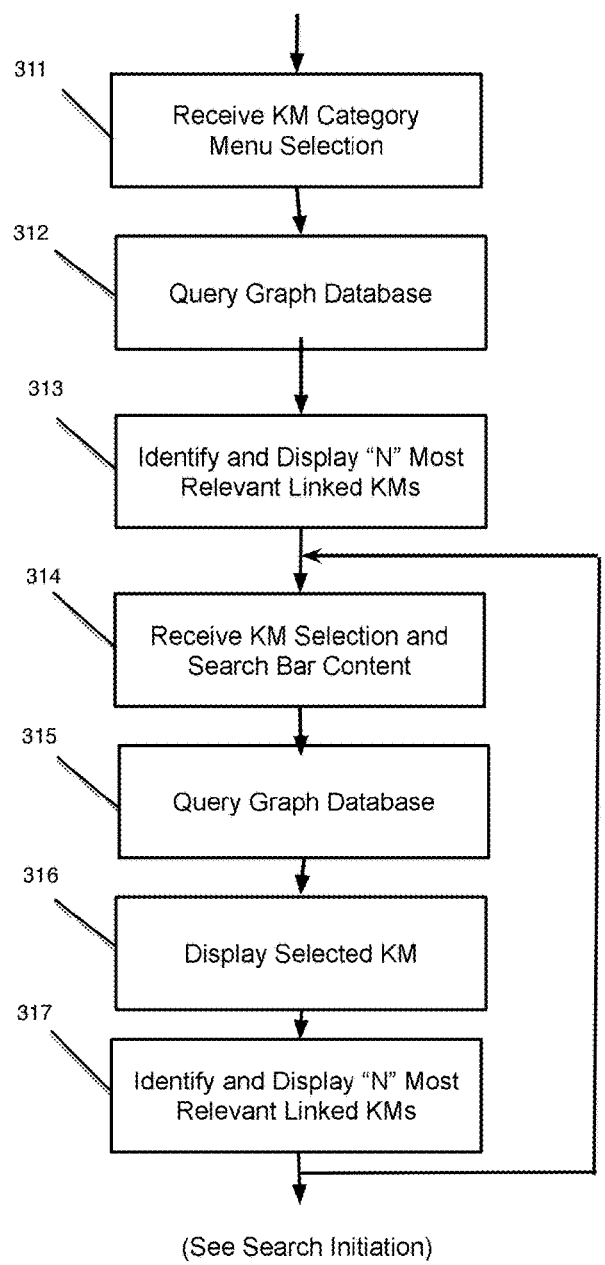
FIG. 31 shows a block diagram of logical processes implemented in accordance with an embodiment of the present invention to carry out a knowledge model exploration based on user input at, and to knowledge models identified by these processes to a client server.

FIG. 31 shows a block diagram of logical processes implemented in accordance with an embodiment of the present invention to carry out a knowledge model exploration based on user input at, and to serve knowledge models identified by these processes to a client server. To carry out an iterative knowledge model search exploration process, the system receives, in process 311, optionally, user selections from the knowledgebase taxonomy menu and, in process 312, queries the graph database cluster to find the most relevant KMs related to the selected menu items. The system, in process 313, identifies and serves to the client computer for display to the user, the most relevant set of KMs from the graph database cluster. Optionally, the user may choose not to engage the knowledgebase taxonomy menu and select from the default set of displayed KMs. In process 314, initiated by a user selection, the system receives a KM selection and any search bar content and, in process 315, queries the graph database cluster, parsing the KM selection and search bar content and completing the search process as discussed in FIGS. 28 and 33, to find the most relevant KMs related to the selected KM. In process 316 the system serves to the client computer, for display to the user, an enlarged image of the selected KM. In process 317, the system prepares and serves to the client computer for display to the user, the most relevant set of KMs based on the search request content. The user may choose to continue the search process by entering additional KM selections, returning the system to process 314.

FIG. 32 shows a block diagram of logical processes implemented in accordance with an embodiment of the present invention to receive a saved search request from a client server. A user may save a search by storing the search state data representing the search inputs. This saved search state may later be recalled in order to recreate the search. The saved search state is used to enable real time updates served to the client computer. In response to selection by the user of the save search option, the system receives the search message, in process 321, at the application server. The system queries the core datastore for the user's search history and saved search identifying data and, in process 322, serves the information to the client computer for display to the user. In process 323, the system receives a saved search selection from the set of saved searches displayed as a result of process 322 and identifies the full search bar entries related to the selected saved search for entry into a search process.

Figure 33:
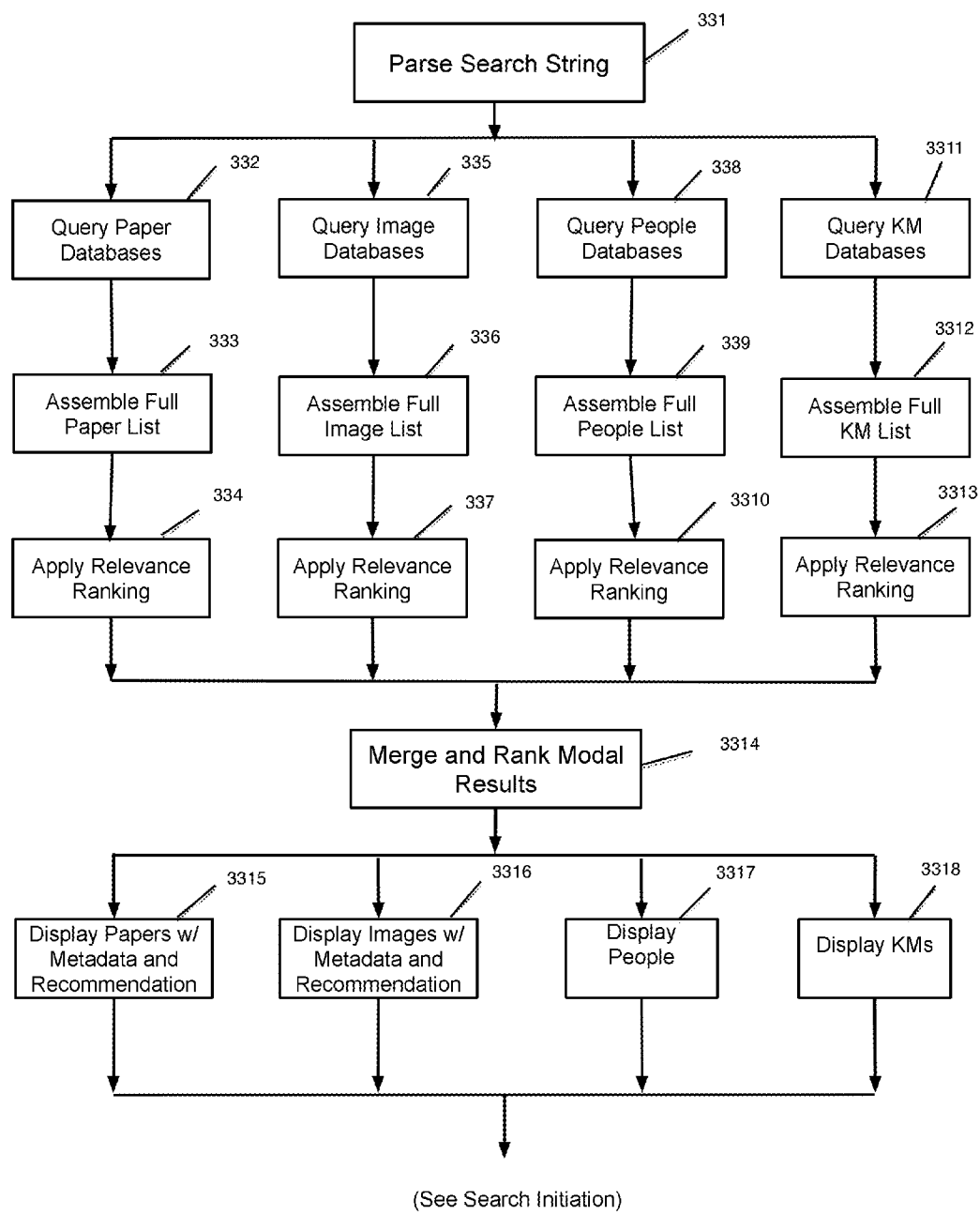
FIG. 33 shows a block diagram of logical processes implemented in accordance with an embodiment of the present invention to parse a search string and merge, rank, and display search results to a client server.

FIG. 33 shows a block diagram of logical processes implemented in accordance with an embodiment of the present invention to parse a search string and merge, rank, and display search results to a client server. In process 331, a received search string is analyzed and parsed into formats consistent with four categories of search: publications (papers), images, people, and KMs.

A publication search string is used to structure a database query in process 332 resulting in identification of all publications relevant to the query in process 333. A relevance ranking algorithm is implemented in process 334 to rank all identified search results.

An image search string is used to structure a database query in process 335 resulting in identification of all images relevant to the query in process 336. A relevance ranking algorithm is implemented in process 337 to rank all identified search results.

A people search string is used to structure a database query in process 338 resulting in identification of all people relevant to the query in process 339. A relevance ranking algorithm is implemented in process 3310 to rank all identified search results.

A KM search string is used to structure a database query in process 3311 resulting in identification of all KMs relevant to the query in process 3312. A relevance ranking algorithm is implemented in process 3313 to rank all identified search results.

A relevance ranking algorithm can operate on all elements of the search string, including KMs, key words, publications, images, and people, and in addition operates on all information or additional knowledge assets tagged to elements of the search string that are stored in any database on the application interface or core servers.

In process 3314, all knowledge assets identified and ranked through the parsing and searching process are merged and ranked in preparation to be served to the client computer. Publications are served to the client computer for display to the user along with related metadata including comments and recommendations in process 3315. Images are served to the client computer for display to the user along with related metadata including comments and recommendations in process 3316. People are served to the client computer for display to the user in process 3317. KMs are served to the client computer for display to the user in process 3318.

Figure 34:
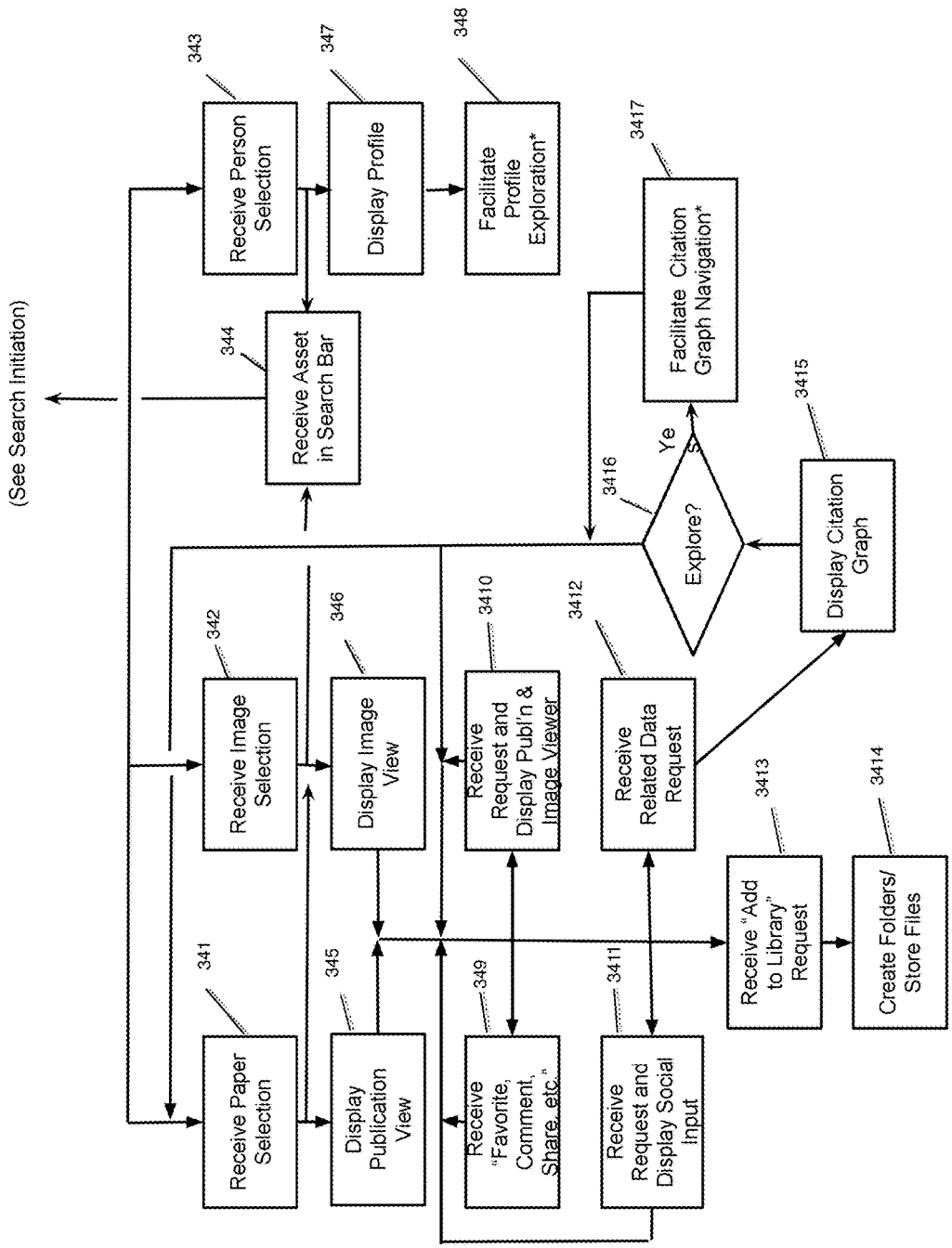
FIG. 34 shows a block diagram of logical processes implemented in accordance with an embodiment of the present invention to receive requests from a client server for information related to knowledge assets and to serve the requested information and the related data graph (citation graph) search functionality to the client server.

FIG. 34 shows a block diagram of logical processes implemented in accordance with an embodiment of the present invention to receive requests from a client server for information related to knowledge assets and to serve the requested information and the related data graph (citation graph) search functionality to the client server. In response to a full search request, a user is presented with a set of knowledge assets in addition to KMs. These knowledge models, including publications and images and people, can be examined and elements of the knowledge assets can be selected for further exploration. Knowledge assets can also be entered into the search bar for inclusion in the search string.

In process 341, a publication selection request message is received by the server and, in response, in process 345 a publication viewing panel is served to the client computer for display to the user. The publication viewing panel contains descriptive information about the publication, including title, authors, abstract, comments, favorites, a full text view option, and others.

In process 342, an image selection request message is received by the server and, in response, in process 346 an image viewing panel is served to the client computer for display to the user. The image viewing panel contains descriptive information about the image, including title, authors, description, comments, favorites, a full image viewing option, and others.

After viewing a publication or image, a user may select any of several options. In process 349 a request message to favorite, share or comment is received by the server and the appropriate action is carried out. In process 3410 a request message to display the publication or image full view is received at the server and a full view panel for the publication or image is served to the client computer for display to the user. In process 3411, a request message and related social input are received by the server, including comments and optionally ratings, and stored in a core datastore with the related publication or image and also served to the client computer for display to the user. In process 3413 an add to library request message is received at the server and, in process 3414, a user interface panel is served to the client computer, displaying options for creating new folders and/or storing the selected publication or image in a folder.

In process 3412, if the selected knowledge asset is a publication, a request to view a related data graph (RDG) is received at the server and, in process 3415, the graph database cluster is queried and a graphical representation of the publication and its network of interlinked publications is served to the client computer for display to the user. If the user chooses at decision point 3416 to explore the RDG, the system receives a selection 3417 at the server and facilitates exploration as in FIG. 35, returning to process 341 if selected by the user.

In process 343, a person request message is received by the server and, in process 347, the selected person's profile is served to the client computer for display to the user, including several options for the user to select additional information including the person's timeline, publications, library, contacts, studies, and KMs. If an option is selected, the system facilitates this exploration of the person's profile as in FIG. 36.

After any knowledge asset is initially selected in process 341, 342, or 343, any selected knowledge asset can be added to the search bar and the selection is received by the server in process 344.

Figure 35:
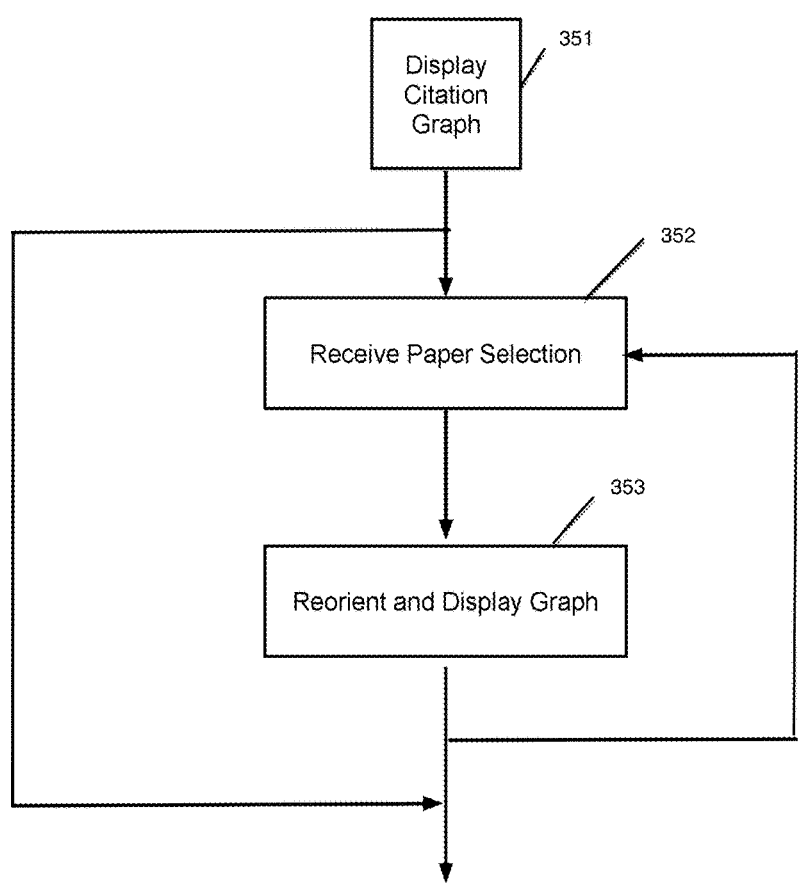
FIG. 35 shows a block diagram of logical processes implemented in accordance with an embodiment of the present invention to display the related data graph to a client server, receive a publication selection from the client server, and serve an updated related data graph.

FIG. 35 shows a block diagram of logical processes implemented in accordance with an embodiment of the present invention to display the related data graph to a client server, receive a publication selection from the client server, and serve an updated related data graph. In process 351, as in process 3415, the system queries the graph database cluster and a graphical representation of the publication and its network of interlinked publications is served to the client computer for display to the user. If the user chooses to explore the RDG, the system receives a publication selection message in process 352 and, in process 353, queries the graph database cluster and serves an updated graphical representation of the selected publication and its network of interlinked publications to the client computer for display to the user. The user may select another publication from this graphical representation, returning to process 352, or the system may return to process 341 if selected by the user.

Figure 36:
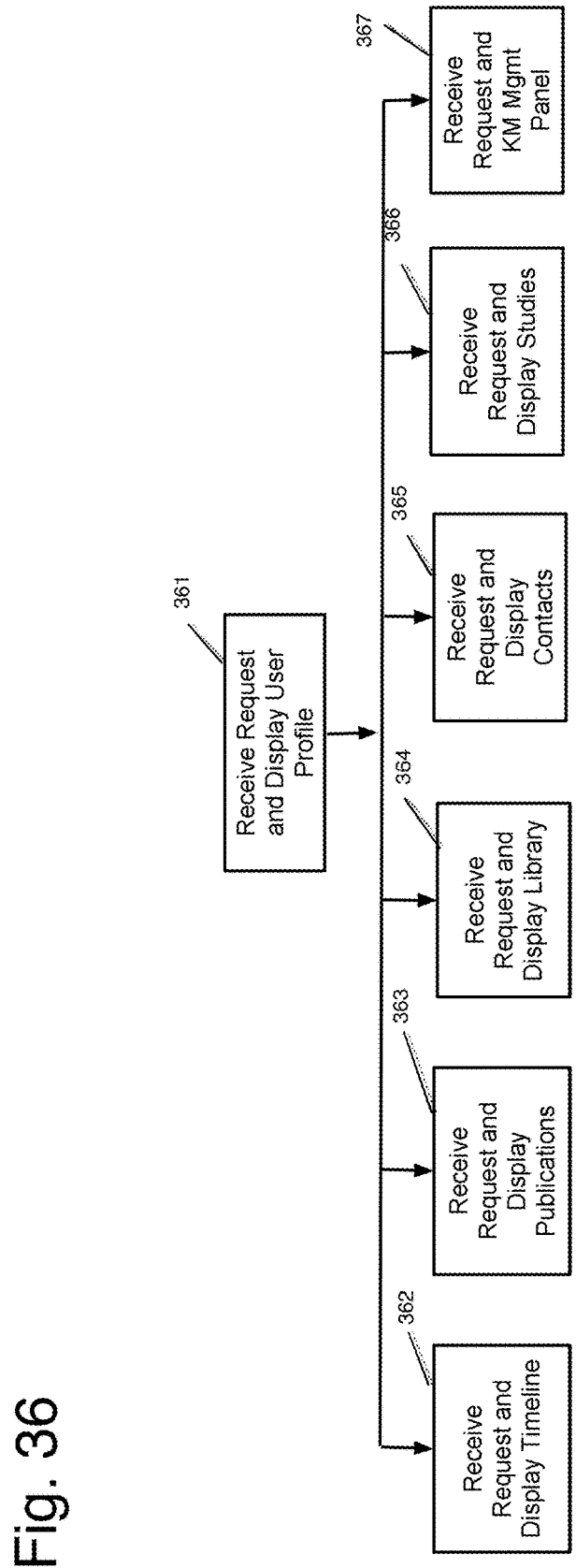
FIG. 36 shows a block diagram of logical processes implemented in accordance with an embodiment of the present invention to receive a request from a client server to display the user profile and related information, and to serve the profile and information to the client server.

FIG. 36 shows a block diagram of logical processes implemented in accordance with an embodiment of the present invention to receive a request from a client server to display the user profile and related information, and to serve the profile and information to the client server. After receiving a request message from the client based on selection of the user profile option by a user, in process 361 the system serves the user profile panel to the client computer for display to the user. After a user profile is served to the client computer the user may select one of several options for accessing further information. If the user chooses to explore the profile activity timeline, a request message is received in process 362 at the application interface server and the activity timeline panel is served to the client computer for display to the user. If the user chooses to explore the profile publications, a request message is received in process 363 at the application interface server and the publications panel is served to the client computer for display to the user. If the user chooses to explore the profile library, a request message is received in process 364 at the application interface server and the library panel is served to the client computer for display to the user. If the user chooses to explore the profile contacts, a request message is received in process 365 at the application interface server and the contacts panel is served to the client computer for display to the user. If the user chooses to explore the profile studies, a request message is received in process 366 at the application interface server and the studies panel is served to the client computer for display to the user. If the user chooses to explore the profile KM management panel, a request message is received in process 367 at the application interface server and the KM management panel is served to the client computer for display to the user.

Figure 37:
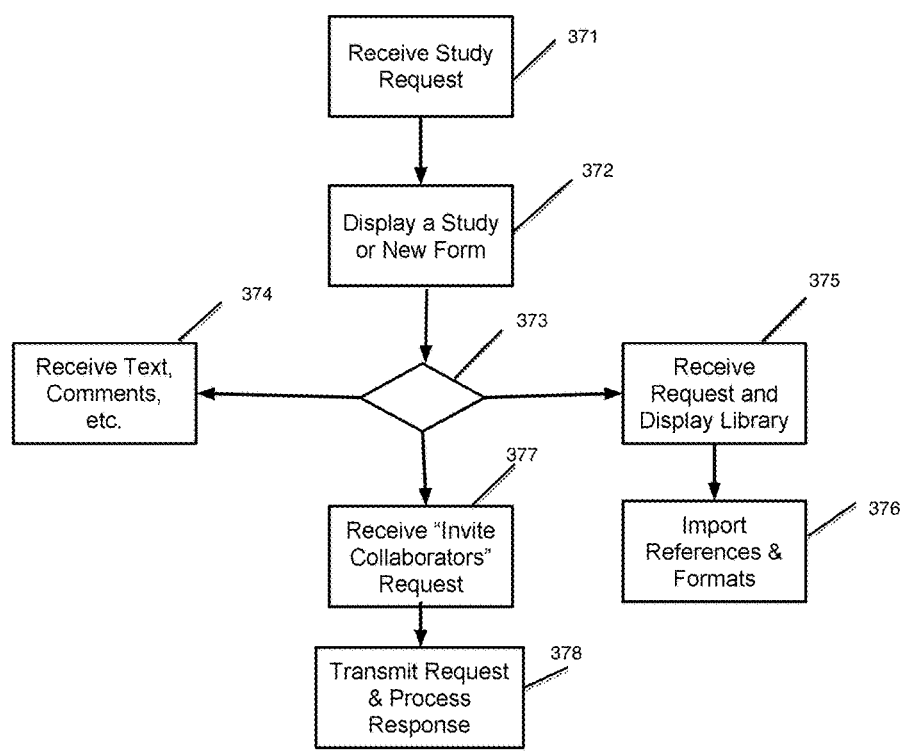
FIG. 37 shows a block diagram of logical processes implemented in accordance with an embodiment of the present invention to receive a request from a client server to create a new, or edit an existing, study and to serve related functionality to the client server.

FIG. 37 shows a block diagram of logical processes implemented in accordance with an embodiment of the present invention to receive a request from a client server to create a new, or edit an existing, study, and to serve related functionality to the client server. A user may create a study as a means of organizing a research project including, individually or in collaboration, writing a publication manuscript. Based on user selection of the study creation option, the system receives a request message in process 371. In process 372, the system serves to the client computer for display to the user, either an existing study panel or a new study creation panel, based on the user selection. Based on decision point 373, the system may receive, in process 374, user entered text at the application interface server and store the text with the study panel data. Alternatively, in process 375, the system may receive a request message for the study library display panel and serve the panel to the client computer for display to the user. In process 376, based on user selection of a publication from the library and the reference import option, the system may receive a request message to import references and formats from the selected paper and then stores the related data with the study. Alternatively, the system may receive in process 377 a request message to invite collaborators and, in process 378, serve to the client computer(s) of the proposed collaborator(s) a collaboration invitation, for display to the proposed collaborator(s).

Figure 38:
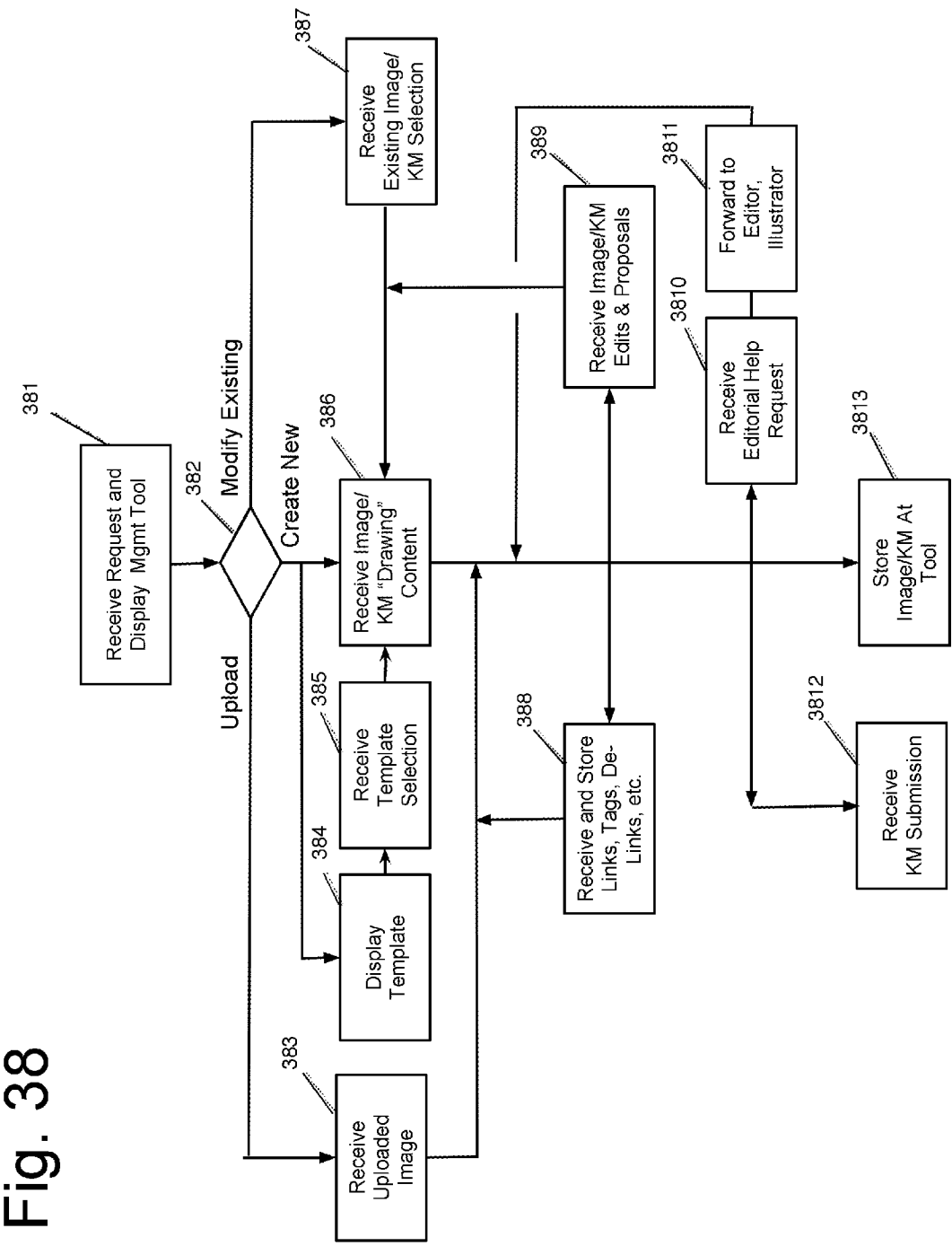
FIG. 38 shows a block diagram of logical processes implemented in accordance with an embodiment of the present invention to receive a request from a client server for the KM editing and creation tool and to serve the tool and related functionality the client server.

FIG. 38 shows a block diagram of logical processes implemented in accordance with an embodiment of the present invention to receive a request from a client server for the KM editing and creation tool and to serve the tool and related functionality the client server. Based on a user selection the system receives a request message, in process 381, for the KM and graphical abstract management tool panel, and serves the panel to the client computer for display to the user. At decision point 382 the user may choose to upload a KM, modify an existing KM or create a new KM. Based on this user selection the system may receive, in process 383, a request message to receive an uploaded image, and upload and store the image file. Alternatively, the system may, in process 384, receive a request message to serve to the client computer for display a set of selectable KM drawing templates, which serve as guides for structuring the new KM that is to be created by the user. In process 385 the system receives, based on selection of a template by the user, a template selection message and serves the template to the client computer for display to the user. Either using the selected template or, without a template, or based on an uploaded KM from process 387, the user may enter drawing elements in the management tool interface and in process 386 the system receives and stores the drawing content. Alternatively, in process 387, the system may receive a request to receive an uploaded KM for editing by the user, and in response receive and store the uploaded KM.

Based on user selections, in process 388, the system may receive request messages to store user selected links, tags, de-links, etc. related to the KM or image being edited, and store the related data in a graph database cluster. Additionally the system may receive, in process 389, further user selected drawing elements and store them with the image in a core datastore.

The system may receive a request message, in process 3810, for editorial help, based on a user selection. In process 3811 the system forwards this request message to a selected editor or illustrator, chosen either by the user in the request message or by the system based on availability and/or matching of content and editor/illustrator skills. Alternatively, the system may receive, in process 3812, a request message to submit the edited or created KM to a curator or administrator for consideration as part of the knowledgebase, and stores the KM. Alternatively the system may receive, in process 3813, a request message, based on a user selection, to store the edited or created KM and store the KM in a core datastore.

Figure 39:
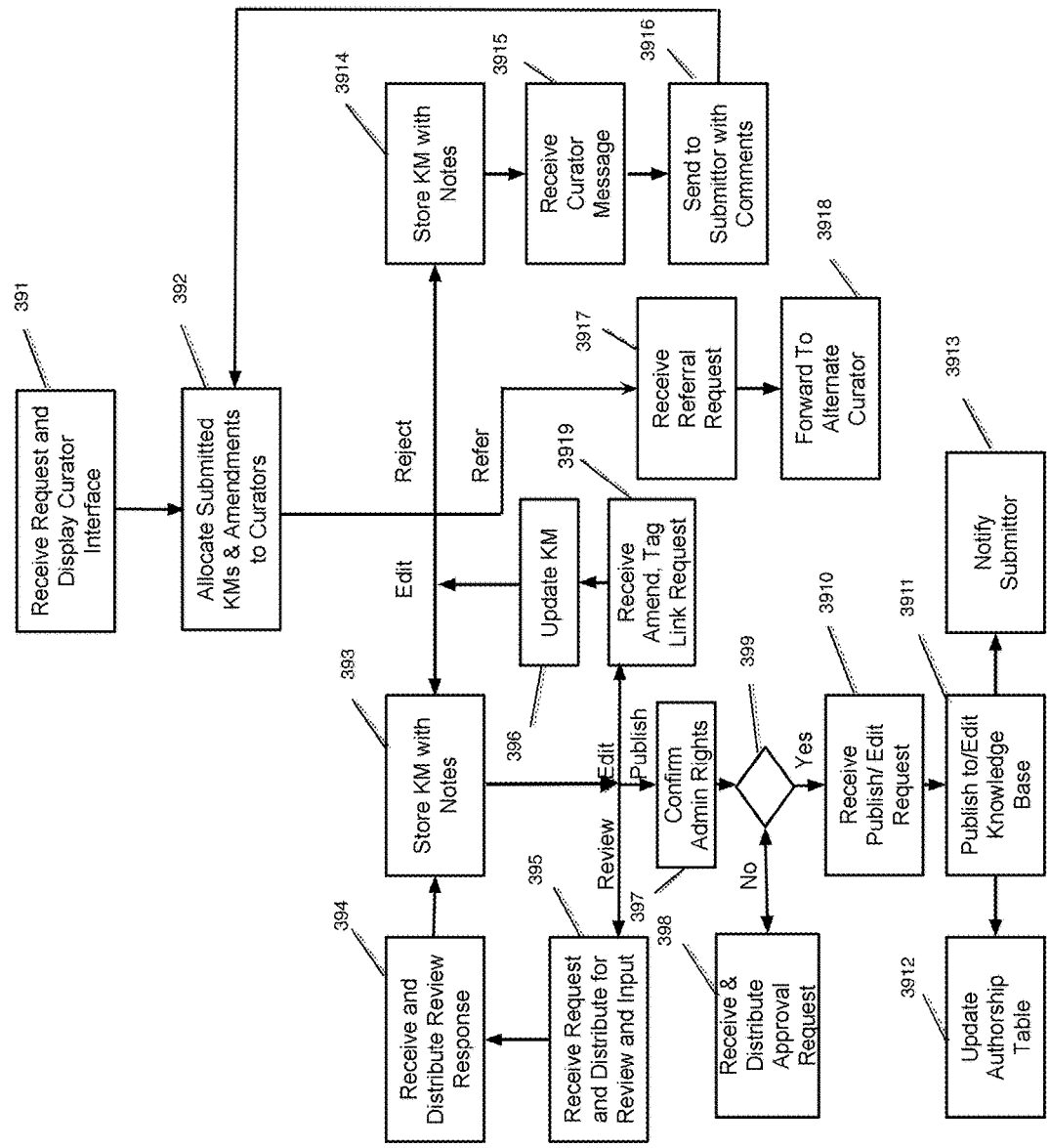
FIG. 39 shows a block diagram of logical processes implemented in accordance with an embodiment of the present invention to receive a request from a client server for the curator interface editing and creation tool and to serve the tool and related functionality to the client server.

FIG. 39 shows a block diagram of logical processes implemented in accordance with an embodiment of the present invention to receive a request from a client server for the curator interface editing and creation tool and to serve the tool and related functionality to the client server. Curators and administrators have administrative authority, at varying levels, to approve, disapprove, edit or suggest changes to proposals by users to add, delete, change, or change links or tags to KMs for use in the knowledgebase. In process 391, based on a curator's selection, the system receives a request message to display the curator interface and serves the interface to the client computer for display to the curator. In process 392, the system allocates all stored submissions from process 3812, to available curators for review. A curator may choose to reject the proposed KM and, in process 3914, the system receives the rejection selection message and stores the KM with any text notes entered by the curator. In process 3915, the system receives text entered by the curator in the form of a communication to the submittor/user and, in process 3916, forwards the message to the user, who may choose to edit and resubmit the proposed KM and/or changes. Alternatively, a curator may choose to refer the submitted KM to another curator or editor. In process 3917 the system receives the request message for referral and in process 3918 forwards the submitted KM file to an alternate curator or editor.

Alternatively, a curator may choose to review and/or edit the submitted KM and, in process 393 the system, receives the review selection message and stores the KM with any text notes entered by the curator. In process 3919 the system receives any request messages based on selection by the curator of options to edit the image, tags or links, and, in process 396, stores the KM with the curator's proposed changes. In process 395, the system receives, based on the curator's selection, a request message to forward the KM to another curator for review and serves the KM file with any text comments entered by the referring curator to the client computer of the new referred curator for display. In process 394, the system receives any submitted text or proposed changes entered by the referred curator. In process 397, the system, based on the curator's selection of the publish option, queries the core datastore to confirm the curator's administrative rights and, based on decision point 399, if the curator does not sufficient rights to publish directly to the knowledgebase (based on the changes proposed to the KM), receives a request message to distribute the publish option selection and KM to another curator with sufficient rights. If the curator has sufficient rights to publish to the knowledgebase, the system receives the authorized publish request message in process 3910 and, in process 3911, updates the knowledgebase by adding the KM and its links and tags to the graph database cluster and core datastore. In process 3912 the system updates the authorship data for the uploaded KM in the core datastore, and, in process 3913 serves a message to the submittor user indicating that the submitted KM has been uploaded.

Figure 40:
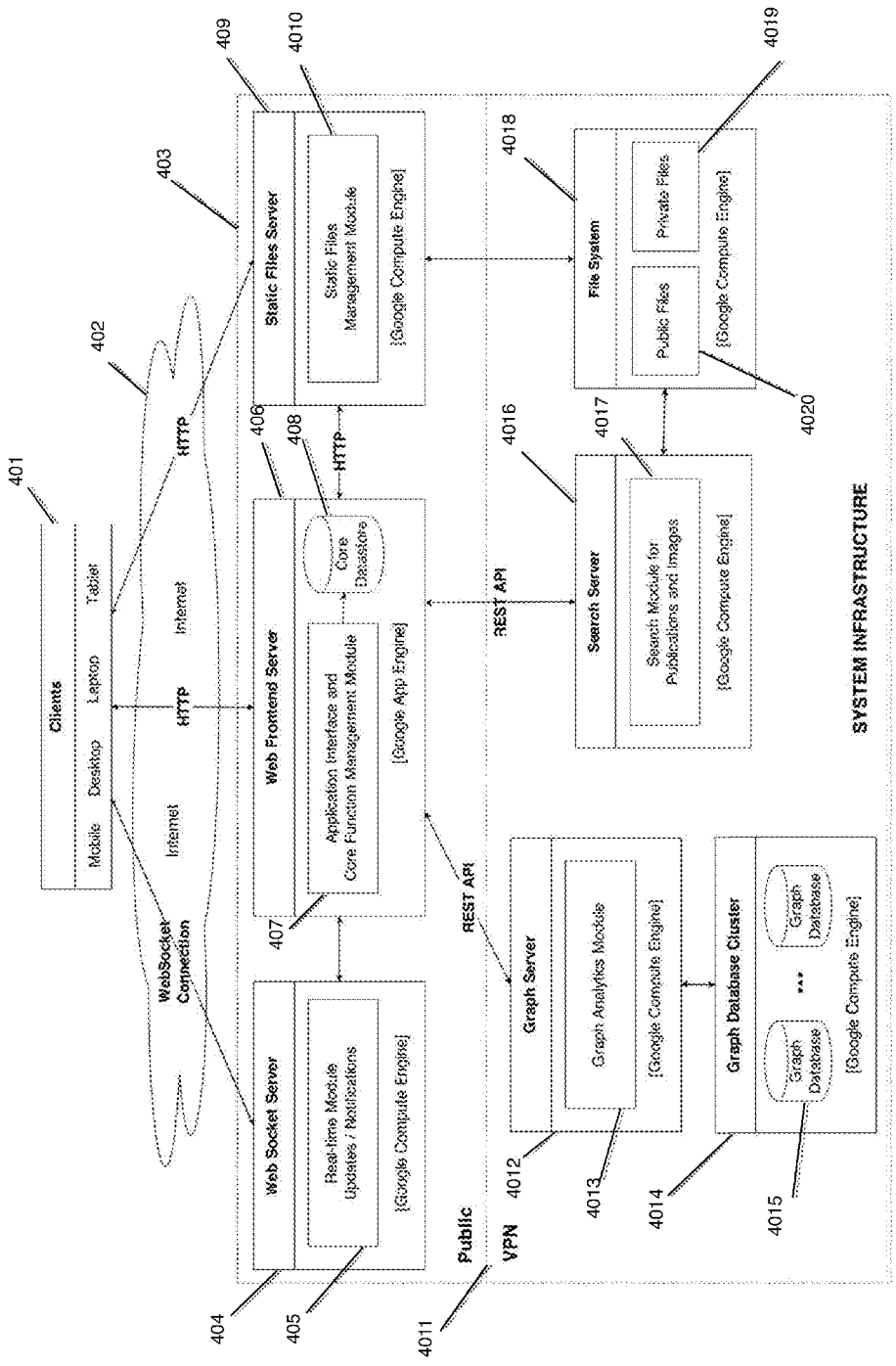
FIG. 40 shows a block diagram of architecture of a system for carrying out search over a network in accordance with an embodiment of the present invention, showing in particular infrastructure used to implement the server system, including a web socket server, web frontend server and static files server.

FIG. 40 shows a block diagram of architecture of a system for carrying out search over a network in accordance with an embodiment of the present invention, showing in (particular infrastructure used to implement the server system, including a public web frontend server, web socket server and static files server, and private search server, graph server, graph database cluster and file system. In component 401 client devices, such as mobile phones (iPhone or Android on any other phone with an internet browser), desktop workstation (PC or Mac), laptop (PC or MAC) or tablet device (iPad or Android or any other tablet device with an internet browser) connect through their web browser application, using HTTP protocol over the Internet, 402, to the Web Frontend Server, component 406. The Web Frontend Server, 406 is hosted on an automatically scalable and available Google App Engine environment, and dispatches requests to the Core Function Management Module 407, which contains all business logic and manages communication with internal servers for search and graph analytics. The Search Server, component 4016, and Graph Server, component 4012, are exposed through RESTful API interfaces accessible through a VPN connection at 4011, The Search Server 4016, through component 4017, Search Module for Publications and Images, indexes publications and images from the internal File System 4018 and provides a RESTful API web interface for querying and retrieving results from the index of publications/images. Graph Server 4012 provides the Graph Analytics Module 4013, which maps relations between objects such as knowledge models, publications, images, journals, authors, people, and activities, and calculates relevance factors, finds recommendations and ranks objects on various criteria. All graph relations are stored in the Graph Database Cluster 4014, which consists of multiple Graph Databases 4015 that provide availability, reliability and scalability for graph data. The Web Socket Server 404 is used to implement bi-directional low latency communication between the clients and the servers in order to serve real-time updates and notifications through the Real-time Module for Updates and Notifications, component 405. Static Files Server 409 serves static files to the clients through the Static Files Management Module 4010, which checks session and authentication data passed by clients in order to keep track of to whom files are served and whether files are served to clients with proper permissions. Static Files Server 409 accesses File System, component 4018, through the VPN connection. File System 4018 represents raw data stored in internal persistent hard drives. Data in File System 4018 is separated between Public (module 4020) and Private (module 4019) modules that clearly separate raw files available to public or to individual users.

Figure 41:
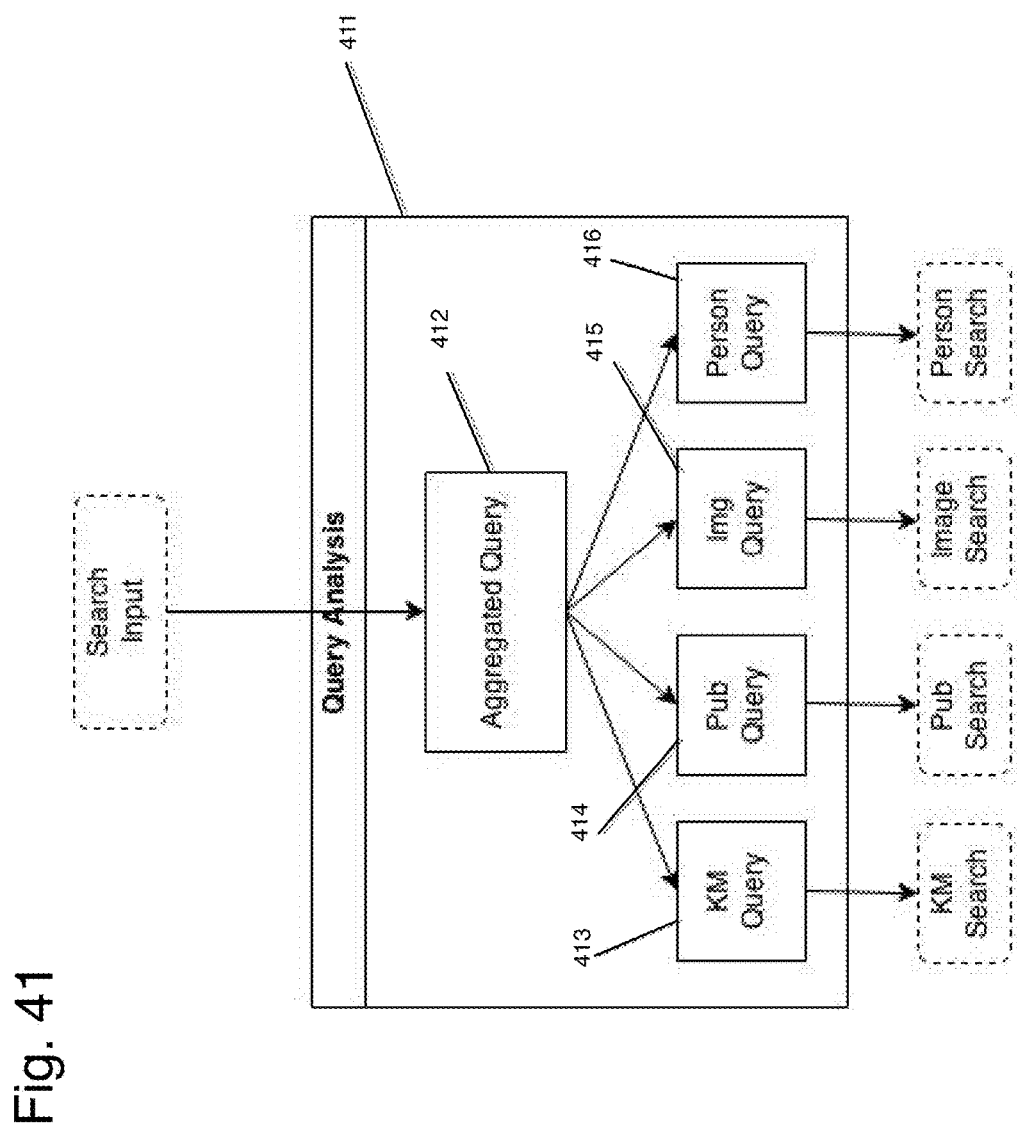
FIG. 41 shows a block diagram of architecture of a system for carrying out search over a network in accordance with an embodiment of the present invention, showing in particular a system for parsing a query received from a web frontend server.

FIG. 41 shows a block diagram of architecture of a system for carrying out search over a network in accordance with an embodiment of the present invention, showing in particular a system for parsing a query received from a web frontend server. A query is received by the Query Analysis module 411 in the form of an aggregated query at component 412. An aggregated query is composed from multiple simple and complex query objects. Simple query objects are keywords, and complex ones are knowledge models, publications, images or people. The aggregated query must be split into separate queries, such as KM query in component 413, a publication query in component 414, an image query in component 415 and a person query in component 416, which will be passed to appropriate search modules.

Figure 42:
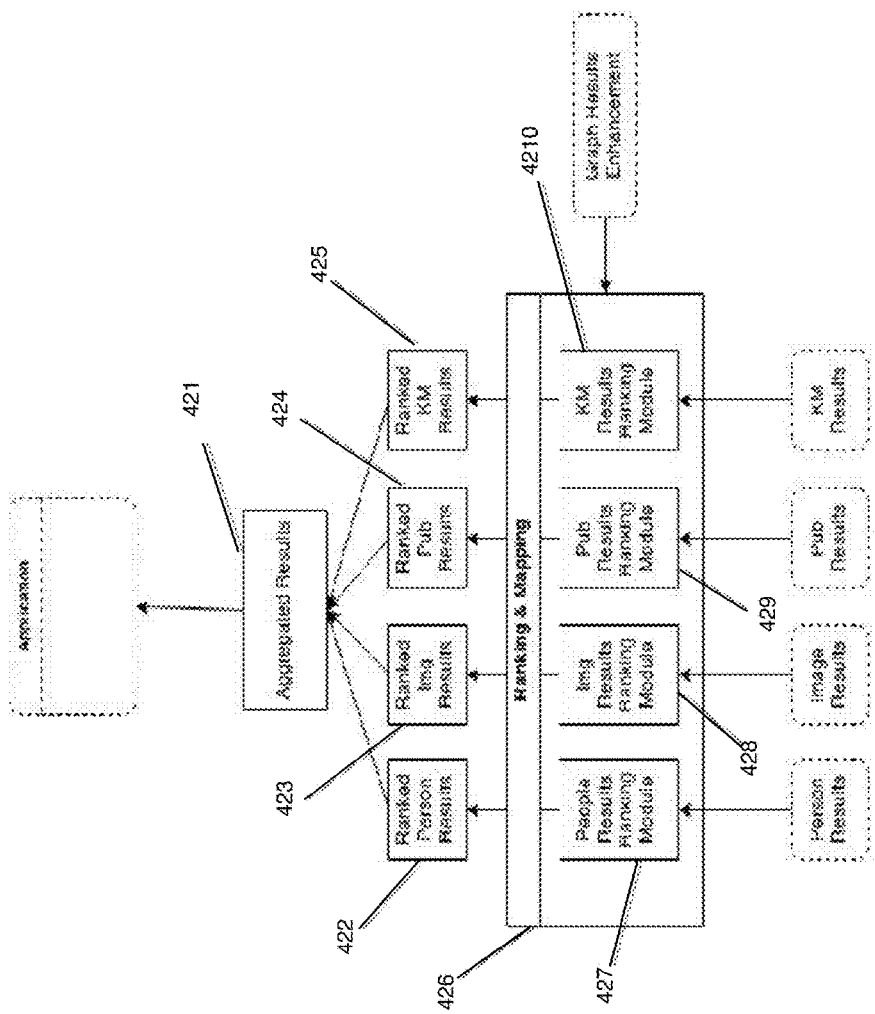
FIG. 42 shows a block diagram of architecture of a system for carrying out search over a network in accordance with an embodiment of the present invention, showing in particular modules for ranking and aggregating the results received from a search server or search modules.

FIG. 42 shows a block diagram of architecture of a system for carrying out search over a network in accordance with an embodiment of the present invention, showing in particular modules for ranking and aggregating the results received from a search server or search modules. Search results, such as people results, image results, publication results or KM results pass through the Ranking & Mapping module 426, which ranks and maps results on the basis of the graph results enhancement 459. Each individual set of results is ranked and mapped in People Results Ranking Module 427, Image Results Ranking Module 428, Publication Results Ranking Module 429 and KM Results Ranking Module 4210 and stored. After ranking and mapping, the stored results in Ranked. Person Results 422, Ranked Image Results 423, Ranked Publication Results 424 and Ranked KM Results 425 are combined into its Aggregated Results, module 421, which is passed to the Application Interface, module 407.

Figure 43:
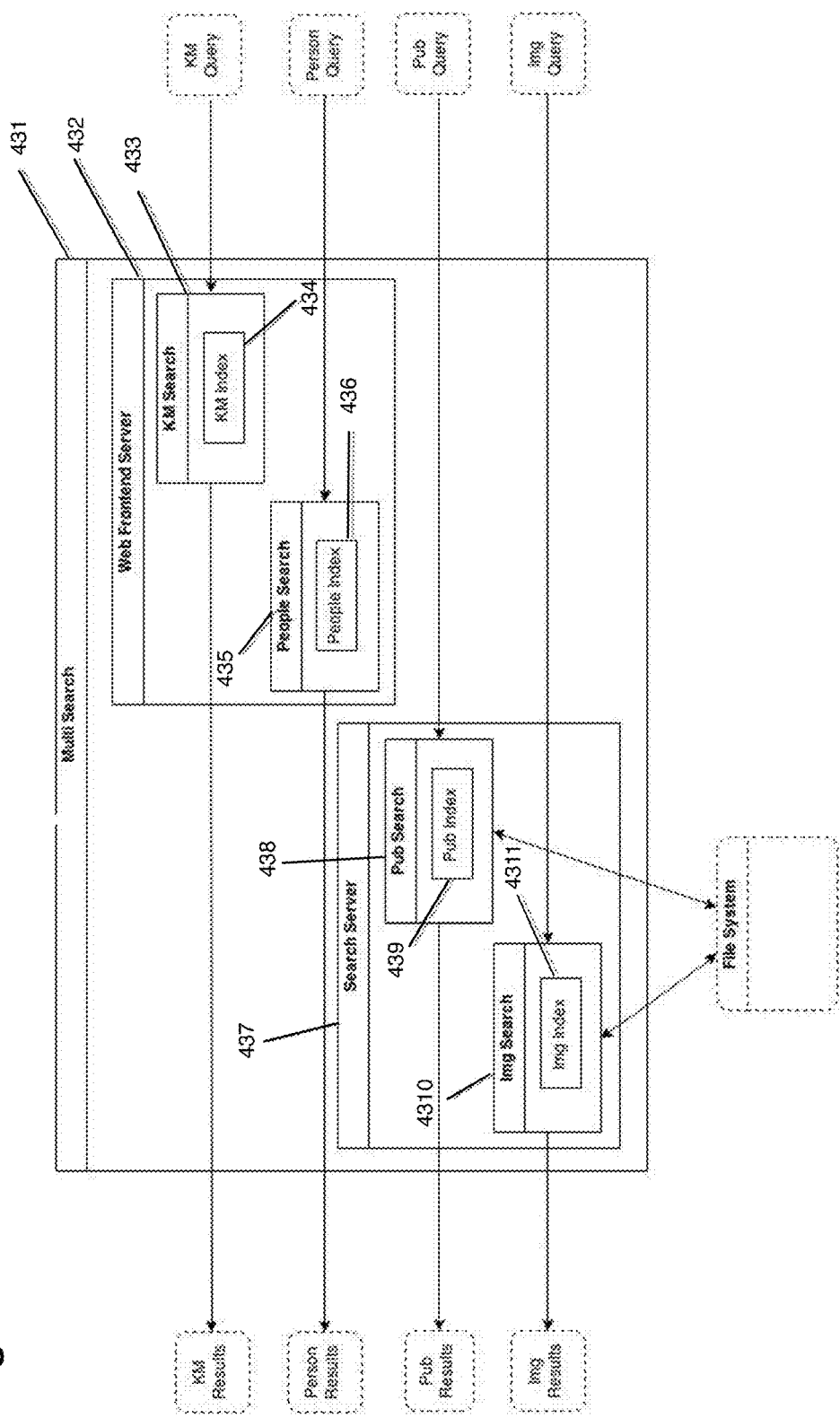
FIG. 43 shows a block diagram of architecture of a system for carrying out search over a network in accordance with an embodiment of the present invention, showing in particular the allocation of functions among components of the server infrastructure for implementing search algorithms received from a query.

FIG. 43 shows a block diagram of architecture of a system for carrying out search over a network in accordance with an embodiment of the present invention, showing in particular the allocation of functions among components of the server infrastructure for implementing search algorithms received from a query. Queries are processed by the system through the Multi Search module 431, where individual queries such as the KM query or person query are passed to the Web Frontend Server, component 432, while publication queries and image queries are passed to the Search Server, component 437. Web Frontend Server 432 receives the KM query and person query, passes them to KM Search module 433 and People Search module 435, where KM Search 433 queries KM Index 434 and sends KM results, and People Search 435 queries People Index 436 and sends person results. Search Server 437 receives the publication query and image query, passes them to Publication Search module 438 and image Search module 4310, where Publication Search 438 queries Publications index 439 and sends publication results, and Image Search 4310 queries Image Index 4311 and sends image results. Publication Index 439 and Image Index 4311 index data are created from raw files located in the file system.

Figure 44:
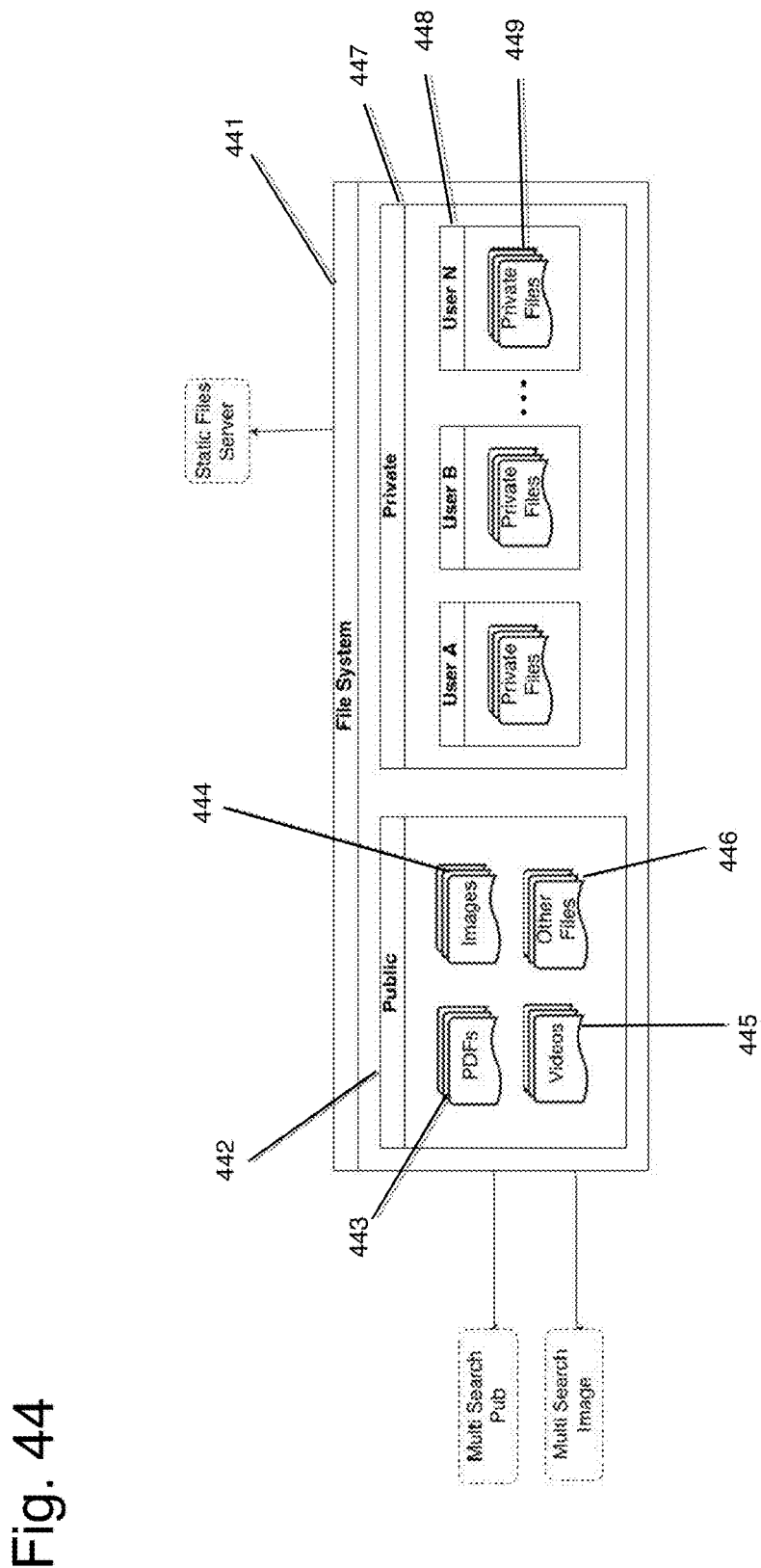
FIG. 44 shows a block diagram of architecture of a system for carrying out search over a network in accordance with an embodiment of the present invention, showing in particular the file system organization for storing private user files and public files.

FIG. 44 shows a block diagram of architecture of a system for carrying out search over a network in accordance with an embodiment of the present invention, showing in particular the file system organization for storing private user files and public files. File System module 441 represents raw data stored in internal persisted hard drives. Data in File System 441 are separated into Public 442 and Private 447 contexts that clearly separate raw files available to public or to individual users. The public context, 447, contains publicly available PM's 443, images 444, videos 445 and other files 446, while private context, 447, contains files available to individual users. For example, the module Random User N 448 context contains raw Private Files 449 available only to user N.

Figure 45:
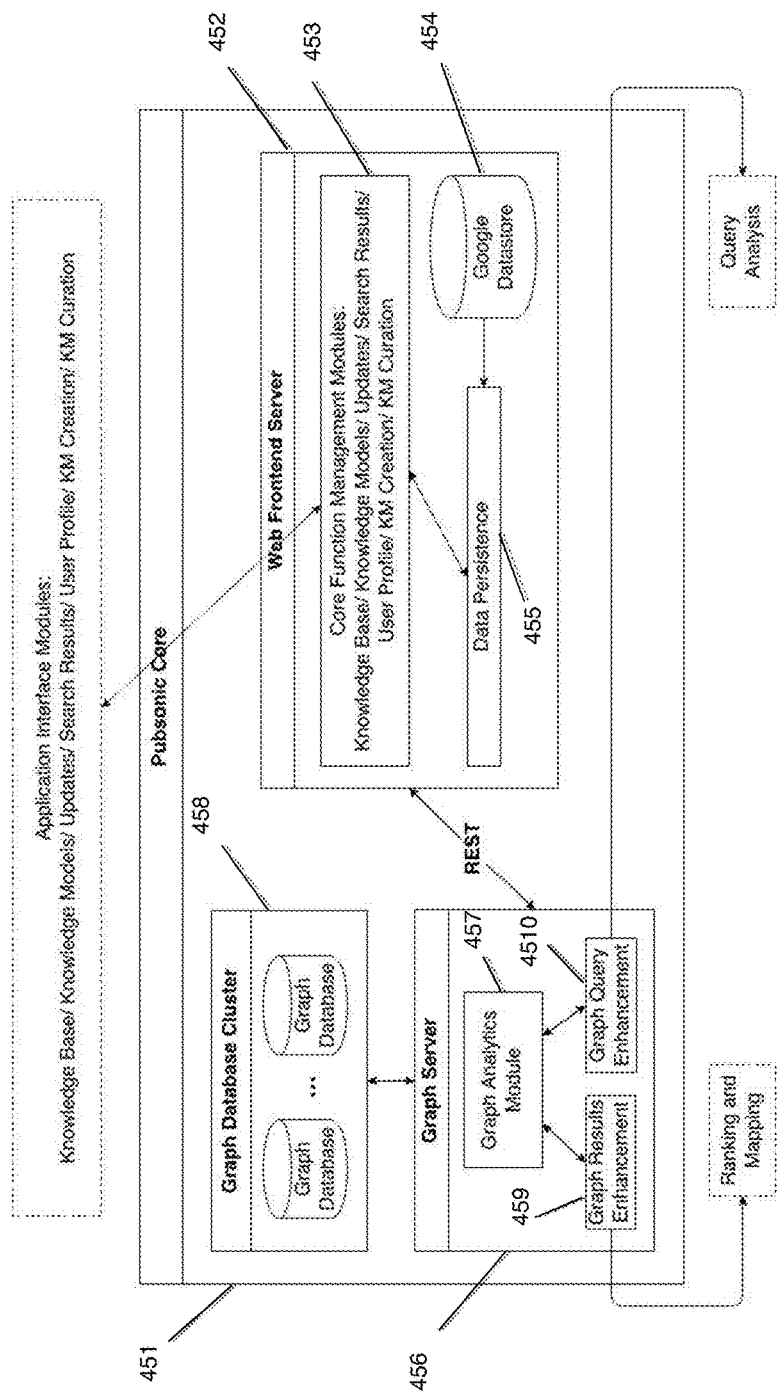
FIG. 45 shows a block diagram of architecture of a system for carrying out search over a network in accordance with an embodiment of the present invention, showing in particular the server structure and components for carrying out core functions and interaction with the core datastore and graph database cluster and analytics module servers

FIG. 45 shows a block diagram of architecture of a system for carrying out search over a network in accordance with an embodiment of the present invention, showing in particular the server structure and components for carrying out core functions and interaction with the core datastore and graph database cluster and analytics module servers. Pubsonic Core 451 represents central business logic and interaction between Web Frontend component 452 and Graph Server component 456, Web Frontend 452 contains Core Function Management Modules 453, such as Knowledgebase, Knowledge Models, Updates, Search Results, User Profile, KM Creation and KM Curation. Each of these modules has individual business logic and is connected with Data Persistence layer 455 that retrieves, stores, updates and deletes data in core datastore 454, which is a highly available and automatically scalable schemaless database. Graph Server 456 contains Graph Analytics Module 457 that takes relations data from Graph Database Cluster 458 and uses that data in Graph Query Enhancements 4510 for enriching queries and Graph Results Enhancements 459 for ranking and mapping results.

Figure 46:
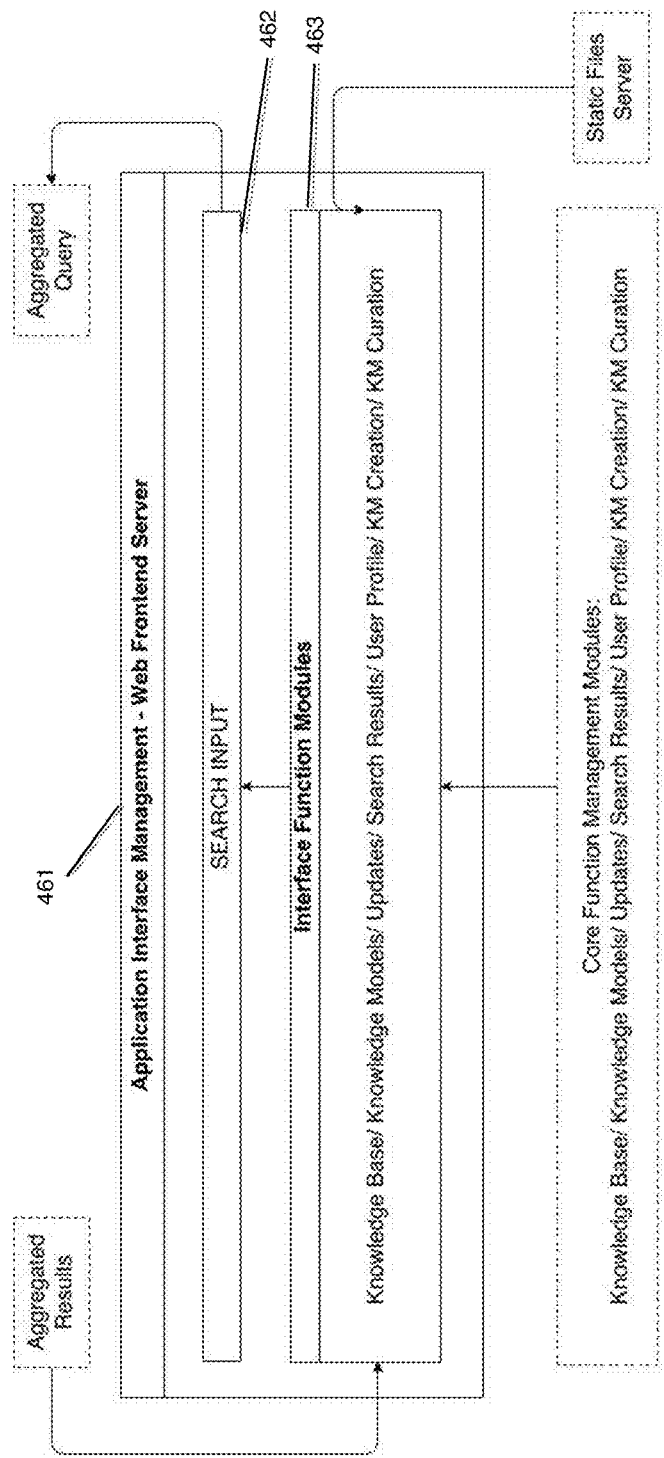
FIG. 46 shows a block diagram of architecture of a system for carrying out search over a network in accordance with an embodiment of the present invention, showing in particular the server structure and components for carrying out user interface functions and interaction with core functions.

FIG. 46 shows a block diagram of architecture of a system for carrying out search over a network in accordance with an embodiment of the present invention, showing in particular the server structure and components for carrying out user interface functions and interaction with core functions. The Application Interface Management module 461 is part of the Web Frontend Server, which serves data and logic for each component within the Interface Function Modules 463, such as Knowledgebase, Knowledge Models, Search Results, User Profile, KM Creation and KM Curation. Each of these Interface Function Management modules 461 can be connected with Search Input 462 by selecting or dragging and dropping of a relevant object (KM, publication, image, person, user data) to Search Input 462.

Although embodiments of the present invention have been described in the context of serving to a client computer web pages of specific content by a server, in other embodiments, web pages do not need to be employed. For example, the client computer may be configured to operate autonomously, in which case web pages would not be required. Instead any convenient format can be used to serve to the client computer a relevant set of knowledge objects or a relevant set of knowledge assets. The client computer in turn can communicate to the server, for purposes of continued searching or exploration, a selection message by which the client computer selects a given one of the knowledge objects or knowledge assets.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer-implemented method of carrying out a search for information available over a network, the method comprising:

responsive to a search request message received at a server over the network from a client computer, serving to the client computer a web page containing a first set of knowledge objects, such knowledge objects being interlinked, through a crowd-sourced schema, in a database of a specific category, so that the knowledge objects are selected from a first shared network graph, the first set of knowledge objects being responsive to the search request;

wherein the web page is structured so that graphically selecting one of the knowledge objects in the first set causes display of a set of knowledge assets, interlinked with the selected knowledge object, the set of knowledge assets including a second set of knowledge objects selected from a second network graph, distinct from the first network graph, so that a search conducted using the first network graph can be further conducted using the second network graph by selection of a knowledge object in the second set.

2. A computer-implemented method according to claim 1, wherein the search request message is a designation of a location in a taxonomy applicable to the database of knowledge objects.

3. A computer-implemented method according to claim 1, wherein the set of knowledge assets includes knowledge objects selected from a plurality of distinct network graphs.

4. A computer-implemented method according to claim 1, wherein the set of knowledge assets includes knowledge objects selected from at least three distinct network graphs.

5. A computer-implemented method according to claim 1, wherein the set of knowledge assets includes knowledge objects selected from at least four distinct network graphs.

6. A computer-implemented method according to claim 1, wherein the set of knowledge assets includes knowledge objects selected from a knowledgebase.

7. A computer-implemented method according to claim 5, wherein the set of knowledge assets includes knowledge objects selected from a knowledgebase, a network graph of people, a network graph of publications, and a network graph of data sets.

8. A computer-implemented method according to claim 1, wherein the web page is structured so that, in an explore mode of displaying the web page on the client computer, graphical selection of a knowledge object reveals other knowledge objects contained within the same network graph interlinked to the selected knowledge object, so as to facilitate browsing in the database, including browsing across any network graph.

9. A computer-implemented method according to claim 1, wherein each linkage between interlinked knowledge objects has a type selected from a group of types.

10. A computer-implemented method of carrying out a search for information available over a network, the method comprising:

responsive to a search request message received at a server over the network from a client computer, serving to the client computer a first set of knowledge objects, such knowledge objects being interlinked in a database of a specific category, so that the knowledge objects are selected from a first shared network graph, the first set of knowledge objects being responsive to the search request;

responsive to a selection message from the client computer specifying a selection of one of the knowledge objects in the first set, serving a set of knowledge assets, interlinked with the selected knowledge object, the set of knowledge assets including a second set of knowledge objects selected from a second network graph, distinct from the first network graph, so that a search conducted using the first network graph can be further conducted using the second network graph by selection of a knowledge object in the second set.

11. A method according to claim 10, wherein the search request message has been generated autonomously by the client computer.

12. A computer-implemented method according to claim 10, wherein the search request message is a designation of a location in a taxonomy applicable to the database of knowledge objects.

13. A computer-implemented method according to claim 10, wherein the set of knowledge assets includes knowledge objects selected from a plurality of distinct network graphs.

14. A computer-implemented method according to claim 10, wherein the set of knowledge assets includes knowledge objects selected from at least three distinct network graphs.

15. A computer-implemented method according to claim 10, wherein the set of knowledge assets includes knowledge objects selected from at least four distinct network graphs.

16. A computer-implemented method according to claim 10, wherein the set of knowledge assets includes knowledge objects selected from a knowledgebase.

17. A computer-implemented method according to claim 15, wherein the set of knowledge assets includes knowledge objects selected from a knowledgebase, a network graph of people, a network graph of publications, and a network graph of data sets.

18. A computer-implemented method according to claim 10, further comprising:

responsive to an exploration selection message, from the client computer, specifying a selection, for exploration purposes, of one of the knowledge objects in the first set, serving a set of knowledge assets, interlinked with the selected knowledge object, the set of knowledge assets including a second set of knowledge objects selected from a second network graph, distinct from the first network graph, so that a search conducted using the first network graph can be further conducted using the second network graph by selection of a knowledge object in the second set.

19. A computer-implemented method according to claim 10, wherein each linkage between interlinked knowledge objects has a type selected from a group of types.

* * * * *